(12) United States Patent
Coenegracht et al.

(10) Patent No.: US 12,124,098 B2
(45) Date of Patent: Oct. 22, 2024

(54) CABLE SEALING ARRANGEMENT FOR AN ENCLOSURE

(71) Applicant: COMMSCOPE TECHNOLOGIES LLC, Hickory, NC (US)

(72) Inventors: Philippe Coenegracht, Hasselt (BE); William B. Bryan, Fuquay Varina, NC (US); Roy Keller Thompson, Apex, NC (US); Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 345 days.

(21) Appl. No.: 17/776,197

(22) PCT Filed: Nov. 10, 2020

(86) PCT No.: PCT/US2020/059835
§ 371 (c)(1),
(2) Date: May 11, 2022

(87) PCT Pub. No.: WO2021/096859
PCT Pub. Date: May 20, 2021

(65) Prior Publication Data
US 2022/0382008 A1    Dec. 1, 2022

Related U.S. Application Data

(60) Provisional application No. 62/933,791, filed on Nov. 11, 2019, provisional application No. 62/972,417, (Continued)

(51) Int. Cl.
*G02B 6/44* (2006.01)

(52) U.S. Cl.
CPC .................................. *G02B 6/4444* (2013.01)

(58) Field of Classification Search
CPC .................................................... G02B 6/4444
See application file for complete search history.

(56) References Cited

U.S. PATENT DOCUMENTS

| 5,442,004 A | 8/1995 | Sutherland et al. |
| 5,541,250 A | 7/1996 | Hudson et al. |

(Continued)

FOREIGN PATENT DOCUMENTS

| WO | 88/00603 A2 | 1/1988 |
| WO | 93/23472 A1 | 11/1993 |

(Continued)

OTHER PUBLICATIONS

Extended European Search Report for Application No. 20887100.4 mailed Nov. 8, 2023.

(Continued)

*Primary Examiner* — Sung H Pak
*Assistant Examiner* — Hoang Q Tran
(74) *Attorney, Agent, or Firm* — Merchant & Gould P.C.

(57) ABSTRACT

The present disclosure relates to sealing arrangements for sealing locations where cables enter/exit enclosures. The sealing arrangements can include first and second cable sealing modules each including a cable sealing surface. The cable sealing surfaces of the first and second cable sealing modules oppose and contact one another at a cable pass-through sealing interface. The sealing arrangements can be adapted to enhance cable diameter range-taking, sealant conformability, and/or sealant recovery from deformation.

11 Claims, 48 Drawing Sheets

Related U.S. Application Data filed on Feb. 10, 2020, provisional application No. 63/029,271, filed on May 22, 2020.

(56) References Cited

U.S. PATENT DOCUMENTS

| | | |
|---|---|---|
| 5,618,882 A | 4/1997 | Hammond et al. |
| 5,994,446 A | 11/1999 | Graulus et al. |
| 6,888,067 B1 | 5/2005 | Howland |
| 8,642,891 B2 | 2/2014 | Berghmans et al. |
| 2014/0077409 A1 | 3/2014 | Satou et al. |
| 2015/0029667 A1 | 1/2015 | Szczesny et al. |
| 2016/0329132 A1 | 11/2016 | Nooner et al. |
| 2017/0139450 A1 | 5/2017 | Adrian |
| 2018/0252887 A1 | 9/2018 | Coenegracht et al. |
| 2019/0219785 A1 | 7/2019 | Radelet et al. |

FOREIGN PATENT DOCUMENTS

| | | | |
|---|---|---|---|
| WO | 94/18273 A1 | 8/1994 | |
| WO | 2014/005916 A2 | 1/2014 | |
| WO | 2016/071394 A2 | 5/2016 | |
| WO | 2017/167819 A1 | 10/2017 | |
| WO | 2017/189777 A1 | 11/2017 | |
| WO | 2018/048910 A2 | 3/2018 | |
| WO | WO-2018158362 A1 * | 9/2018 | .......... G02B 6/4444 |
| WO | 2019/160995 A1 | 8/2019 | |
| WO | 2019/173663 A1 | 9/2019 | |
| WO | 2020/061283 A1 | 3/2020 | |
| WO | 2021/061988 A1 | 4/2021 | |
| WO | 2021/113109 A1 | 6/2021 | |

OTHER PUBLICATIONS

International Search Report and Written Opinion of the International Searching Authority for International Patent Application No. PCT/US2020/059835 mailed Mar. 8, 2021, 10 pages.

* cited by examiner

CABLE SEALING ARRANGEMENT FOR AN ENCLOSURE

CROSS-REFERENCE TO RELATED APPLICATIONS

This application is a National Stage Application of PCT/US2020/059835, filed on Nov. 10, 2020, which claims the benefit of U.S. Patent Application Ser. No. 62/933,791, filed on Nov. 11, 2019, and claims the benefit of U.S. Patent Application Ser. No. 62/972,417, filed on Feb. 10, 2020, and claims the benefit of U.S. Patent Application Ser. No. 63/029,271, filed on May 22, 2020, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers. It is often preferred for the telecommunications enclosures to be re-enterable. The term "re-enterable" means that the telecommunications enclosures can be re-opened to allow access to the telecommunications components housed therein without requiring the removal and destruction of the telecommunications enclosures. For example, certain telecommunications enclosures can include separate access panels that can be opened to access the interiors of the enclosures and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, or other structures. Further enclosures include domes attached to bases via clamps. Telecommunications enclosures are typically sealed to inhibit the intrusion of moisture or other contaminants. Example cable sealing arrangements for enclosures are disclosed by PCT International Publication Numbers WO 2014/005916; WO 2017/167819; WO 2018/048910; WO 2019/160995; and WO 2019/173663.

SUMMARY

The present disclosure relates to sealing arrangements for sealing locations where cables enter/exit enclosures. The sealing arrangements can include first and second cable sealing modules each including a cable sealing surface. The cable sealing surfaces of the first and second cable sealing modules oppose and contact one another at a cable pass-through sealing interface. The sealing arrangements can be adapted to enhance cable diameter range-taking, sealant conformability, and/or sealant recovery from deformation. A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular examples of the present disclosure and therefore do not limit the scope of the present disclosure. Examples of the present disclosure will hereinafter be described in conjunction with the appended drawings, wherein like numerals denote like elements.

DETAILED DESCRIPTION

Figure 1:
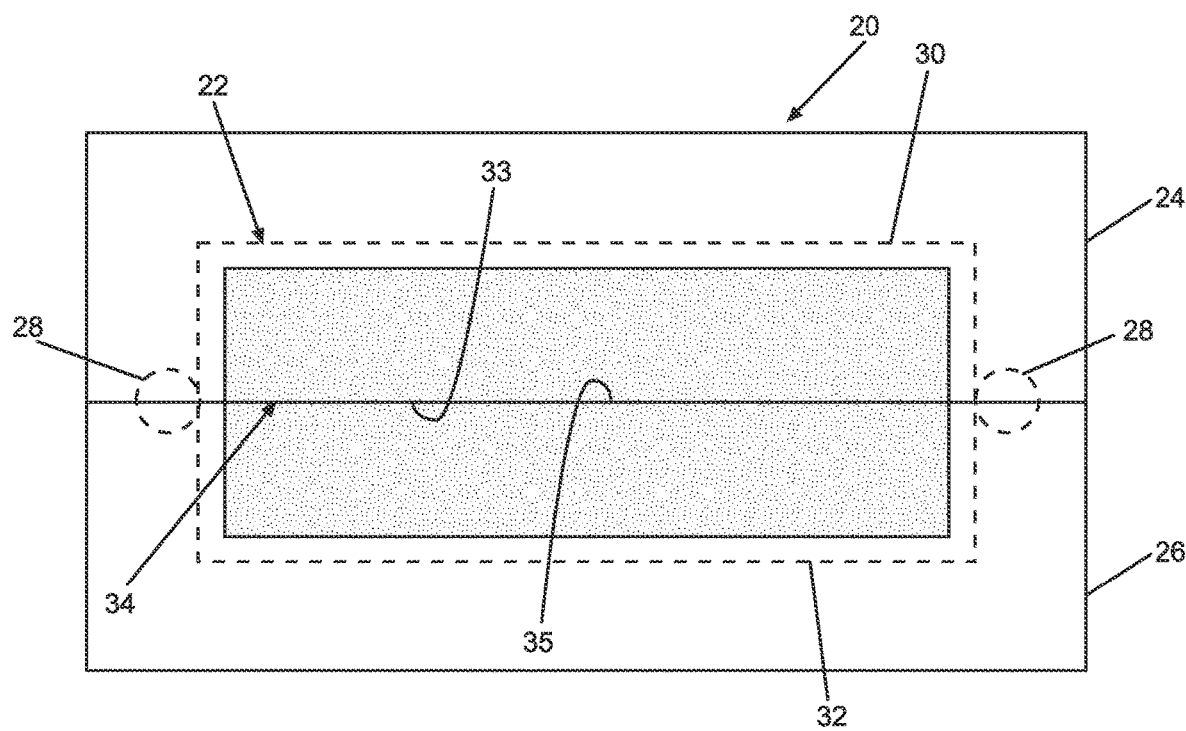
FIG. 1 is a schematic view of an example telecommunication enclosure in accordance with the principles of the present disclosure, the telecommunication enclosure includes a cable sealing interface for sealing cables routed into or out of the enclosure.

Various examples will be described in detail with reference to the drawings, wherein like reference numerals represent like parts and assemblies throughout the several views.

Figure 2:
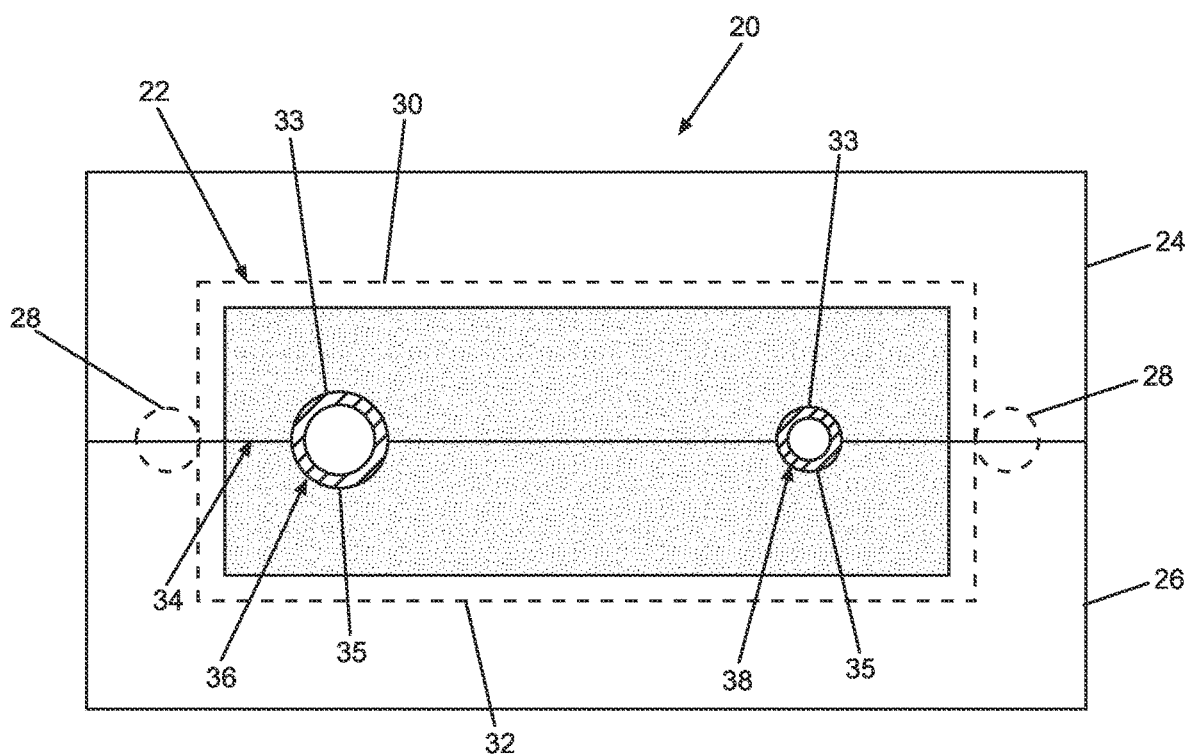
FIG. 2 shows the telecommunication enclosure of FIG. 1 with the sealing interface deformed to accommodate cables routed through the cable sealing interface.

FIGS. 1 and 2 schematically depict a telecommunication enclosure 20 having a sealing arrangement 22 in accordance with the principles of the present disclosure. The telecommunication enclosure 20 is preferably a re-enterable enclosure that includes first and second housing pieces 24, 26 that define an interior for housing telecommunication components such as fiber optic splices, passive optical power splitters, wavelength division multiplexers, fiber optic adapters, fiber optic connectors, fiber management trays, cable loop storage locations, and other components. When the first and second housing pieces 24, 26 are mounted together, the interior of the enclosure 20 is preferably environmentally sealed. A perimeter seal 28 can provide sealing between the first and second housing pieces 24, 26 about the perimeter of the enclosure 20. The first and second housing pieces 24, 26 can be separated from one another to provide access to the interior of the enclosure 20. The cable sealing arrangement 22 is provided at one end of the enclosure 20. The cable sealing arrangement 22 includes cable sealing modules 30, 32 that contact one another at a cable sealing interface 34. The cable sealing modules 30, 32 preferably contact the perimeter seal 28 and also provide sealing with respect to the first and second housing pieces 24, 26. The cable sealing modules 30, 32 include cable sealing surfaces 33, 35 that contact one another at the cable sealing interface 34. The cable sealing interface 34 provides a location through which fiber optic cables 36, 38 (see FIG. 2) can be routed into/out of the interior of the enclosure 20 while concurrently being sealed at the sealing arrangement 22. FIG. 1 shows the sealing arrangement 22 in a non-deformed state, while FIG. 2 shows the sealing arrangement 22 in a deformed state that accommodates and seals the fiber optic cables 36, 38.

Figure 3:
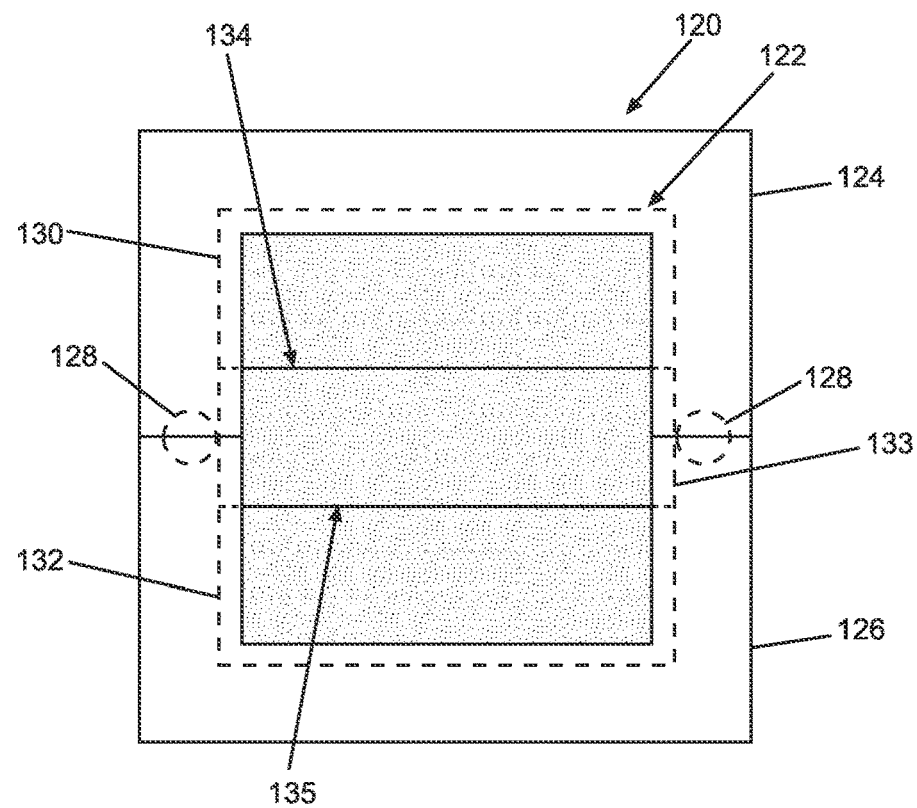
FIG. 3 depicts another telecommunication enclosure in accordance with the principles of the present disclosure, the telecommunication enclosure includes a cable sealing arrangement including two cable sealing interfaces.
Figure 4:
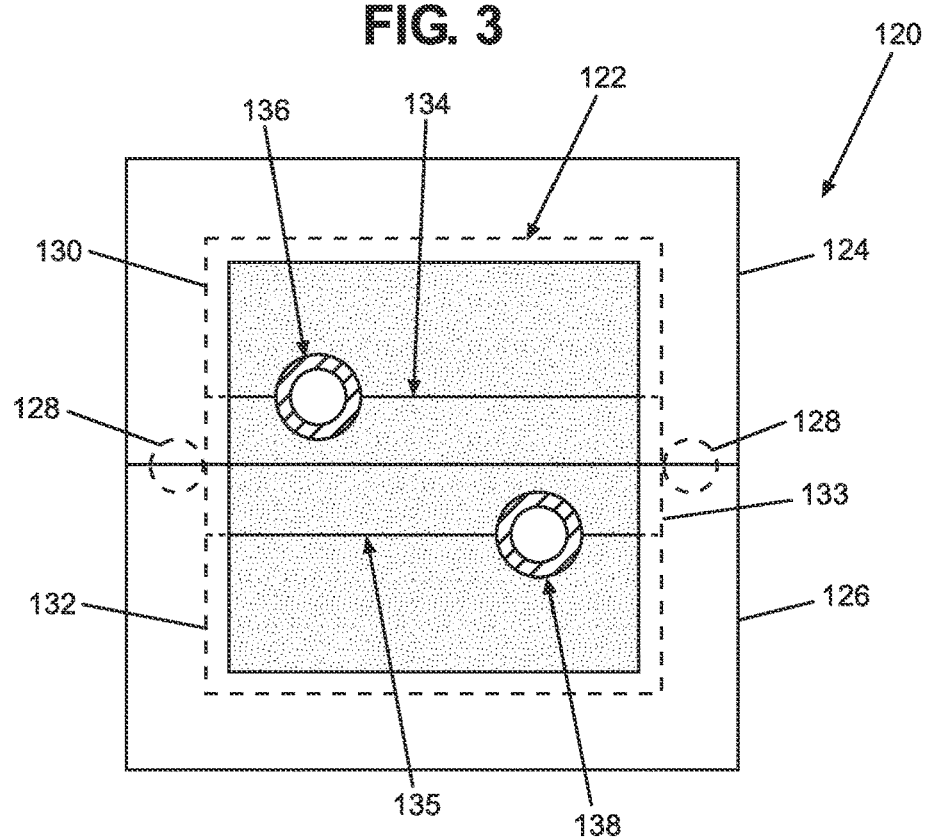
FIG. 4 depicts the telecommunication enclosure of FIG. 3 with the sealing interfaces deformed to accommodate cables routed through the cable sealing interfaces.

FIGS. 3 and 4 show another telecommunication enclosure 120 having a sealing arrangement 122 in accordance with the principles of the present disclosure. The telecommunication enclosure 120 is preferably re-enterable and includes first and second housing pieces 124, 126 sealed at their perimeter by a perimeter seal 128. The perimeter seal 128 preferably contacts a cable sealing arrangement 122. The sealing arrangement 122 includes cable sealing modules 130, 132 and 133. The cable sealing module 133 is positioned between the cable sealing modules 130, 132. A first cable sealing interface 134 is defined between the cable sealing module 130 and the cable sealing module 133, and a second cable sealing interface 135 is defined between the cable sealing module 133 and the cable sealing module 132. Opposing cable sealing surfaces of the modules 130, 133 define the first cable sealing interface 134, and opposing sealing surfaces of the modules 133, 132 define the second cable sealing interface 135. FIG. 3 shows the sealing arrangement 122 in a non-deformed state in which no fiber optic cables are sealed within the sealing arrangement 122, and FIG. 4 shows the sealing arrangement 122 in a deformed state in which the sealing arrangement 122 seals about the cables 136, 138 at the cable sealing interfaces 134, 135.

It will be appreciated that the cables define cable axes that define cable pass-through directions/orientations through the sealing arrangements 22. The pass-through directions/orientations are generally parallel with respect to the cable sealing surfaces of the sealing modules. The cable sealing modules also include axial ends that are generally perpendicular relative to the cable pass-through orientations.

It will be appreciated that the sealing arrangements 22, 122 are preferably adapted to accommodate fiber optic cables having a wide range of size (e.g., diameter). To accommodate cables having a wide range of size, aspects of the present disclosure relate to spring arrangements for accommodating sealant displacement during cable sealing while maintaining the sealant under spring load. Aspects of the present disclosure also relate to configurations for enhancing the range-taking capability of the sealing arrangements by allowing portions of the sealant of the sealing arrangements to be efficiently removed to accommodate larger fiber optic cables.

Aspects of the present disclosure also relate to cable sealing arrangements including sealing modules that readily flow from a non-deformed state to a deformed state to conform to fiber optic cables and provide sealing effective sealing about the cables. The cable sealing modules also are preferably capable of effectively changing in shape from a deformed state to a recovered state when a cable is removed. In certain examples, the sealing modules can include a sealant that is quite soft to allow the sealant to readily and quickly conform to different sized fiber optic cables to provide effective sealing. In certain examples, the sealing modules also include structure that effectively provides containment of the soft sealing material, and has elastic properties that assists in reducing the recovery time required for the soft sealing to return to a state in which the deformation is less than 10, 5 or 2 percent.

In certain examples, sealing modules in accordance with the principles of the present disclosure can include a hybrid or composite construction including a sealing portion having a first composition and a containment portion having a second composition. In certain examples, the first and second compositions can be compatible with one another and can be adapted to bond with respect to one another. In certain examples, the first and second compositions can both be elastomeric compositions. In certain examples, the first and second compositions can include the same base polymer. In certain examples, the sealing portion and the containment portion can both be elastomeric, but the sealing portion can be softer than the containment portion, and the containment portion can have a higher modulus of elasticity than the sealing portion. In certain examples, the containment portion can include a skin or layer of material provided at the axial end faces of a given sealing module. In certain examples, the containment portion can be a pre-molded structure, and the sealing portion can be molded over, through and or onto the containment portion. In certain examples, the sealing portion and the containment portion both have compression sets less than 10, 5 or 2 percent, but the recovery time for the containment portion is shorter than the recovery time for the sealing portion. In certain examples, the sealing material can have a gel composition, and the containment portion can have a rubber composition.

In certain examples in accordance with the principles of the present disclosure, the sealing material can have a hardness in the range of 10-60 Shore 000 and the containment material can have a hardness in the range of 5-30 Shore A. In a given cable sealing module, the sealing material is preferably softer than the containment material.

In a preferred example, the sealing portion of a given sealing module occupies a majority of the volume of the sealing module while the containment portion occupies a minority of the total volume of the sealing module.

In certain examples, the sealing portion and the containment portion can each have an elastomeric construction with a base composition that includes silicone (e.g., polysiloxanes or polymethylsiloxanes). In certain examples, the sealing portion and the containment portion can each include an elastomeric construction with a base composition that includes a thermoplastic elastomeric. Example thermoplastic elastomers can include styrenic block copolymers, thermoplastic polyurethanes, thermoplastic copolyesters, thermoplastic polyamides, thermoplastic polyolefin elastomers, and other thermoplastic elastomers.

In certain examples, sealing modules in accordance with the principles of the present disclosure can include a sealing portion molded over a plastic frame. In certain examples, the plastic frame can include fingers adapted to flex when cables are routed through a cable sealing interface. In certain examples, the fingers can be arranged in a V-shaped configuration when viewed along the cable pass-through orientation, and the cable pass-through location is defined through the V of the V-shaped configuration. In certain examples, the flexible fingers can be adapted to enhance sealing (e.g., conformability and conformability time) about cables routed through the cable sealing interface and can be configured for decreasing the time period for a sealing arrangement to recover from a deformed state to a recovered state. In certain examples, sealing modules in accordance with the principles of the present disclosure can include a composite construction including an elastomeric sealing portion molded over a plastic frame and also molded onto, over, onto or through to an elastomeric containment portion that is harder and more elastic than the sealing portion and softer than the plastic frame. In certain examples, the containment portion can be adapted for maintaining containment of the sealing portion, deforming to provide cable range taking, and assisting in reducing a time period for the sealing arrangement to move from a deformed state to a recovered state after a cable has been removed.

Figure 5:
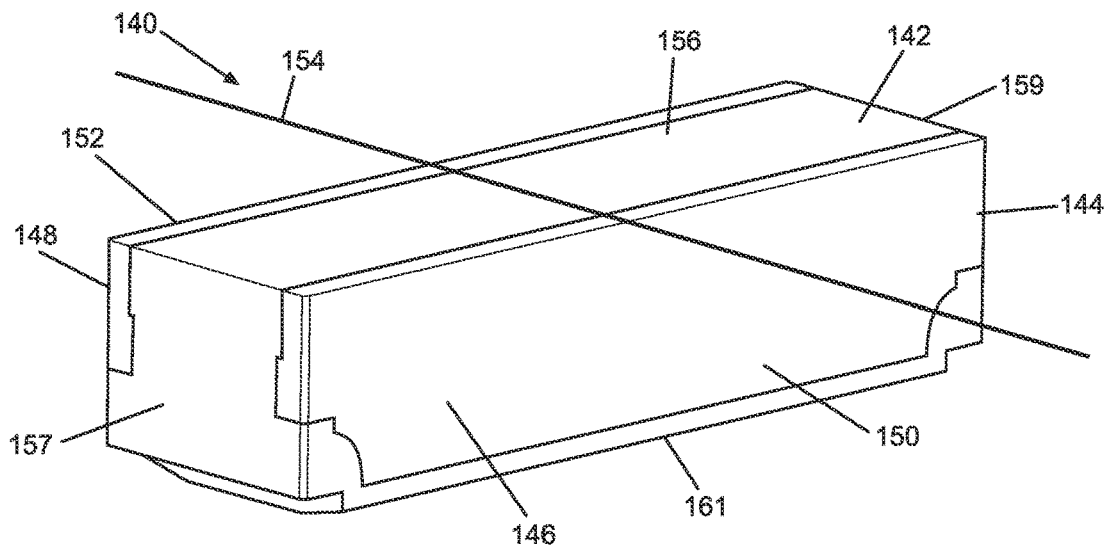
FIG. 5 is a perspective view of an example sealing module in accordance with the principles of the present disclosure that can be incorporated within cable sealing arrangements such as those shown in the examples of FIG. 1-4, 54 or 57.
Figure 6:
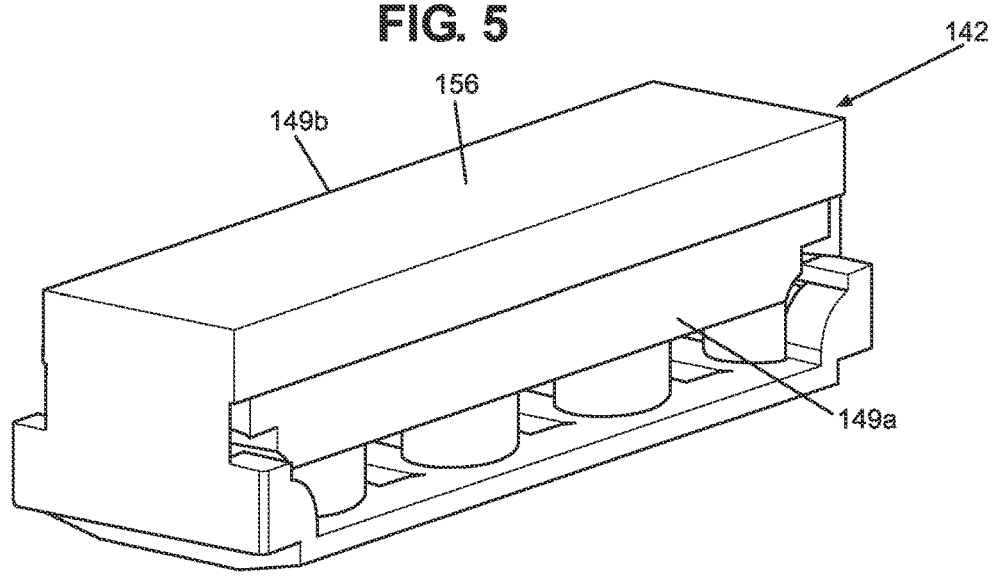
FIG. 6 depicts a cable sealing portion of the sealing module of FIG. 5.
Figure 7:
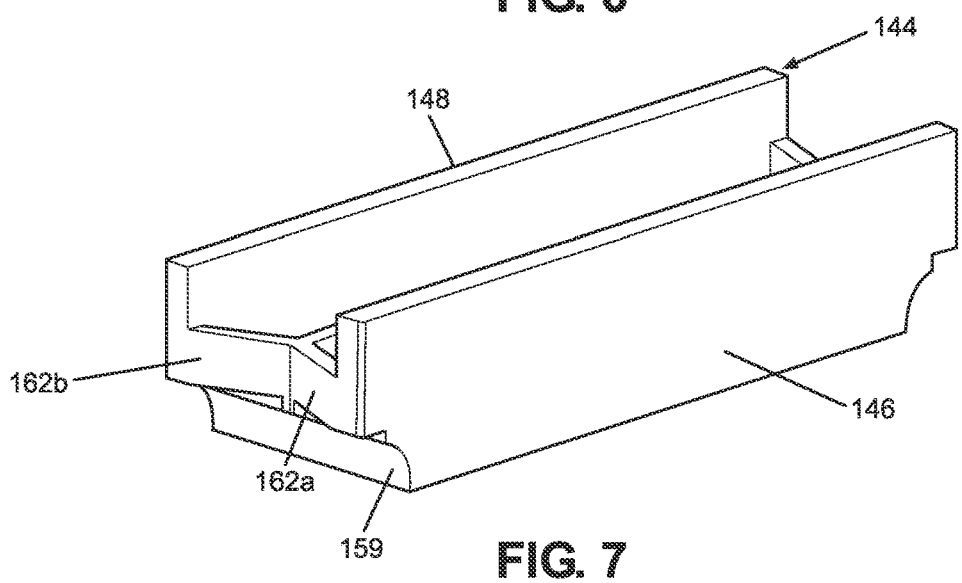
FIG. 7 depicts a sealant containment portion of the sealing module of FIG. 5.
Figure 8:
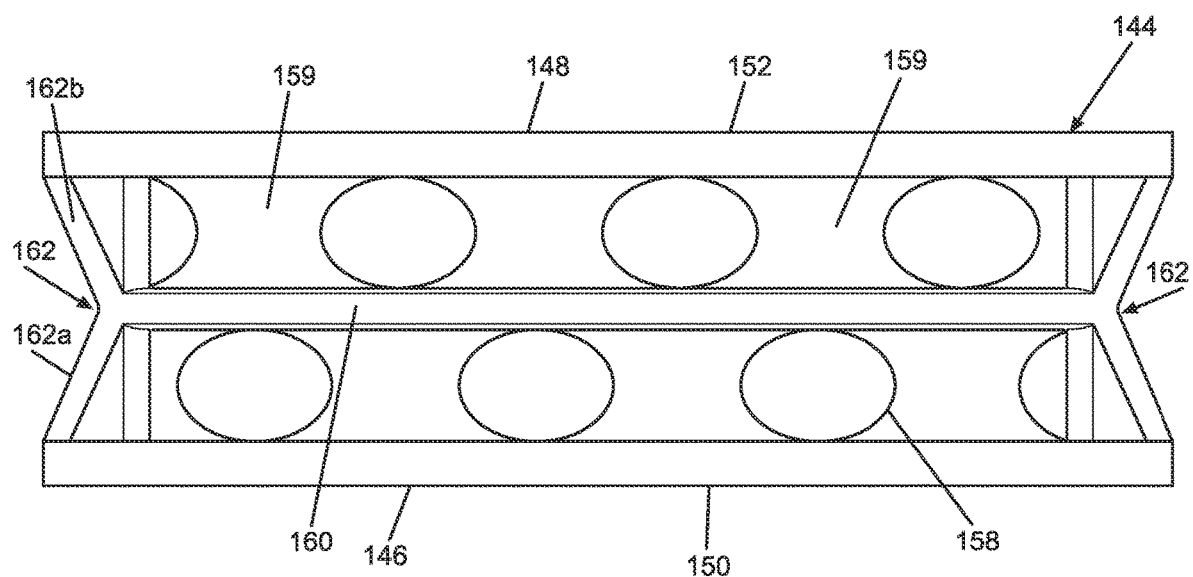
FIG. 8 is a top plan view of the sealant containment portion of FIG. 7.
Figure 9:
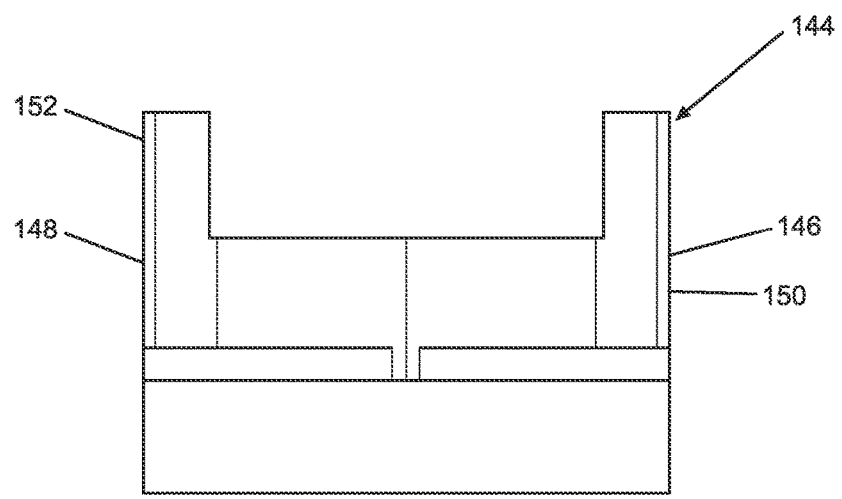
FIG. 9 is an end view of the sealant containment portion of FIG. 7.

FIG. 5 depicts a cable sealing module 140 in accordance with the principles of the present disclosure. It will be appreciated that the sealing module 140 can be utilized in the sealing arrangement 22 as the cable sealing modules 30, 32 and within the sealing arrangement 122 as the cable sealing modules 130, 132. The cable sealing module 140 has a composite construction including a sealing portion 142 and a containment portion 144. The sealing portion 142 and the containment portion 144 are preferably both elastomeric in construction and can have characteristics, compositions and properties of the type previously described. The containment portion 144 includes major walls 146, 148 that are parallel to one another and that define axial end faces 150, 152 of the sealing module 140. The axial end faces 150, 152 are oriented generally perpendicular with respect to a cable pass-through orientation 154 of the sealing module 140. The sealing portion 140 is preferably molded between the major walls 146, 148 with the major walls 146, 148 covering axial end surfaces 149a, 149b of the sealing portion 142. Preferably, the major walls 146, 148 coincide with a majority or at least 75% of the axial end faces 150, 152 of the sealing module 140. In certain examples, the major walls 146, 148 cover at least 75% of the surface area of each of the axial end faces 149a, 149b of the sealing portion 142.

The sealing module 140 includes a cable sealing surface 156 that extends axially between the walls 146, 148. The major walls 146, 148 extend up to (e.g., are flush with) the cable sealing surface 156. The sealing portion 142 is exposed at the cable sealing surface 156, and is also exposed at opposite ends 157, 159 of the module 140 as well as at a side 161 of the sealing module 140 positioned opposite from the cable sealing surface 156. The sealing portion 142 is molded between the major walls 146, 148 of the containment portion 144, and is also molded through openings 158 defined through a base 159 of the containment portion 144.

The containment portion 144 includes a central rib 160 that extends along the length of the module 140 between opposite ends of the module 157, 159. The containment portion 144 also includes cross-supports 162 adjacent the ends 157, 159 that connect the central rib 160 to the end walls 146, 148. The cross-supports 162 each include two segments 162a, 162b that are angled relative to one another at an oblique angle. It will be appreciated that the rib 160, the cross-supports 162 as well as the base 159 of the containment portion 144 are encased (e.g., over molded by, imbedded within) within the sealing portion 142. The sealing portion 142 is exposed about an exterior perimeter surface that extends continuously about the perimeter of the module. For example, the perimeter surface extends at opposite sides of the module along the length of the sealing module 140 and also around the opposite ends of the sealing module 140 to provide a continuous sealing surface that loops about the perimeter of the sealing module 140.

Figure 10:
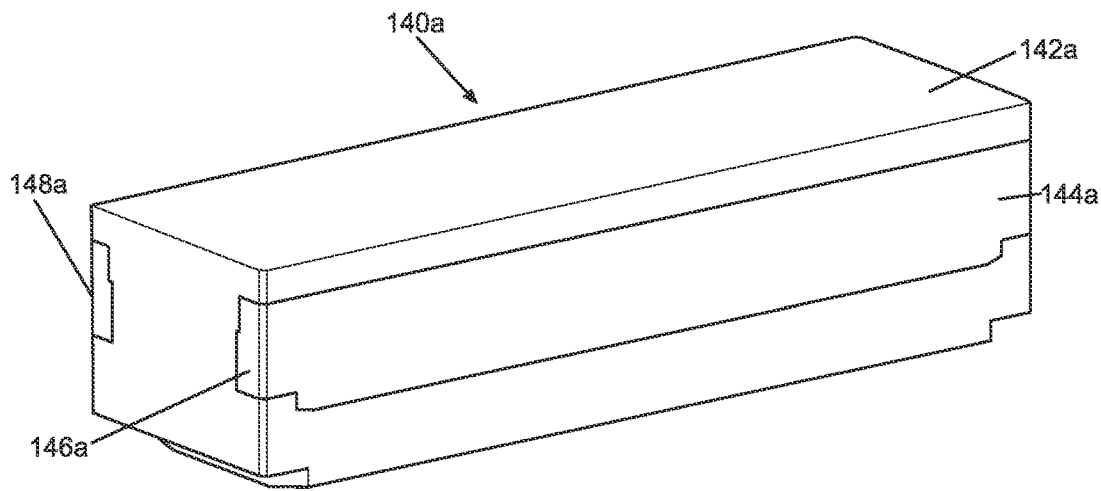
FIG. 10 is a perspective view of another sealing module in accordance with the principles of the present disclosure that can be incorporated within cable sealing arrangements such as those shown in the examples of FIG. 1-4, 54 or 57.

FIG. 10 depicts another sealing module 140a in accordance with the principles of the present disclosure. The sealing module 140a can be incorporated into the sealing arrangement 22 as the cable sealing modules 30, 32 or into the sealing arrangement 122 as the cable sealing modules 130, 132. The sealing module 140a includes a sealing portion 142a and a containment portion 144a. Sealing portion 142a is molded over the containment portion 144a, and both preferably have an elastomeric construction. The sealing portion 142a and the containment portion 144a can have material properties and chemical compositions of the type previously described herein.

Figure 11:
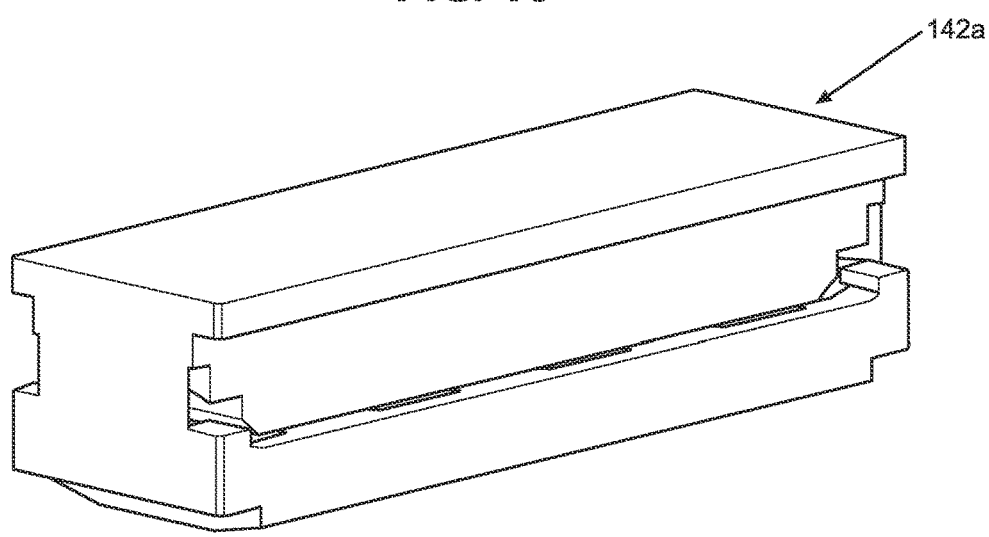
FIG. 11 is a perspective view of a cable sealing portion of the cable sealing module of FIG. 10.
Figure 12:
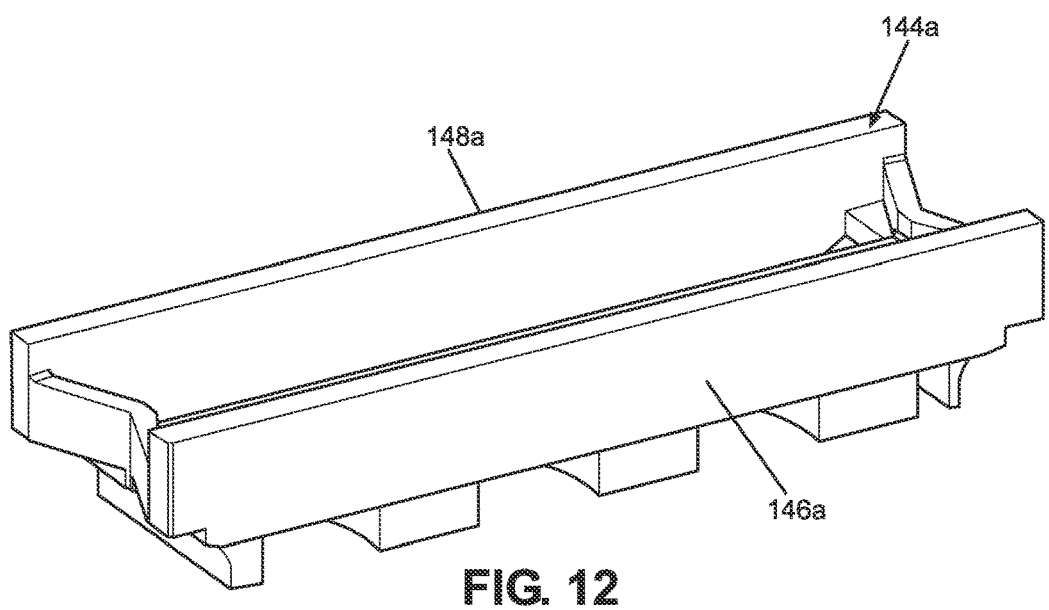
FIG. 12 is a perspective view of a sealant containment portion of the sealing module of FIG. 10.
Figure 13:
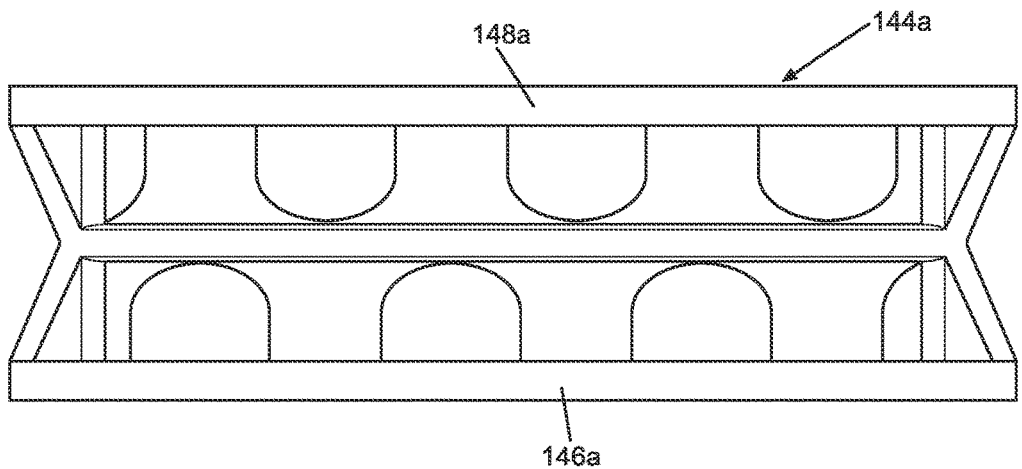
FIG. 13 is a top plan view of the sealant containment portion of FIG. 12.
Figure 14:
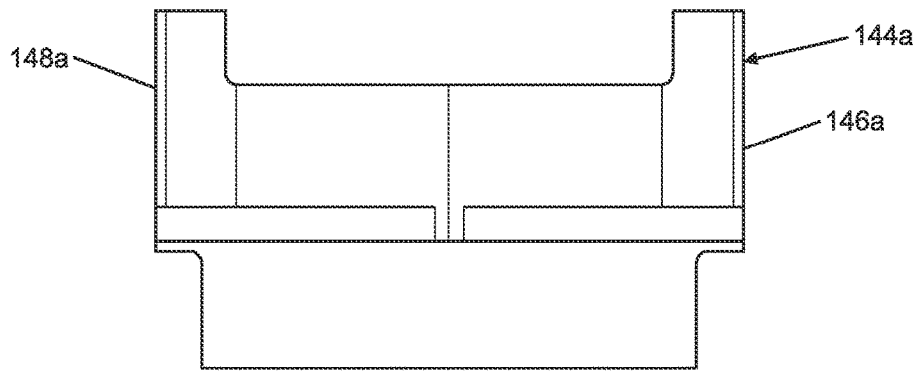
FIG. 14 is an end view of the sealant containment portion of FIG. 12.

FIG. 11 shows the sealing portion 142*a* in isolation from the containment portion 144, and FIGS. 12-14 show the containment portion 144*a* in isolation from the sealing portion 142*a*. The containment portion 144*a* includes major walls 146*a*, 148*a* located at opposite axial end faces of the sealing portion 142*a*. It will be appreciated that the sealing module 140*a* has the same basic construction as the sealing module 140, except the walls 146*a*, 148*a* but provide a substantially smaller face coverage area as compared to the walls 146, 148 of the sealing module 140. In the depicted examples, the walls 146*a*, 148*a* cover less than 75% of the axial end face surface area of the sealing portion 142*a*. In one example, walls 146*a*, 148*a* cover less than 60% of the surface area of the axial end faces of the sealing portion 142*a*, or in the range of 30%-60% of the surface area of the axial end faces of the sealing portion 142*a*.

Figure 15:
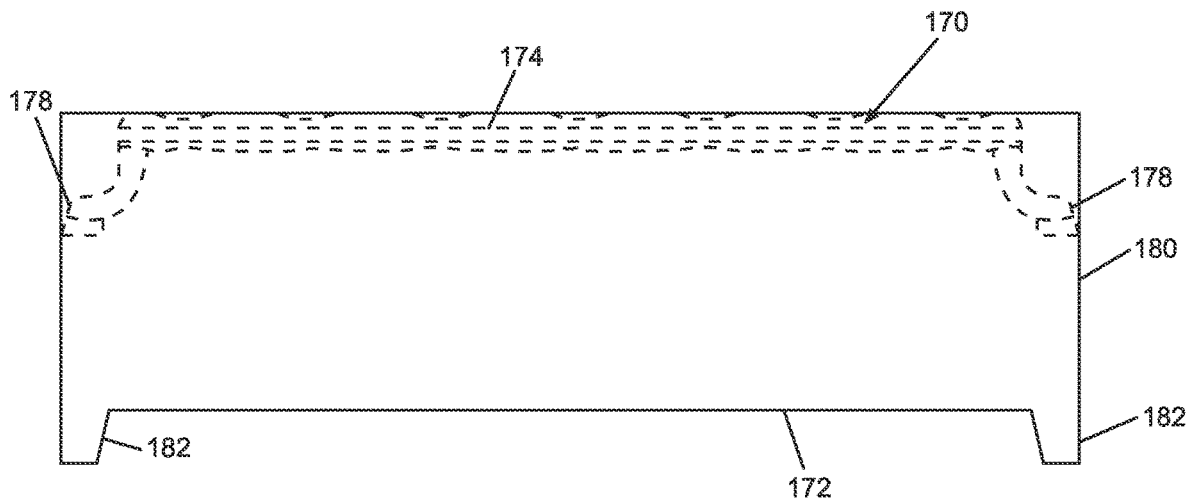
FIG. 15 is a front view of another cable sealing module in accordance with the principles of the present disclosure that can be incorporated into cable sealing arrangements such as those shown in the examples of FIG. 1-4, 54 or 57.
Figure 16:
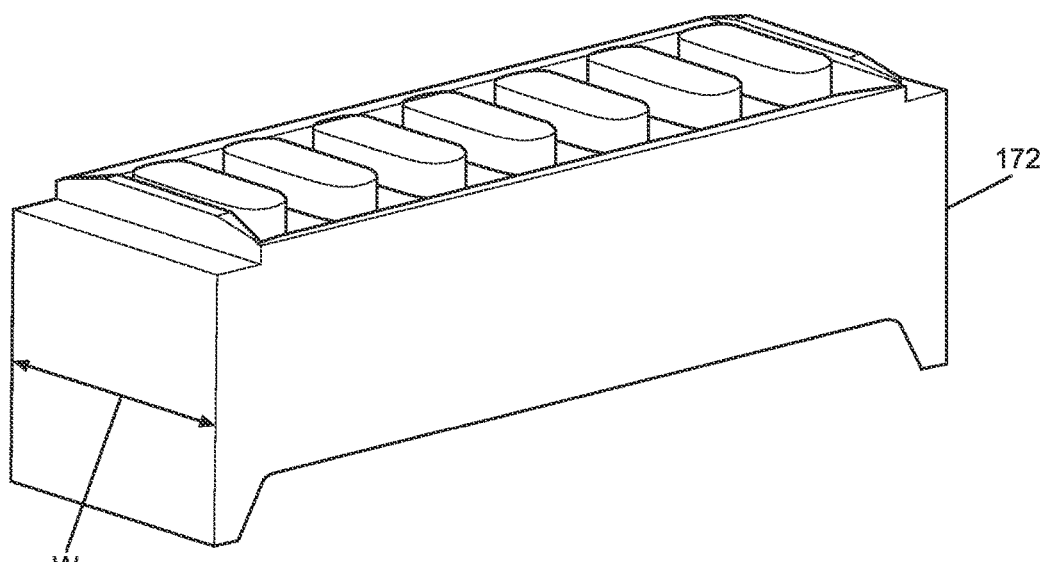
FIG. 16 is a perspective view of a sealant portion of the cable sealing module of FIG. 15.
Figure 17:
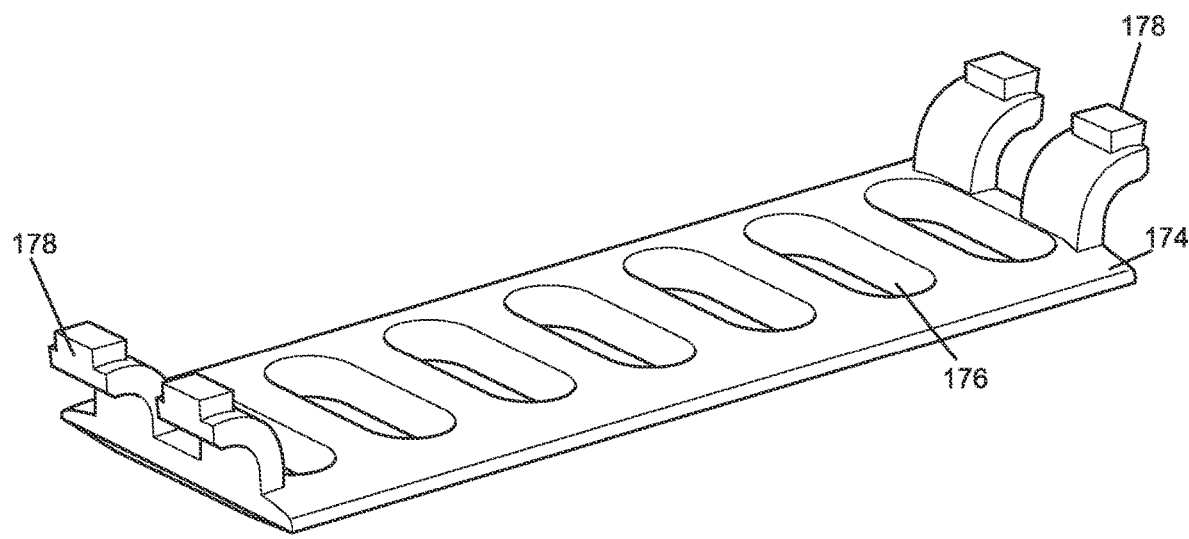
FIG. 17 is a perspective view of a carrier frame of the cable sealing module of FIG. 15.

FIG. 15 depicts another cable sealing module 170 in accordance with the principles of the present disclosure. It will be appreciated that the cable sealing module 170 can be utilized as the cable sealing modules 30, 32 of the sealing arrangement 22 or as the cable sealing modules 130, 132 of the sealing arrangement 122. The cable sealing module 170 includes a sealing portion 172 (see FIG. 16) molded over a carrier frame 174 (see FIG. 17). In certain examples, the sealing portion 172 can have an elastomeric construction of the type previously described, and the carrier frame 174 can have a pre-molded plastic construction. The carrier frame 174 is encased within the sealing portion 172 and includes openings 176 through which the sealing portion 172 is molded. The carrier frame 174 include end tabs 178 for securing the cable sealing module 170 within a housing of a telecommunication enclosure (e.g., within a cover or base). The sealing portion 172 includes a main body 180 and also includes sealing ears 182 that project outwardly from the main body 180 adjacent opposite ends of the sealing portion 172. The ears 182 extend across a width w of the sealing portion 172 between opposite axial end faces of the sealing portion. The ears 182 can have a tapered configuration that widens as the ears extend toward the main body 180. In one example, the ears 182 have a truncated triangular shape when viewed from a perspective along the cable pass-through orientation of the module. In certain examples, the sealing module 170 can also include a containment portion at least partially covering the axial end faces and at least partially embedded within the sealing portion 172. The containment portion can be harder than the sealing portion 172 and softer than the frame 174.

Figure 18:
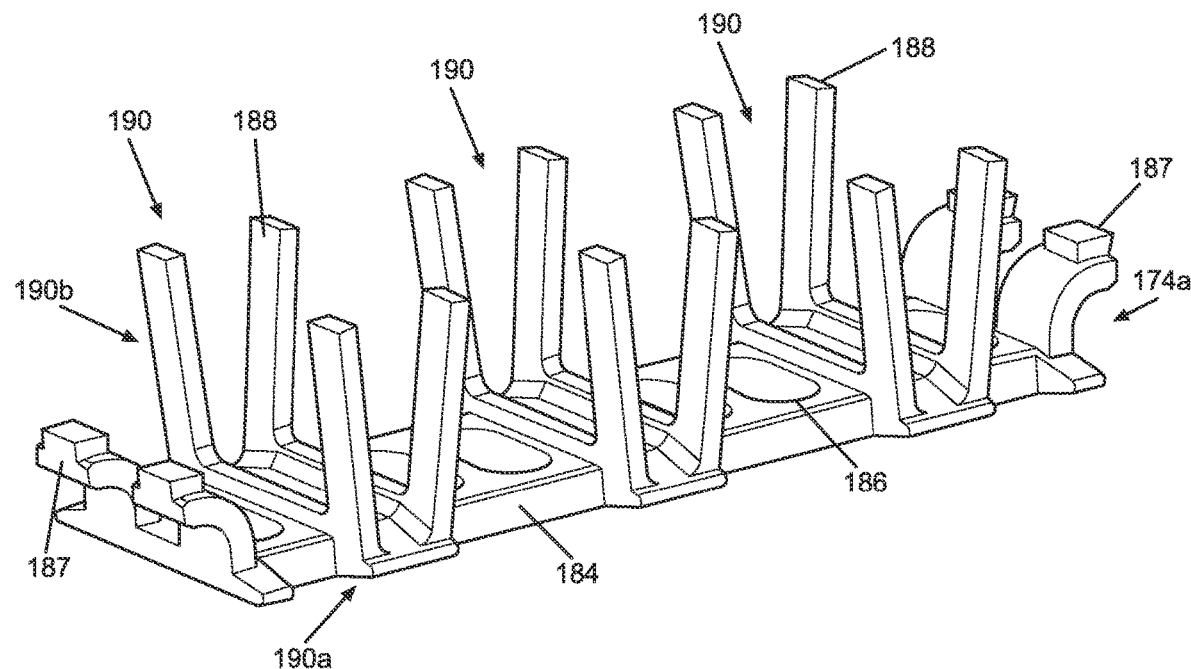
FIG. 18 is a perspective view of an alternate carrier frame that can be used with cable sealing modules in accordance with the principles of the present disclosure.
Figure 19:
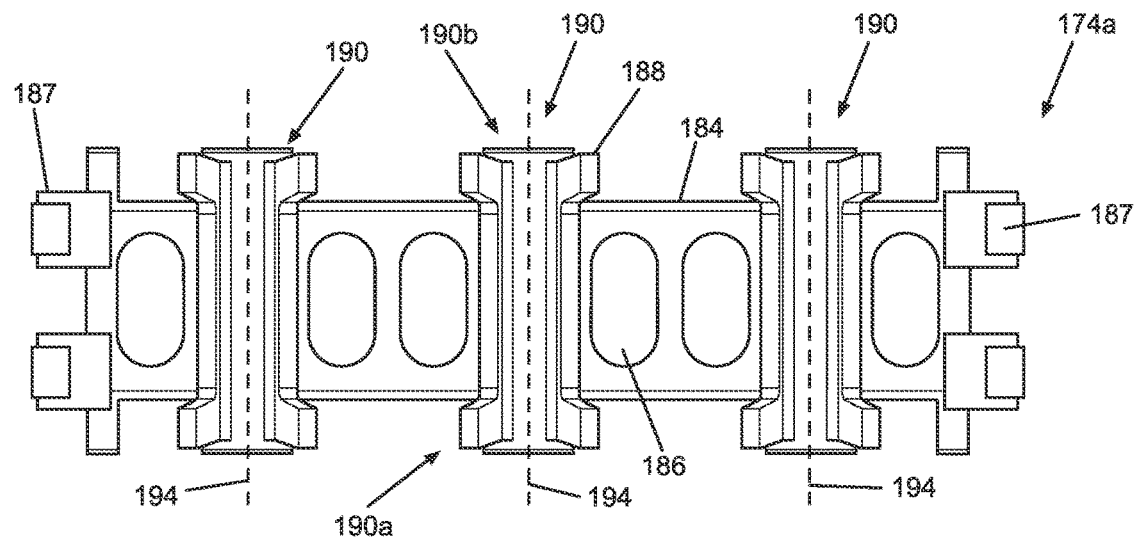
FIG. 19 is a top, plan view of the carrier frame of FIG. 18.
Figure 20:
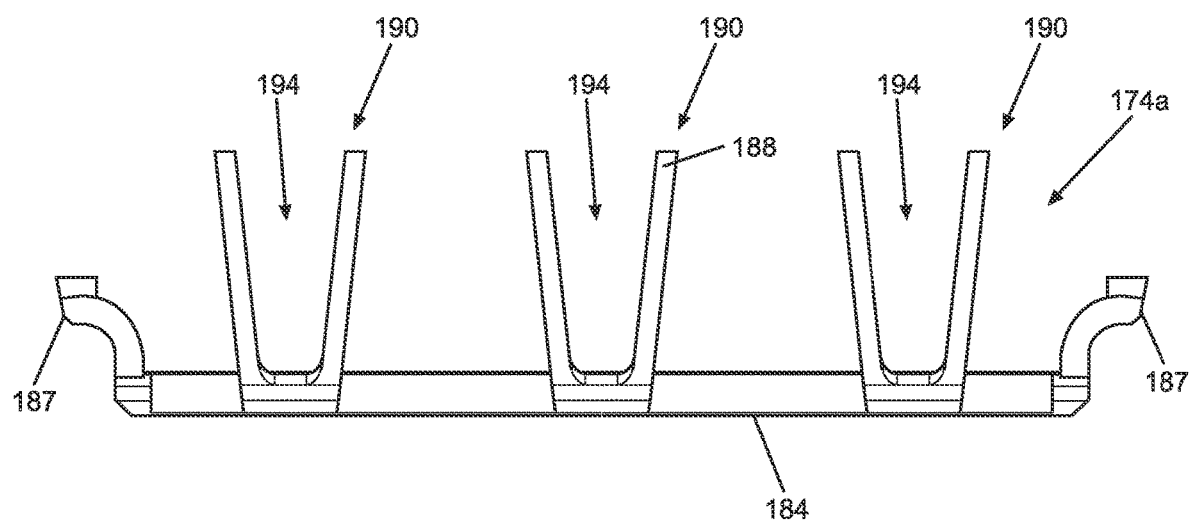
FIG. 20 is a front view of the carrier frame of FIG. 18.
Figure 21:
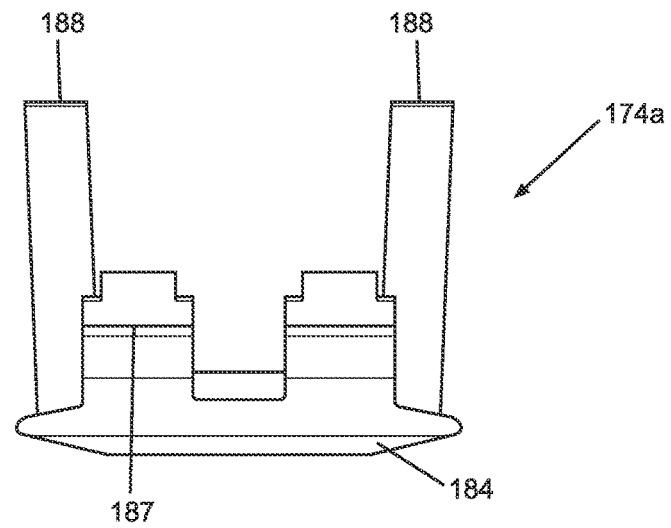
FIG. 21 is an end view of the carrier frame of FIG. 18.

FIGS. 18-21 depict another carrier frame 174*a* that can be incorporated into the cable sealing module 170 or the cable sealing modules 140, 140*a*. The carrier frame 174*a* includes a base 184 defining openings 186 through which the cable sealing portion of a cable sealing module can be molded. The carrier frame 182*a* is preferably encased within the sealing portion. End tabs 187 are provided at opposite ends of the carrier frame 182 for snapping the sealing module into a corresponding housing of a telecommunications enclosure. The carrier frame 174*a* preferably includes a molded plastic construction and includes fingers 188 that are arranged in sets 190 corresponding to cable pass-through locations. Each cable pass-through location includes a first finger set 190*a* adapted to be positioned adjacent to one axial end face of the cable sealing portion and a second finger set 190*b* adapted to be positioned adjacent to the opposite axial face of the cable sealing portion. The fingers 188 are preferably embedded within the sealing portion adjacent the axial end faces. Two sets 190*a*, 190*b* of fingers 188 correspond to each cable pass-through location. The cable pass-through locations are indicated at FIG. 18 by cable pass-through axes 194. In the depicted example, three cable pass-through locations are provided.

Referring still to FIG. 18, the fingers 188 of each set 190 converge as they extend toward the base 184 and are arranged in a generally V-shaped configuration with each pair of fingers straddling the cable pass-through axis 194 corresponding to its defined cable pass-through location. It will be appreciated that the wider dimension defined each set 190 of fingers 188 is positioned adjacent to the cable sealing surface of the sealing module. It will be appreciated that the fingers can have an elastic configuration, and can be constructed of a plastic material harder than the cable sealing portion and optional cable containment portion of their corresponding cable sealing module. When a cable is sealed between two sealing modules, the fingers 188 of a given finger set 190 flex apart as the sealing portion deforms to accommodate the cable. Once deflected, the fingers 188 have internal spring bias that urges the fingers 188 back toward their initial non-deflected state (e.g., neutral state, at rest state) which corresponds to the non-deformed state of the sealing portion. The spring bias of the fingers 188 is adapted to assist in moving the sealing portion from the deformed state back to the non-deformed state when the cable is removed from the sealing module, thereby reducing the recovery time of the sealing portion.

Figure 22:
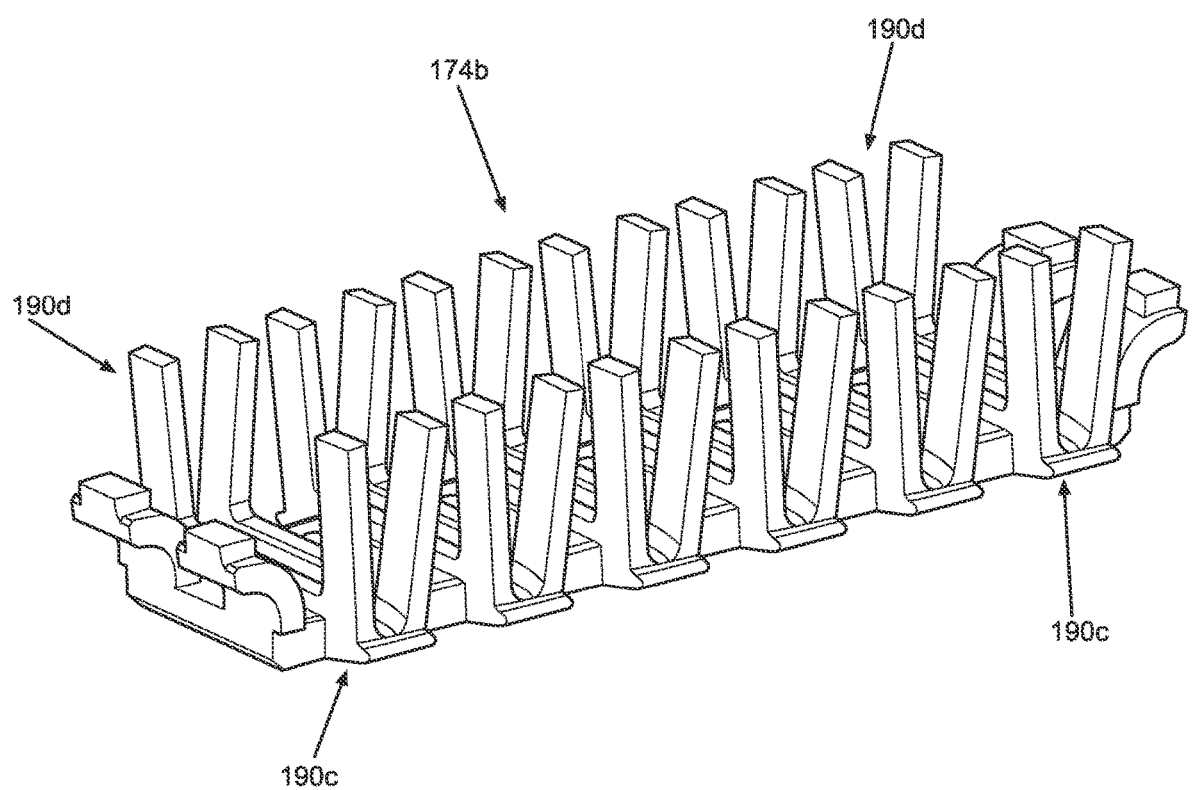
FIG. 22 is a perspective view of another carrier frame that can be integrated within cable sealing modules in accordance with the principles of the present disclosure.

FIG. 22 shows another carrier frame 174*b* in accordance with the principle so of the present disclosure. The carrier frame 174*b* has the same basic construction as the carrier frame 174*a*, except the carrier frame 174*n* includes a larger number of smaller finger sets 190*c*, 190*d*. The finger sets 190*c*, 190*d* are adapted for accommodating smaller cables than the finger sets 190*a*, 190*b*.

Figure 23:
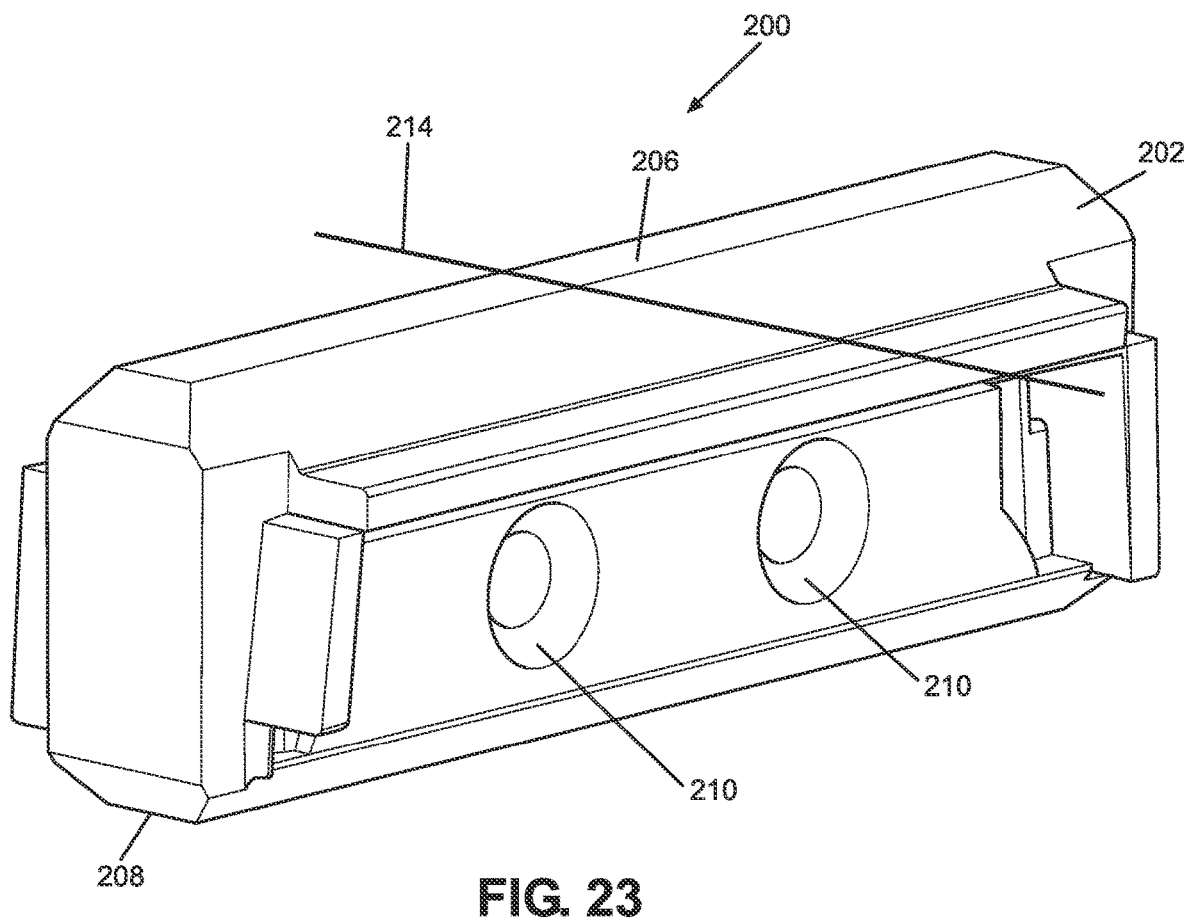
FIG. 23 is a perspective view of a further cable sealing module in accordance with the principles of the present disclosure that can be incorporated into cable sealing arrangements such as those shown in the examples of FIG. 1-4, 54 or 57.
Figure 24:
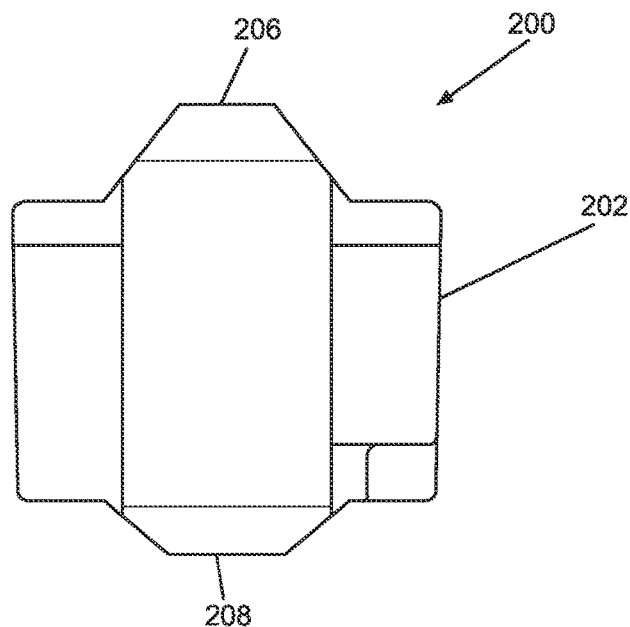
FIG. 24 is an end view of the cable sealing module of FIG. 23.
Figure 25:
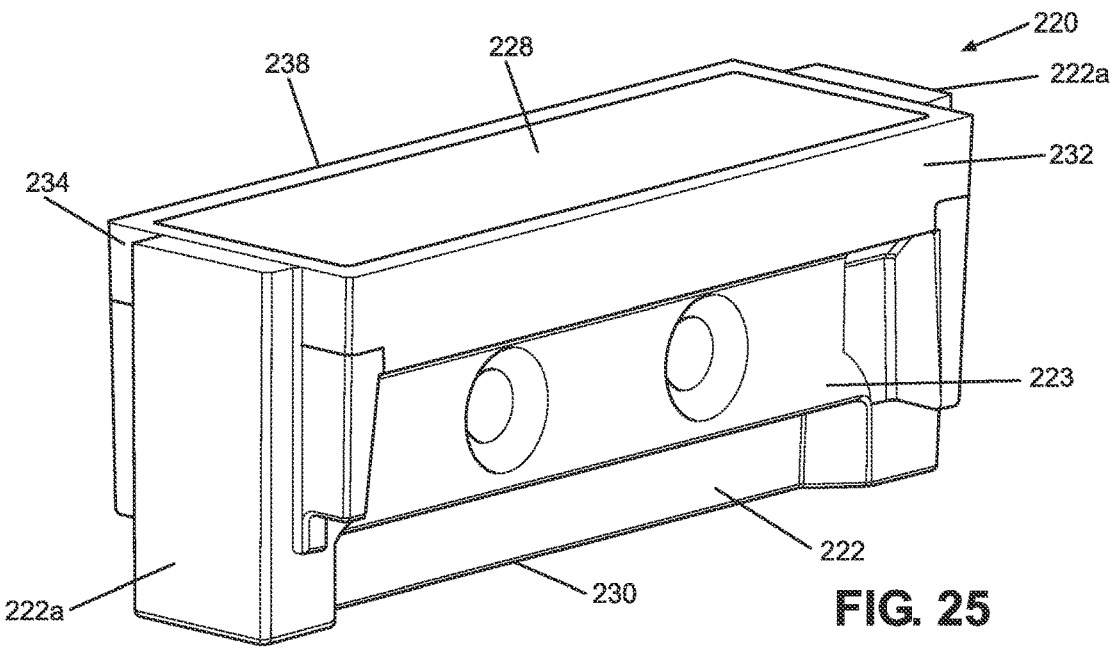
FIG. 25 is a perspective view of still another cable sealing module in accordance with the principles of the present disclosure that can be incorporated into cable sealing arrangements such as those shown in the examples of FIG. 1-4, 54, or 57.

FIGS. 23 and 24 depict another sealing module 200 in accordance with the principles of the present disclosure. It will be appreciated that the sealing module 200 can be incorporated into the sealing arrangement 122 of the telecommunications enclosure 120 as the middle module 133. In the depicted example, the sealing module 200 includes a sealing portion 202 having an elastomeric construction of the type previously described, which is over-molded over a plastic carrier frame 204 (see FIG. 39). In alternative examples, sealing module 200 can also include also include a containment portion of the type previously described.

It will be appreciated that the sealing module 200 includes oppositely positioned cable sealing surfaces 206, 208 that extend along the length of the sealing module 200. Central openings 210 through the sealing module 200 are adapted for receiving axial connection links 211 of a containment frame of a telecommunication enclosure (e.g., see links 211 of containment frame 213 shown at FIG. 57). The sealing portion 202 has a chamfered configuration adjacent the cable sealing surfaces 206, 208 for reducing the width dimension of the cable sealing surfaces 206, 208 along a cable pass-through orientation 214. The chamfered configuration is depicted as including a truncated triangular profile when cut along a vertical plane parallel to the cable pass-through orientation 214. The tapered configuration reduces the thickness of the sealing portion 202 at the cable sealing surfaces 206, 208 in an orientation along the cable pass-through orientation 214 which allows for the cable sealing portion 202 to more readily and easily deform at the cable sealing surfaces 206, 208 to accommodate different sized cables. It will be appreciated that corresponding chamfered configurations can be provided by the upper and lower sealing modules (e.g., sealing modules 130, 132) that oppose the cable sealing surfaces 206, 208 when the sealing arrangement is installed within a telecommunication enclosure.

Figure 26:
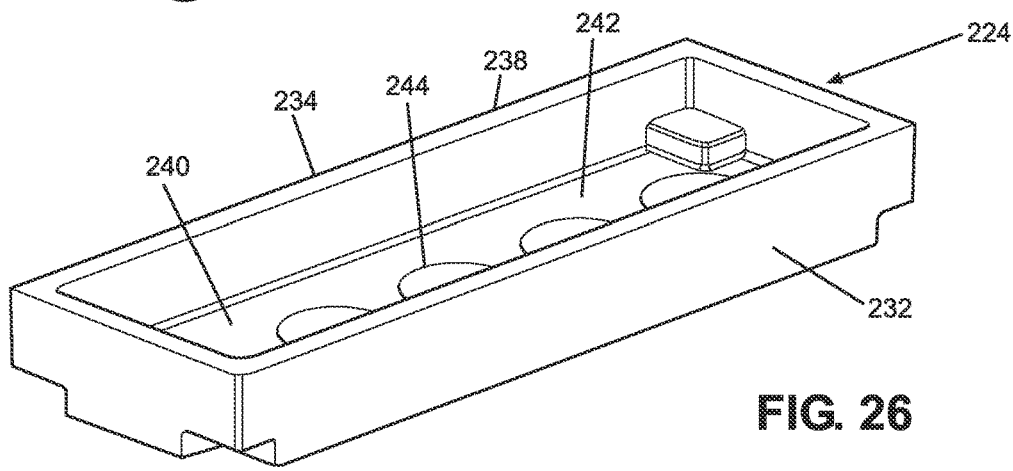
FIG. 26 is a perspective view of a sealant containment portion of the cable sealing module of FIG. 25.
Figure 27:
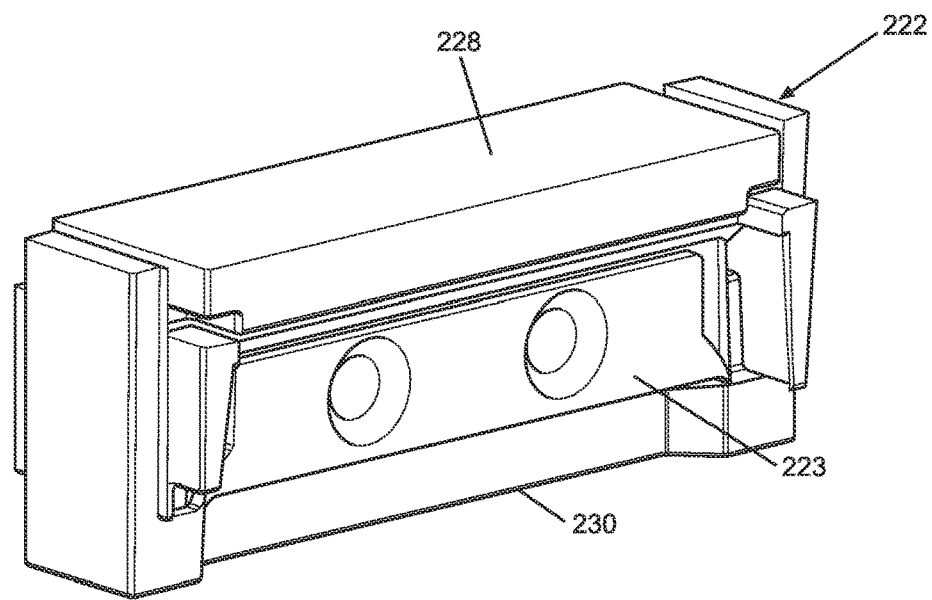
FIG. 27 is a perspective view of a sealant portion and carrier frame of the cable sealing module of FIG. 25.
Figure 28:
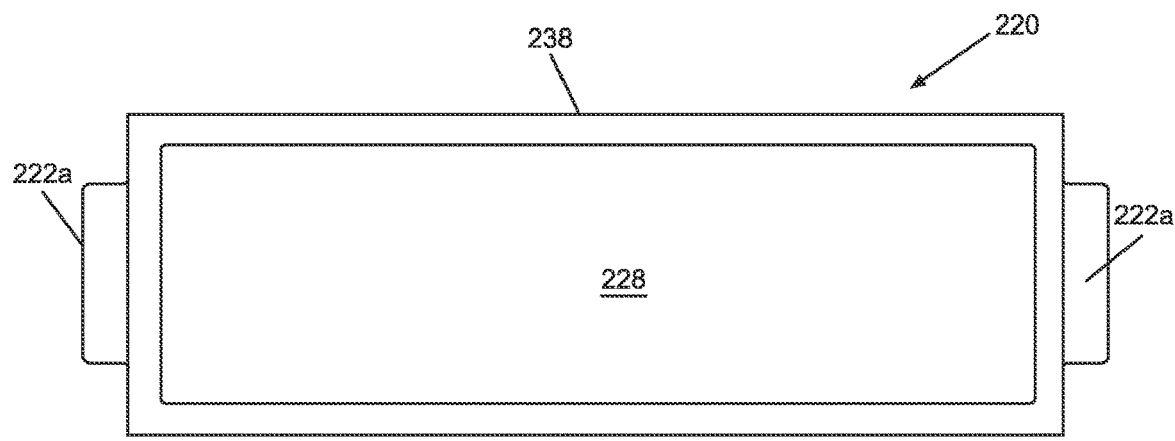
FIG. 28 is a top, plan view of the sealing module of FIG. 25.
Figure 29:
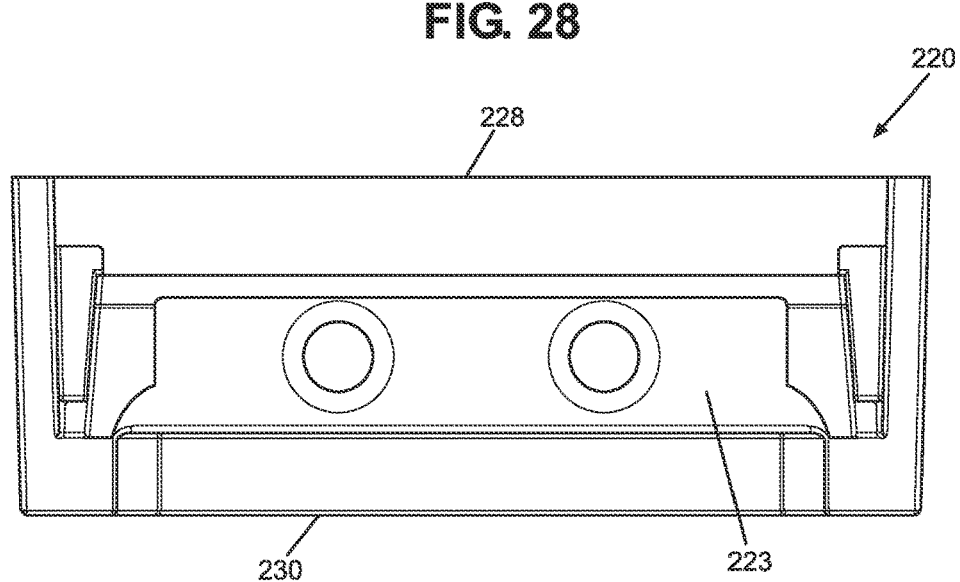
FIG. 29 is a front view of the sealing module of FIG. 25.
Figure 30:
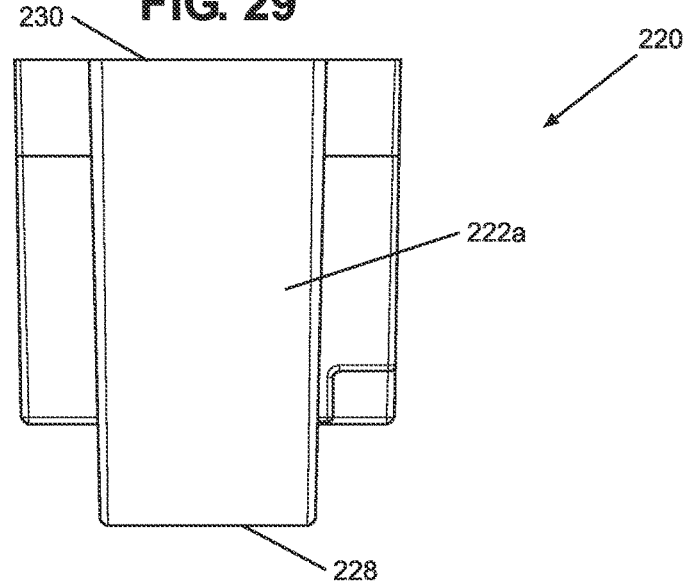
FIG. 30 is an end view of the sealing module of FIG. 25.
Figure 31:
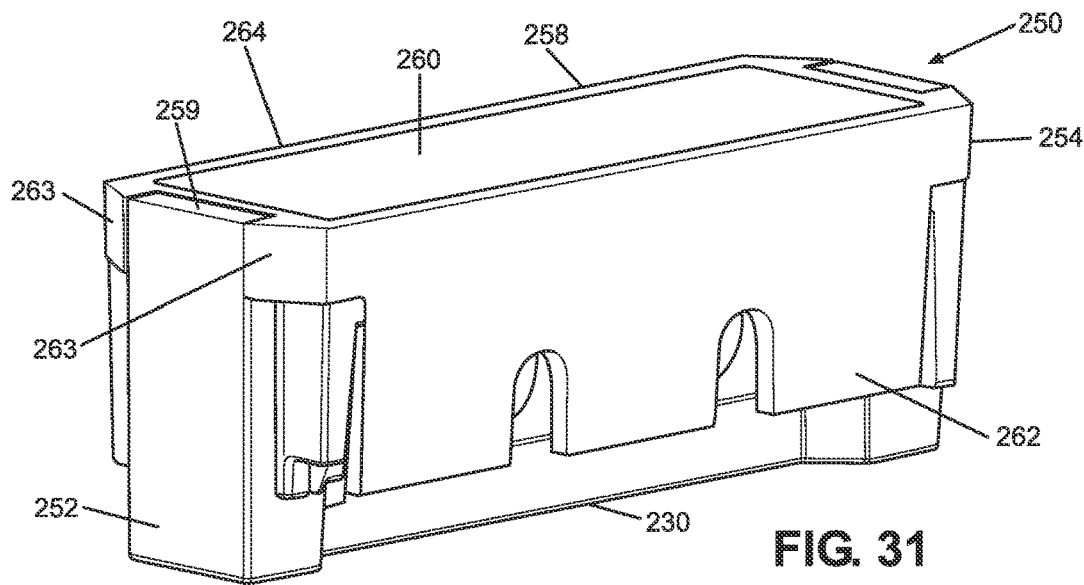
FIG. 31 is a perspective view of another sealing module in accordance with the principles of the present disclosure that can be incorporated into cable sealing arrangements such as those shown in the examples of FIG. 1-4, 54 or 57.
Figure 32:
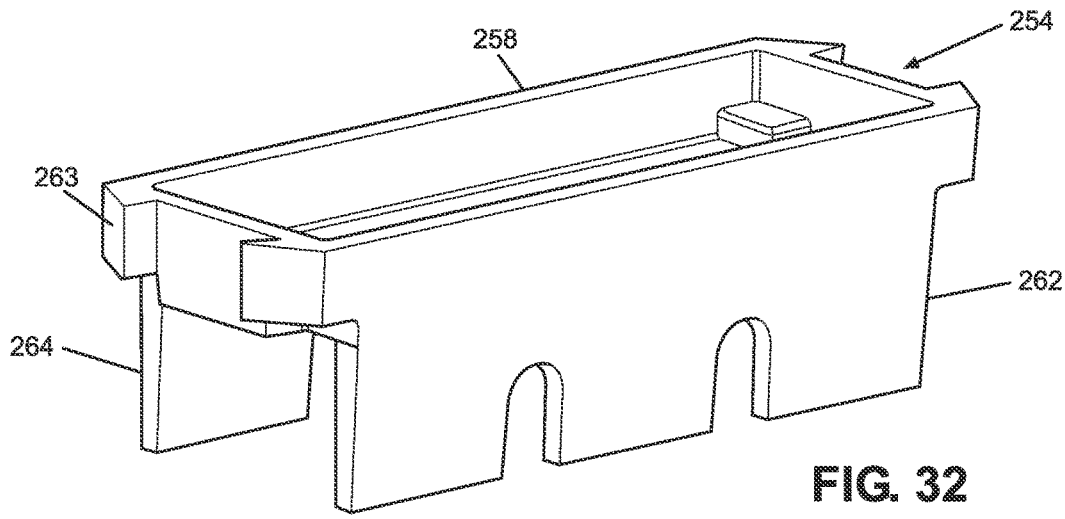
FIG. 32 is a perspective view of a sealant containment portion of the cable sealing module of FIG. 31.
Figure 33:
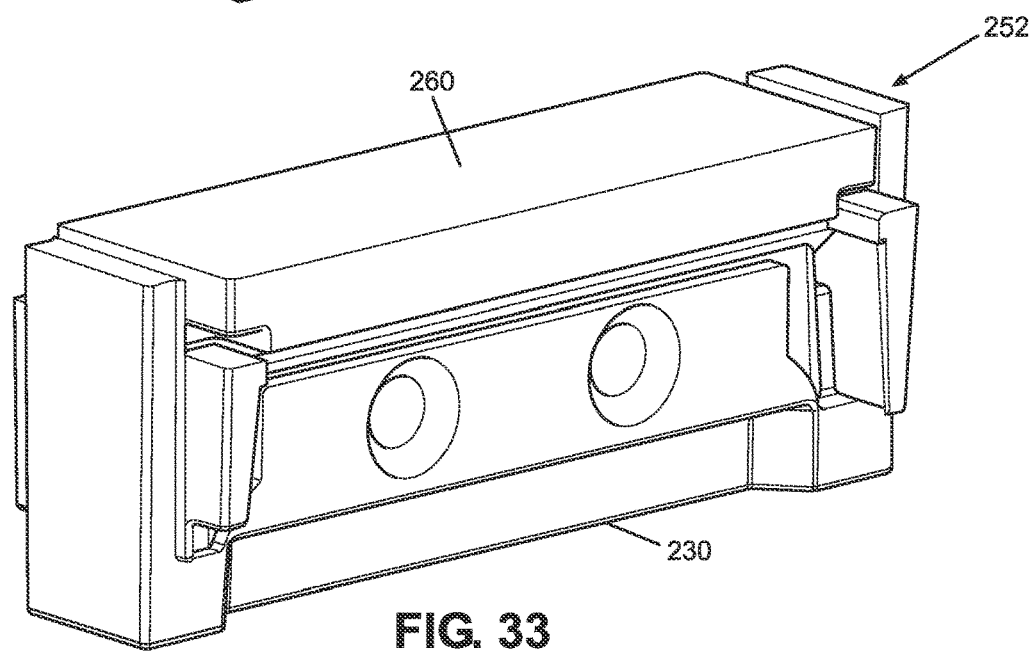
FIG. 33 is a perspective view of a sealant portion and carrier frame of the cable sealing module of FIG. 31.
Figure 34:
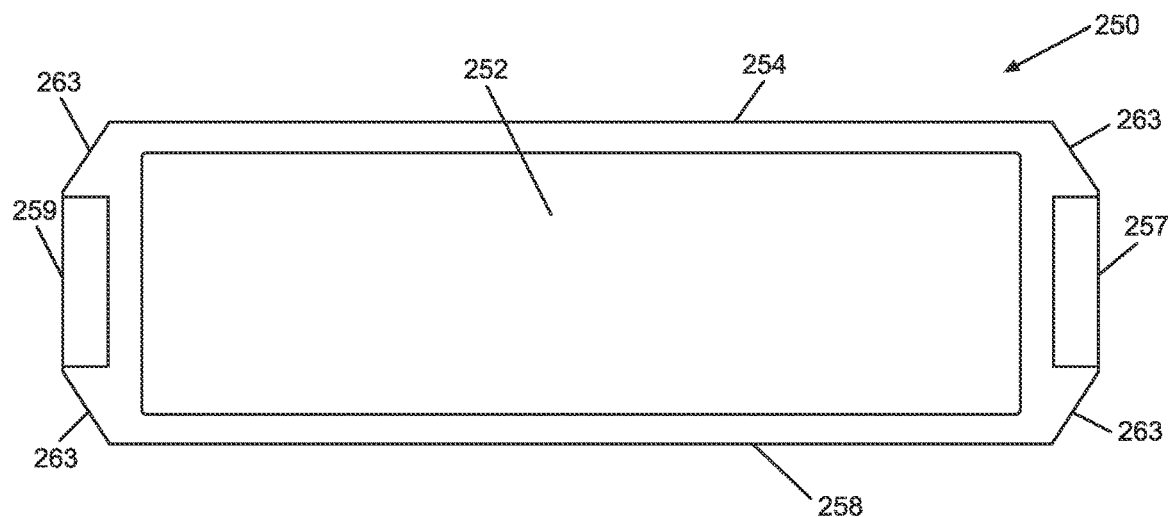
FIG. 34 is a top, plan view of the cable sealing module of FIG. 31.
Figure 35:
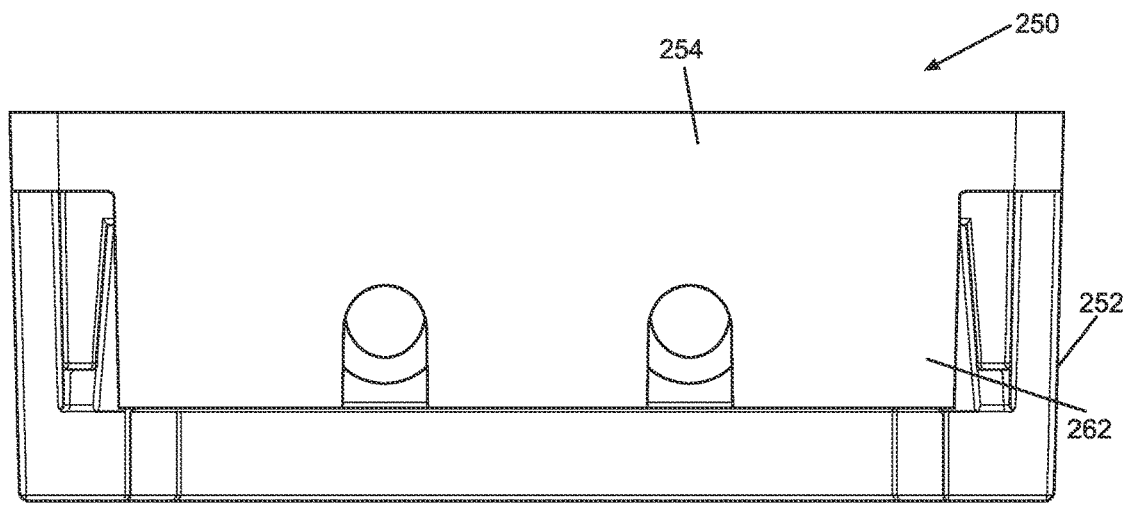
FIG. 35 is a front view of the cable sealing module of FIG. 31.
Figure 36:
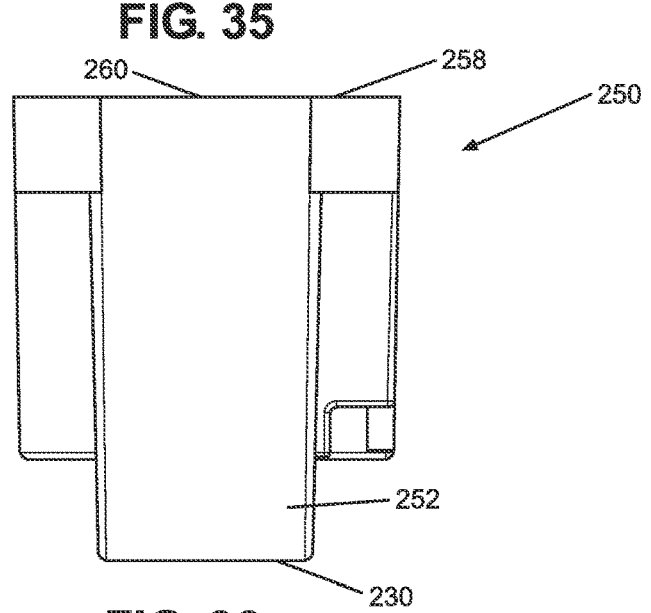
FIG. 36 is an end view of the cable sealing module of FIG. 31.

FIGS. 25 and 28-30 depict another cable sealing module 220 in accordance with the principles of the present disclosure. It will be appreciated that the cable sealing module 220 can be incorporated into the sealing arrangement 122 of the telecommunication enclosure 120 as the middle sealing module 133. The cable sealing module 220 includes a sealing portion 222 (see FIG. 27) a containment portion 224 (see FIG. 26) and a carrier frame 226 (see FIG. 39). It will be appreciated that the sealing portion 222 and the containment portion 224 can each have an elastomeric composition and can have material properties and chemical compositions of the type previously described. The carrier frame 226 can have a molded plastic construction and can be embedded within the sealing portion 222 which preferably is overmolded over the carrier frame 226. The sealing portion 222 is preferably molded in and over at least portions of the containment portion 224. In a preferred example, the containment portion 224 is harder than the sealing portion 222, and the carrier frame 226 is harder than the containment portion 224.

The sealing portion 222 defines opposite cable sealing surfaces 228, 230 adapted to be positioned at cable pass-through interfaces. The containment portion 224 includes opposite walls 232, 234 positioned adjacent the cable sealing surface 228. Walls 232, 234 cover portions of axial end faces of the sealing portion 222. In the depicted example, walls 232, 234 cover less than 50% of each of the axial end faces of the sealing portion 222, or in the range of 15-40% of each of the axial end faces of the sealing portion 222. The containment portion 224 also includes a perimeter frame 238, defined in part by the walls 232, 234 that extends about a perimeter of the cable sealing module 220. Portions 222a of the sealing portion 222 are positioned outside the perimeter frame 238 on opposite ends of the cable sealing module 220. The containment portion 224 defines an interior cavity 240 surrounded by the frame 238. A bottom of the interior cavity 240 is defined by a base 242 defining openings 244 through which the sealing portion 222 is molded. The sealing portion 222 also fills the internal cavity 240 defined by the perimeter frame 238. The sealing portion 222 also includes a lower portion 223 positioned below the base 242. The lower portion 223 corresponds to a majority of the volume of the sealing portion 222. The lower portion 223 defines openings 225 through which axial support links of a containment frame (e.g., frame 213) can be received. In one example, the sealing portion 222 is molded over the axial support links.

FIGS. 31 and 34-36 disclose another cable sealing module 250 in accordance with the principles of the present disclosure. The cable sealing module 250 can be incorporated within the sealing arrangement 122 of the telecommunications enclosure 120 as the middle cable sealing module 133. The cable sealing module 250 includes a sealing portion 252, a containment portion 254 and the carrier frame 226. Cable sealing surfaces 258, 260 are provided at opposite sides of the cable sealing module 250. The containment portion 254 includes containment walls 262, 264 adapted to cover at least 60%, or at least 75% of a surface area of each of the axial end faces of the sealing portion 252. The containment portion 254 includes a perimeter frame 258 having angled projections 263 at corners of the frame 258. The angled projections 263 define a central channel 259 therein between in which at least a section of an end sealing section 261 of the sealing portion 222 is provided. The containment portion 254 can be harder than the sealing portion 252, and the carrier frame 226 can be harder than the containment portion 254.

Figure 37:
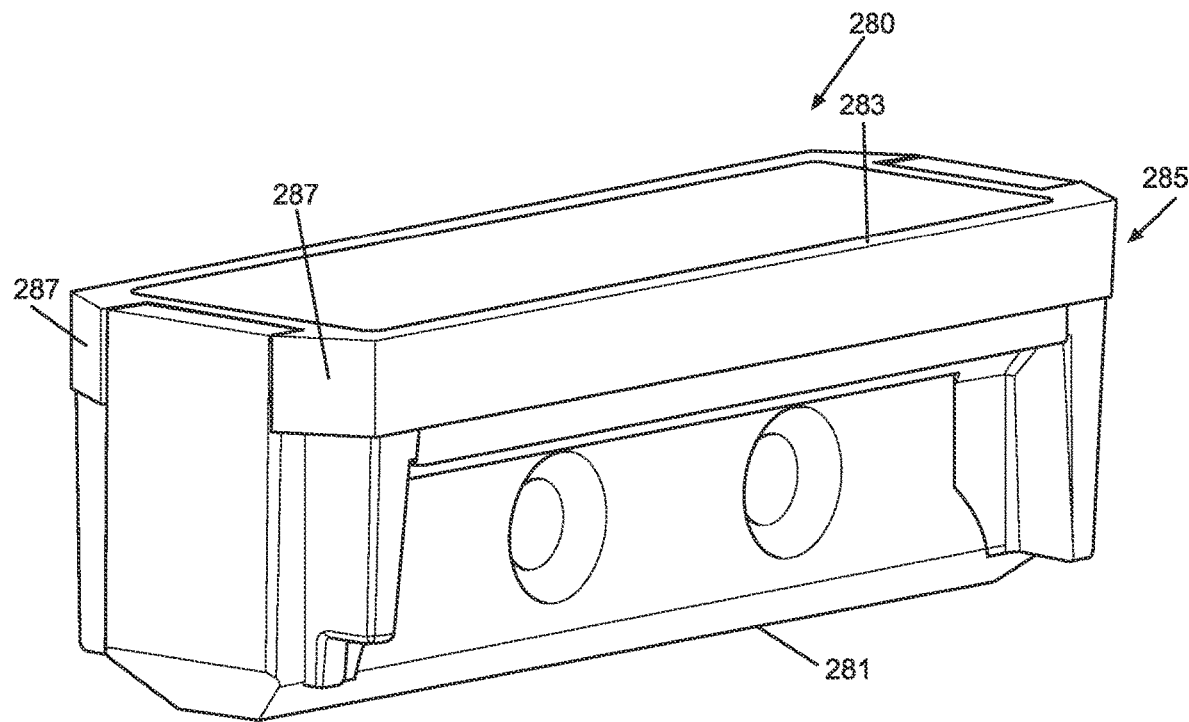
FIG. 37 is a perspective view of still another cable sealing module in accordance with the principles of the present disclosure that can be incorporated into cable sealing arrangements such as those shown in the examples of FIG. 1-4,-54, or 57.
Figure 38:
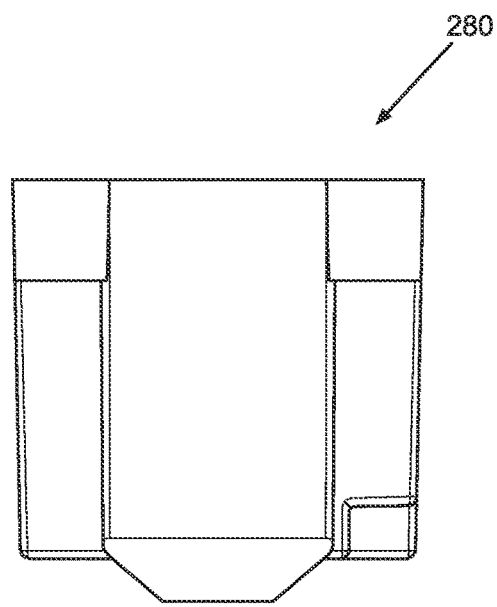
FIG. 38 is an end view of the cable sealing module of FIG. 37.

FIGS. 37 and 38 depict a further cable sealing module 280 having the same basic construction as the cable sealing module 220, except a lower cable sealing surface 281 has a chamfered configuration and a perimeter frame 283 of a containment portion 285 has angled projections 287 at its corners.

Figure 39:
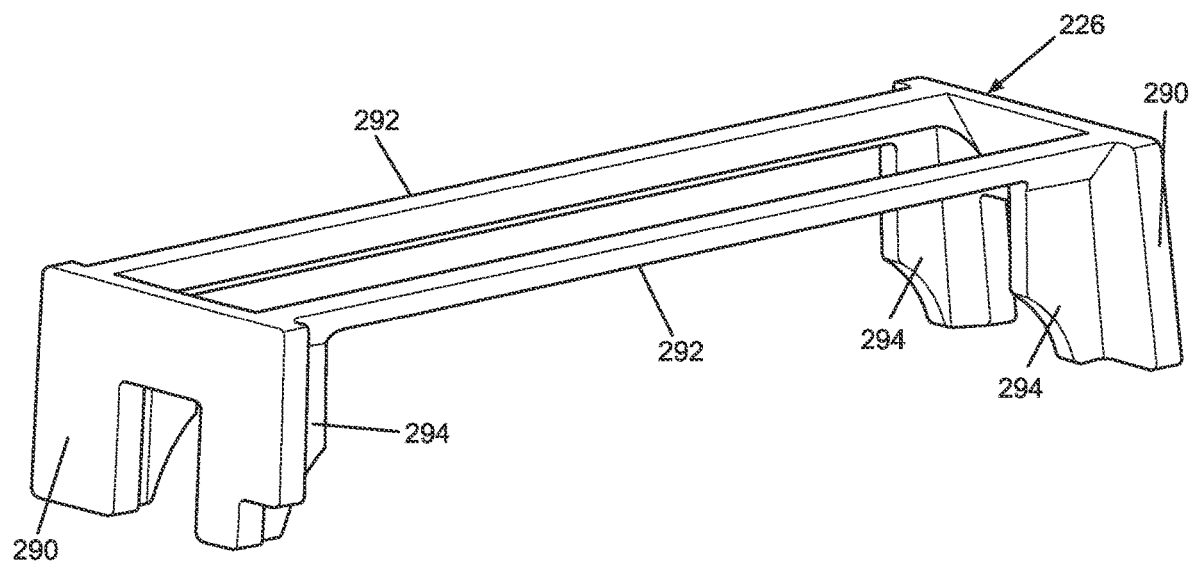
FIG. 39 is a perspective view of an example carrier frame that can be integrated in the cable sealing modules of FIGS. 23-38.
Figure 40:
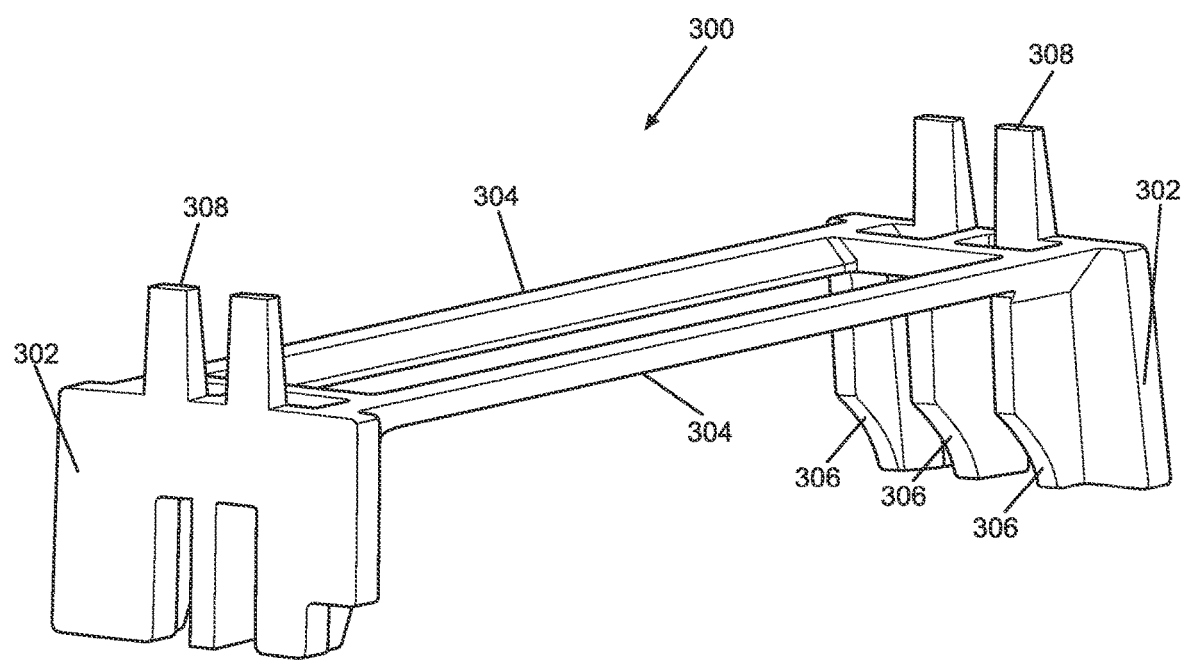
FIG. 40 is a perspective view of another carrier frame that can be integrated into the cable sealing modules of FIGS. 23-38.
Figure 41:
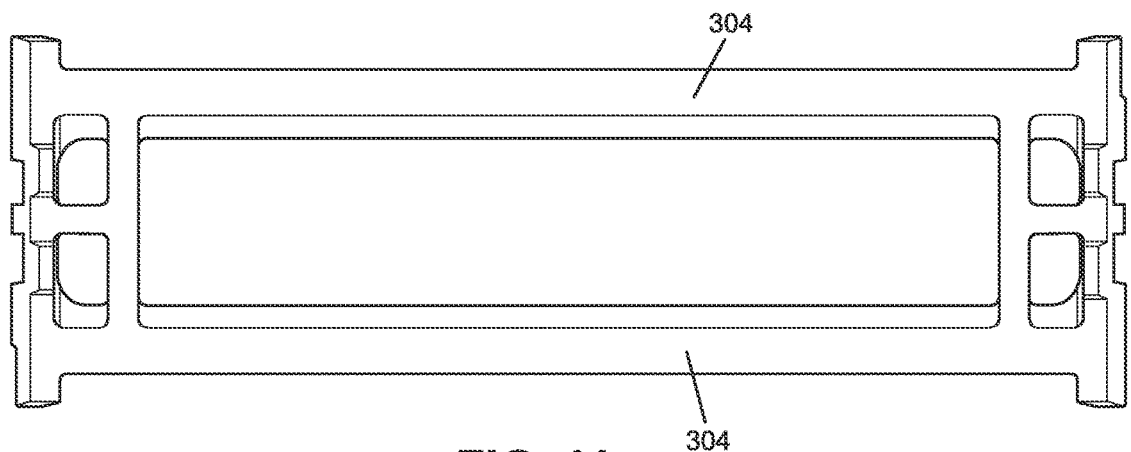
FIG. 41 is a top, plan view of the carrier frame of FIG. 40.
Figure 42:
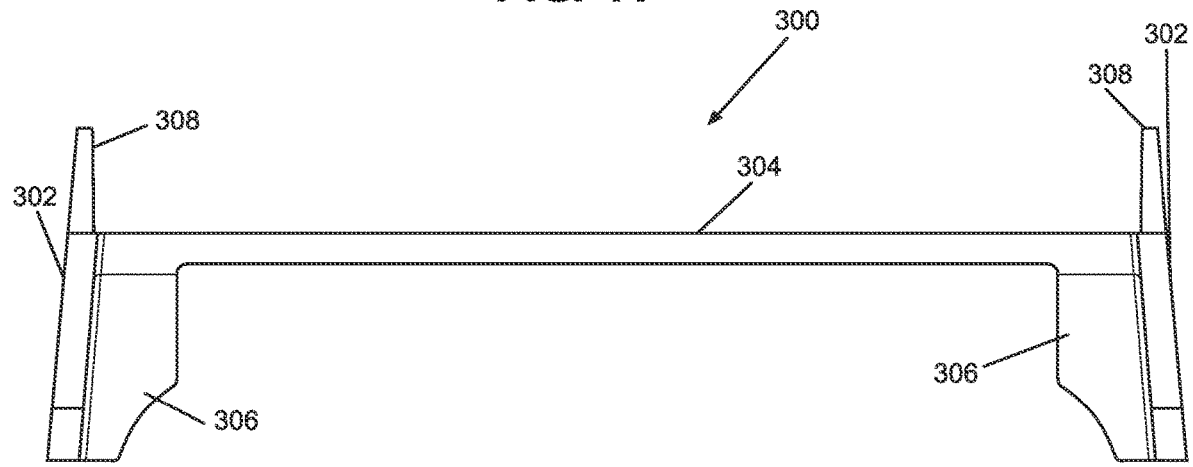
FIG. 42 is a front view of the carrier frame of FIG. 40.
Figure 43:
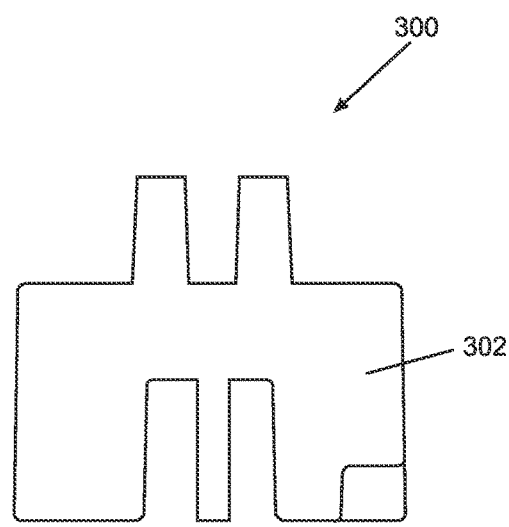
FIG. 43 is an end view of the carrier frame of FIG. 40.
Figure 44:
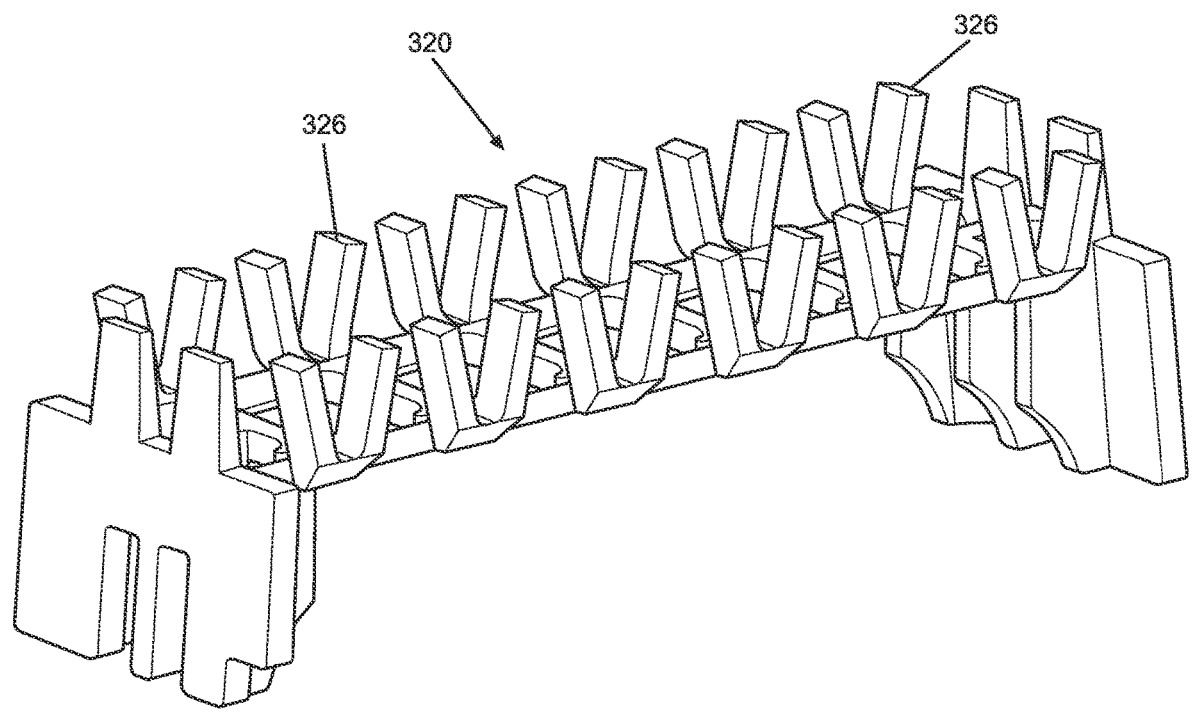
FIG. 44 is a perspective view of still another carrier frame that can be integrated into the cable sealing modules of FIGS. 23-38.
Figure 45:
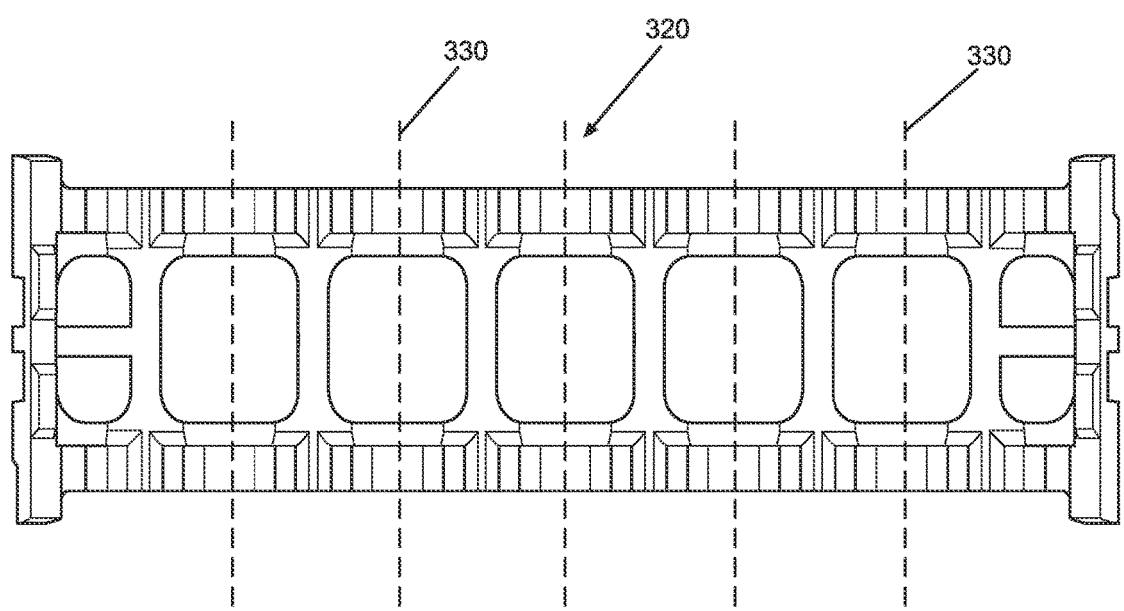
FIG. 45 is a top, plan view of the carrier frame of FIG. 44.
Figure 46:
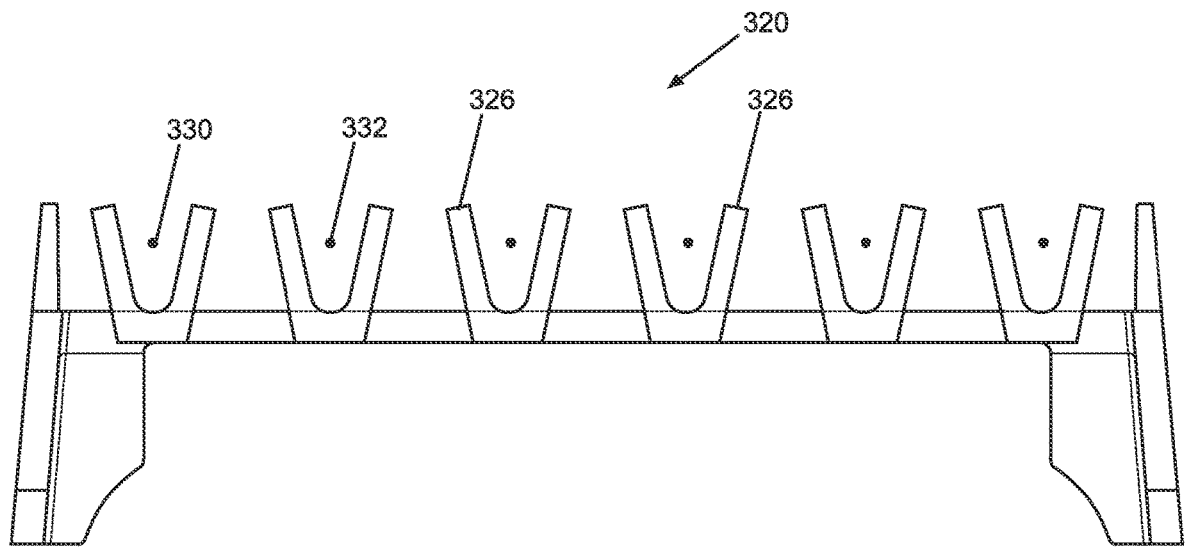
FIG. 46 is a front view of the carrier frame of FIG. 44.
Figure 47:
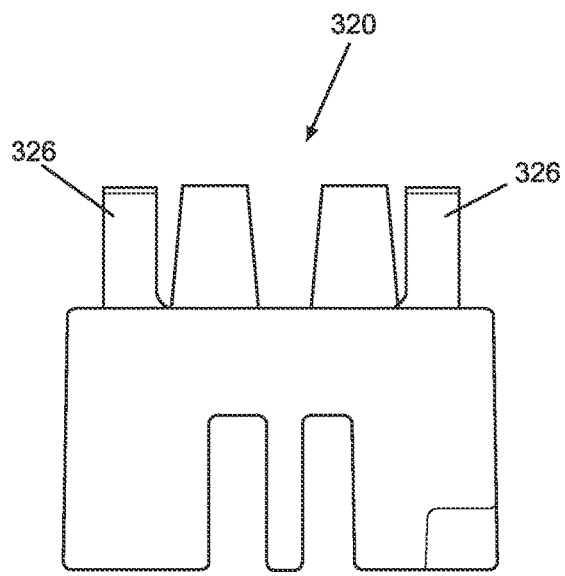
FIG. 47 is an end view of the carrier frame of FIG. 44.

FIG. 39 depicts the carrier frame 226. The carrier frame 226 includes end plates 290 interconnected by longitudinal beams 292. Ribs 294 project inwardly from the end plates 290. The end plates 290 are preferably positioned adjacent to the opposite ends of the sealing module 220 and the beams 292 preferably extend along the length of the cable sealing module 220. The ribs 294 provide reinforcement of the end plates 290 and are embedded within the sealing portion 222. It will be appreciated that a majority of the carrier frame 226 is preferably embedded and encased within the sealing module 222. FIGS. 40-43 depict another carrier frame 300 that can be incorporated within middle cable sealing modules in accordance with the principles of the present disclosure. The carrier frame 300 includes end plates 302 adapted to be positioned adjacent to opposite ends of the cable sealing module, and longitudinal beams 304 that interconnect the end plates 302. Ribs 306 project inwardly from each of the end plates 302. Tabs 308 project upwardly from top sides of the end plates 302.

FIGS. 44-47 depict another carrier frame 320 in accordance with the principles of the present disclosure. The carrier frame 320 preferably has a molded plastic construction and is adapted to be encased within middle sealing modules in accordance with the principles of the present disclosure. The carrier frame 320 has the same general design as the carrier frame 300, except resilient fingers 326 have been added corresponding to predefined cable pass-through locations indicated by axes 330. It will be appreciated that the fingers are arranged in pairs with each pair defining a tapered V-shaped configuration. The V-shaped configurations straddle their respective cable pass-through axes 330. When a cable is sealed by a sealing module including the fingers, the fingers corresponding to the cable pass-through location in which the cable is inserted flex apart to accommodate deformation of the sealing portion of the module as the sealing arrangement moves from the non-deformed state to the deformed state. The fingers preferably have a resilient construction and assist in biasing the sealing portion from the deformed state back to the non-deformed state.

Figure 48:
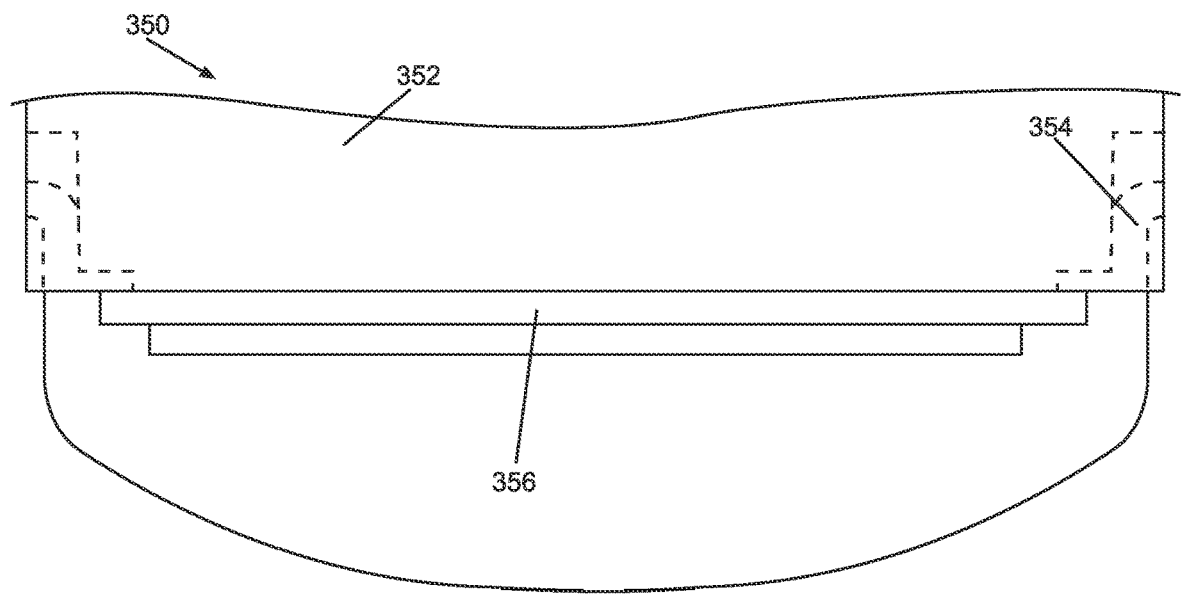
FIG. 48 depicts a cable sealing module in accordance with the principles of the present disclosure integrated with a sealant biasing arrangement in accordance with the principles of the present disclosure.

FIG. 48 depicts a further cable sealing module 350 in accordance with the principles of the present disclosure. The cable sealing module 350 includes a sealing portion 352 and a carrier frame 354 at least partially embedded within the sealing portion 352. A spring 356 such as a leaf-spring is secured to the carrier frame 354 and abuts against one side of the sealing portion 352. The carrier frame 354 defines a single opening 358 (see FIG. 49) through which the spring 356 is adapted to deflect when the sealing portion 352 is deformed as a fiber optic cable displaces a portion of the sealing portion 354 during sealing of the fiber optic cable. In certain examples, the sealing portion 352 is not required to extrude through any openings or other structures before contacting the spring 356. It will be appreciated that the cable sealing module 350 is adapted for use as one of the sealing modules 30, 32 of the sealing arrangement 22 or as one of the sealing modules 130, 132 of the sealing arrangement 122.

Figure 49:
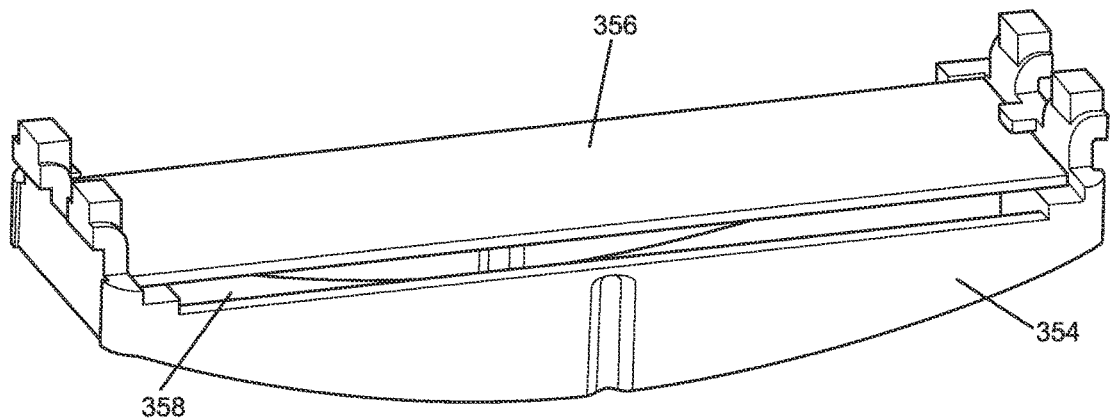
FIG. 49 is a perspective view of the sealant biasing arrangement of FIG. 48.
Figure 50:
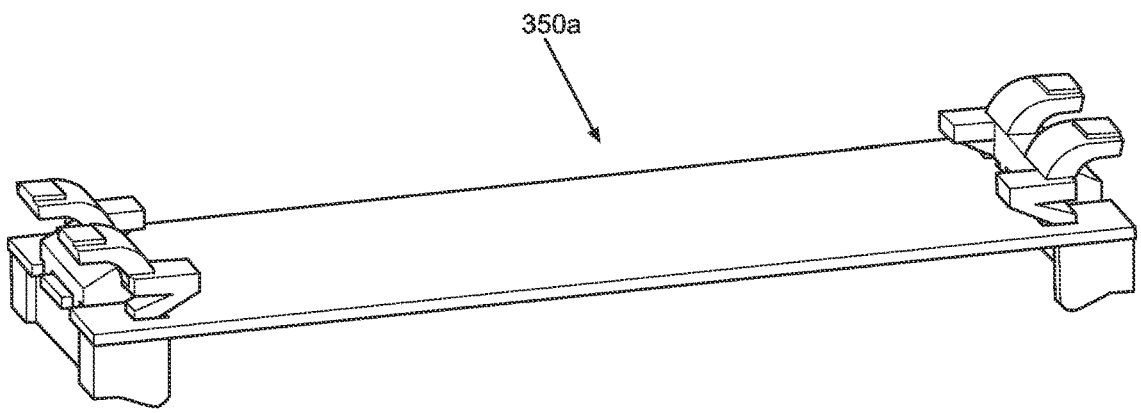
FIG. 50 is a perspective view of an alternate sealant biasing arrangement in accordance with the principles of the present disclosure.

Referring still to FIGS. 48 and 49, the lower portion of the carrier frame 354 is rounded and adapted to be received within a corresponding rounded receptacle defined by housing of the telecommunication enclosure in which the cable sealing module 350 is mounted. FIG. 50 shows an alternative configuration of a cable sealing module 350a where the rounded lower portion has been eliminated.

Figure 51:
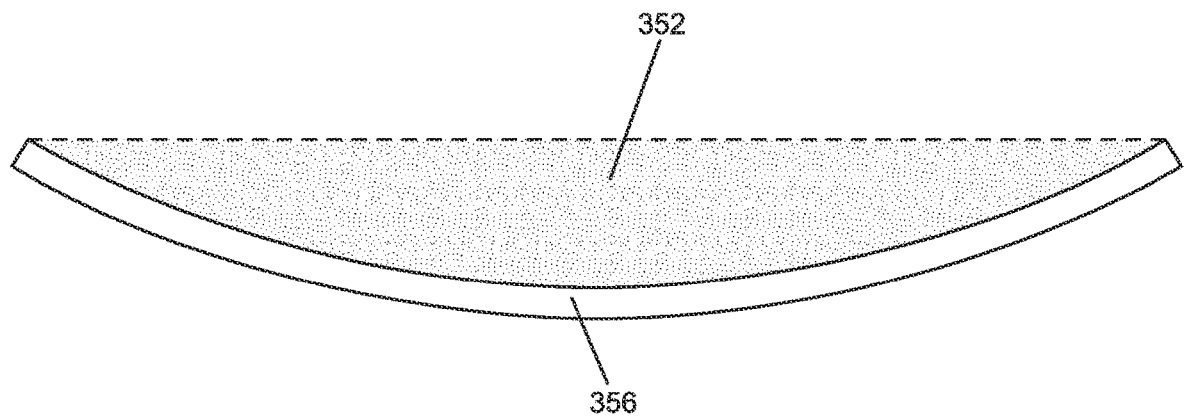
FIG. 51 schematically depicts an example flexed configuration of a sealant biasing arrangement in accordance with the principles of the present disclosure in which the biasing arrangement provides spring load to the sealant and also provides volume in which sealant displaced by one or more cables can move during sealing.
Figure 52:
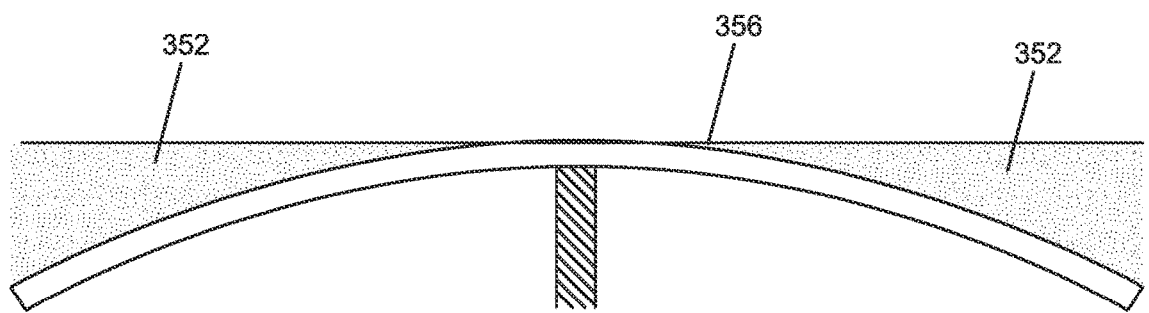
FIG. 52 depicts an alternate flexed configuration for a sealant biasing arrangement in accordance with the principles of the present disclosure.

It will be appreciated that the spring 356 flexes and applies spring load to the sealing portion 350 when a cable displaces sealant material as part of the sealing process. Thus, flexation of the spring 356 provides both pressurization of the sealing portion 352 and also provides extra volume to accommodate sealant displaced from the sealing process. FIG. 51 depicts a first flexing configuration where maximum deflection of the spring 356 occurs at its mid region and minimum deflection of the spring 356 occurs adjacent to its ends. In other examples, the housing of the telecommunication enclosure in which the cable sealing module 350 is mounted can include structure that prevents or limits deflection of the mid region of the spring 356 (see FIG. 52). In this type of example, ends 355 of the spring are be free to move to accommodate deflection of the spring 356. In this example, volume for accommodating displaced sealant is provided adjacent the ends 355 of the spring 356 as the spring deflects. In certain examples, this type of configuration can be adapted for providing enhanced sealing pressure adjacent a triple point of the enclosure.

Figure 53:
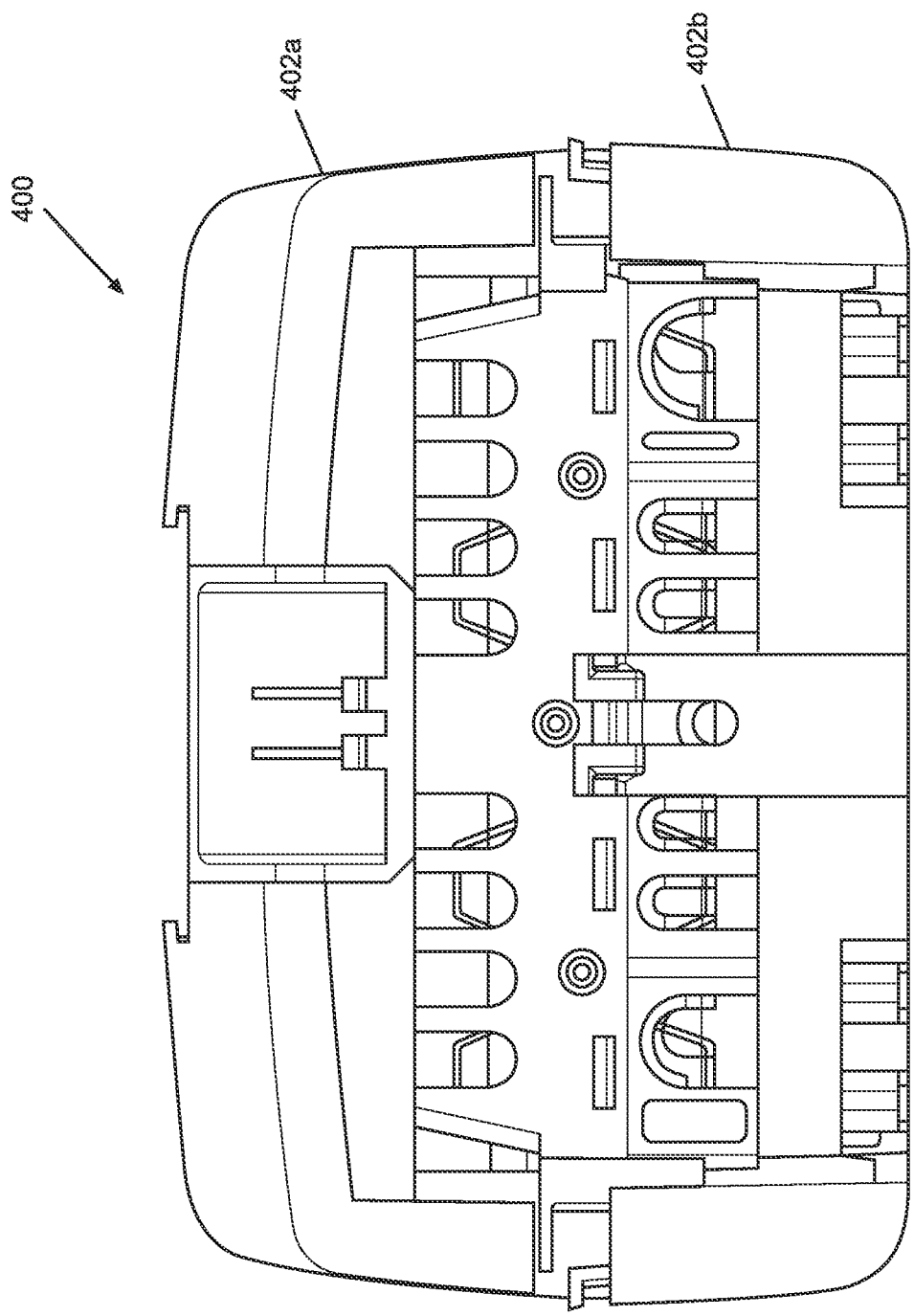
FIG. 53 is an end view of another telecommunication enclosure in accordance with the principles of the present disclosure.
Figure 54:
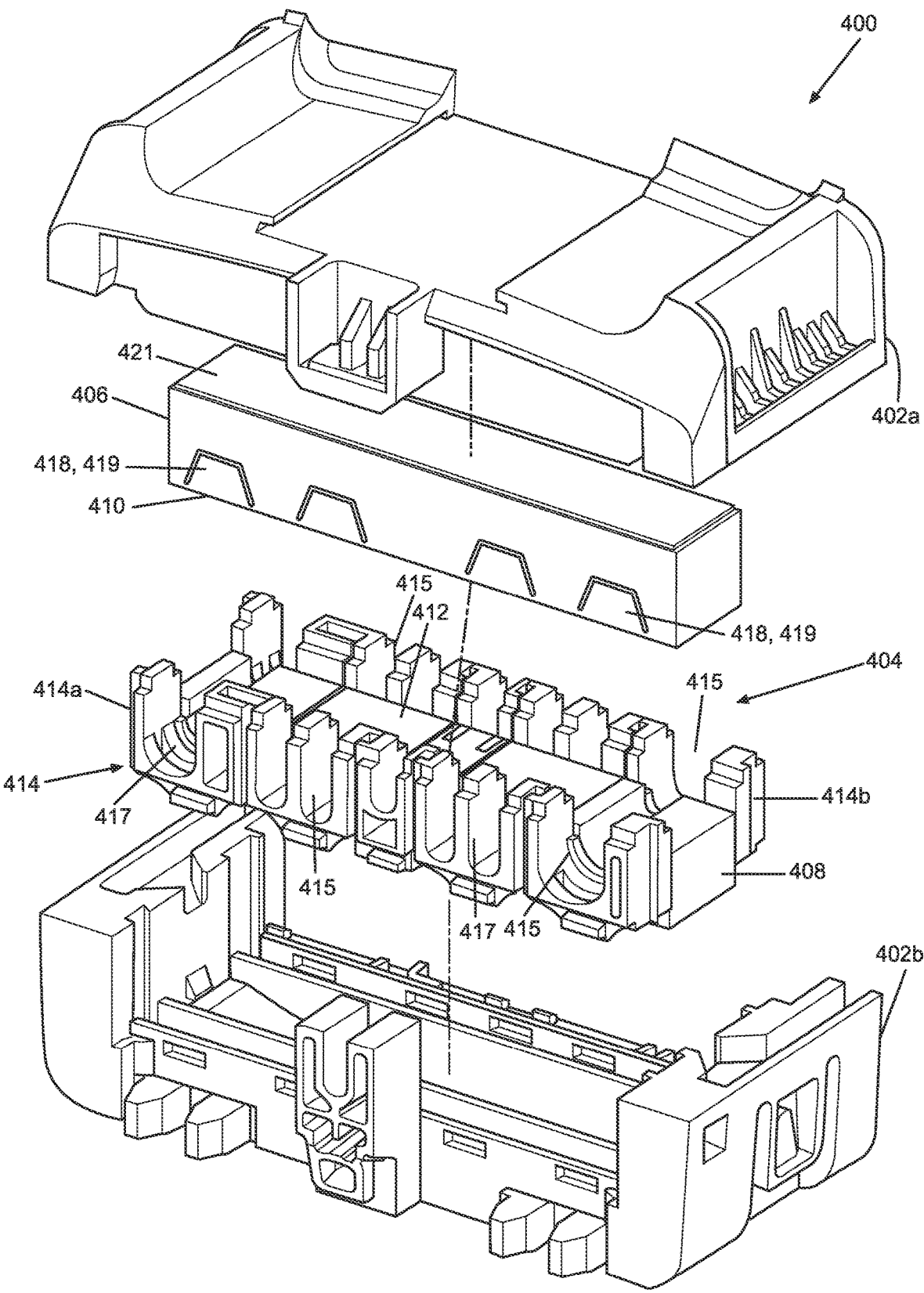
FIG. 54 is an exploded view showing a cable sealing arrangement of the telecommunication enclosure of FIG. 53.
Figure 55:
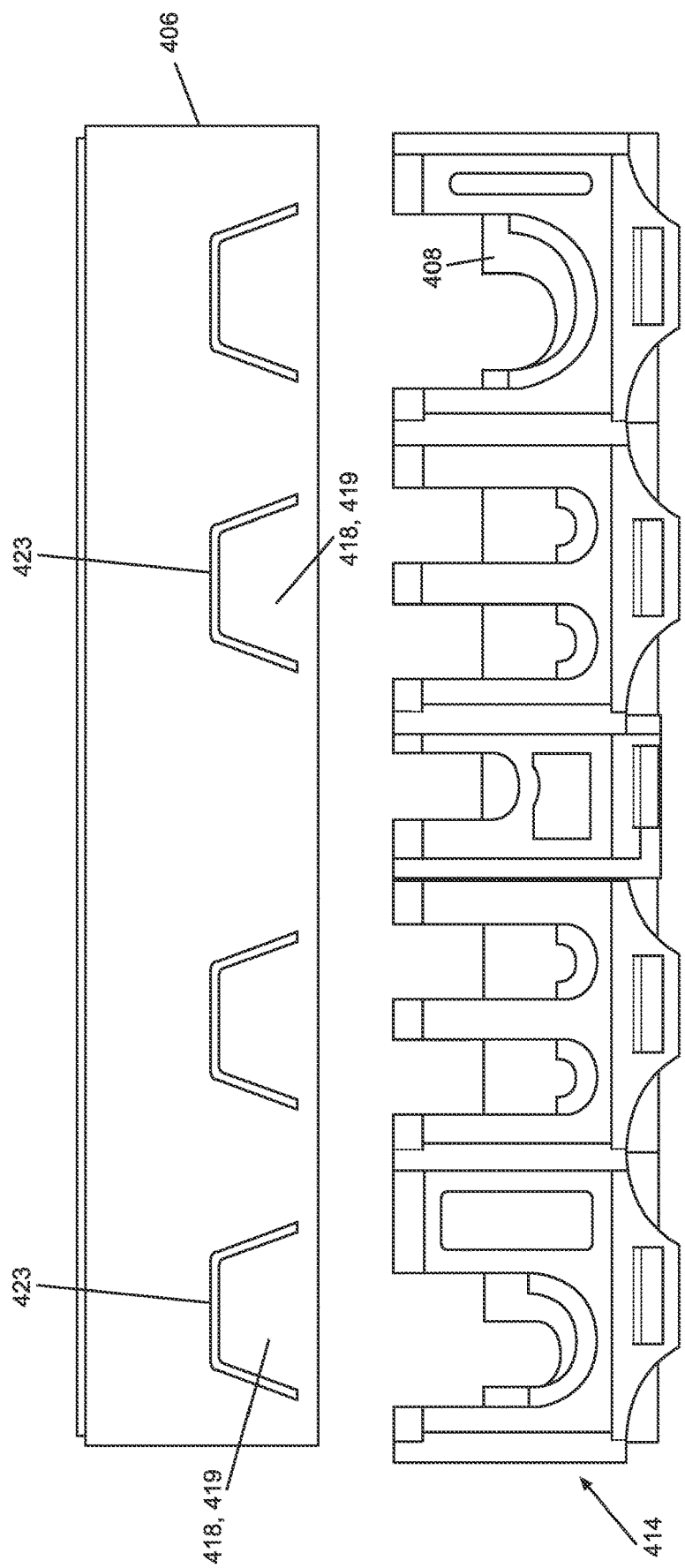
FIG. 55 is a front, exploded view of the cable sealing arrangement of FIG. 54.

FIGS. 53 and 54 depict a telecommunication enclosure 400 in accordance with the principles of the present disclosure. The telecommunication enclosure 400 includes a housing 402 including first and second mating housing pieces 402a, 402b. The telecommunication enclosure 400 further includes a cable sealing arrangement 404 that mounts between the housing pieces 402a, 402b adjacent one end of the housing 402. The cable sealing arrangement 404 includes first and second cable sealing modules 406, 408 having sealing surfaces 410, 412 that define a cable pass-through region (i.e., a cable sealing interface). A containment frame 414 includes containment walls 414a, 414b that oppose opposite axial end faces of the cable sealing modules 406, 408. The walls 414a, 414b define openings 415 corresponding to pre-defined cable pass-through locations 417. At least one of the cable sealing modules 406, 408 includes predefined tear-away locations 418 corresponding to at least some of the cable pass-through locations 417. The cable tear-away locations 418 include volumes of sealant material 419 that can be torn away from a main body 421 of the module to reduce the overall sealant volume of the module so that the sealing arrangement can accommodate larger fiber optic cables. The tear-away locations 418 can be defined by pre-defined weakened regions 423 in the sealing module that readily allow the volumes of sealant material 419 to be torn from the main body 421 of the sealant module. FIG. 55 depicts the sealant modules 406, 408 and the containment frame 414 in isolation from the remainder of the enclosure.

Figure 56:
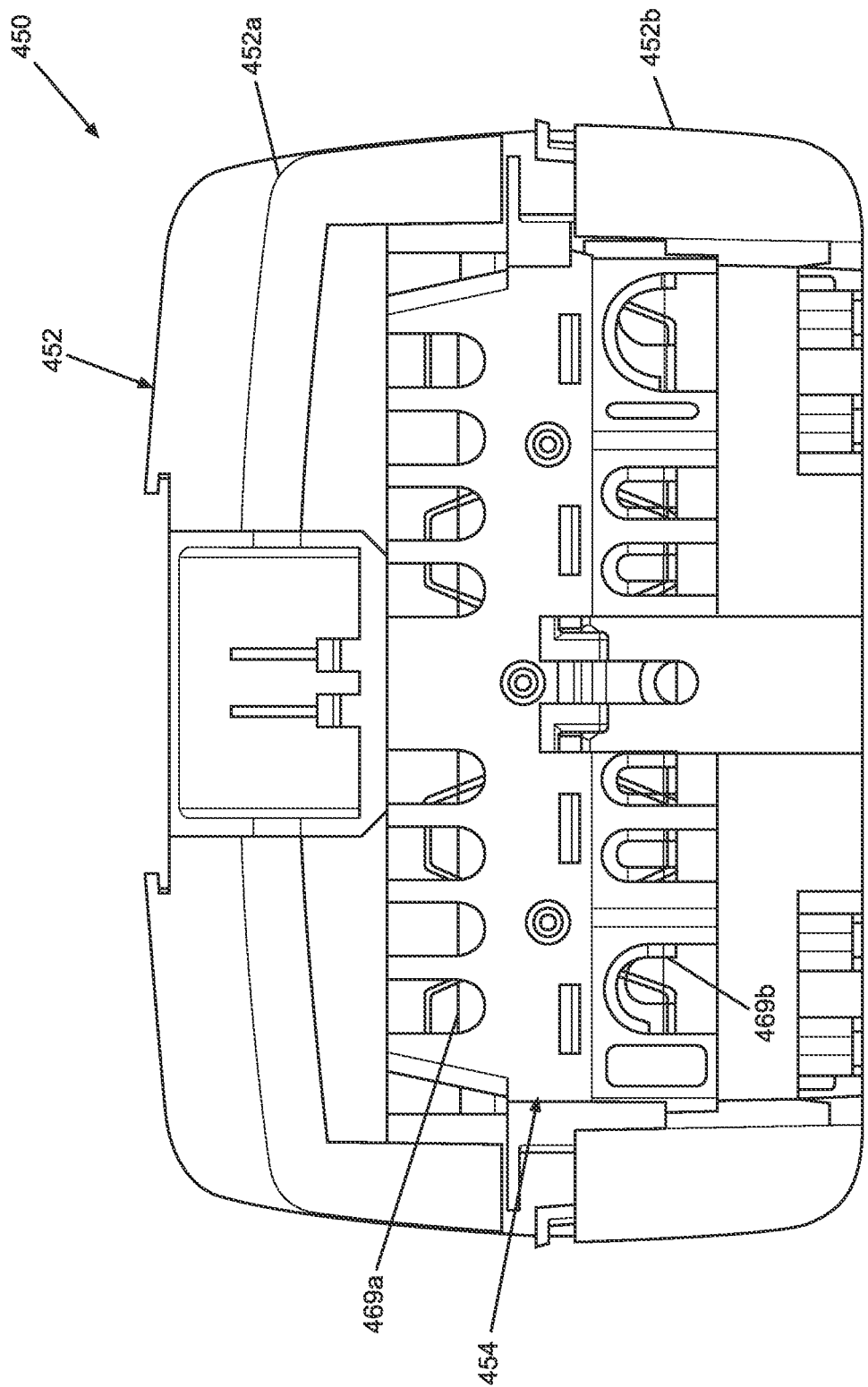
FIG. 56 is an end view of another telecommunication enclosure in accordance with the principles of the present disclosure.
Figure 57:
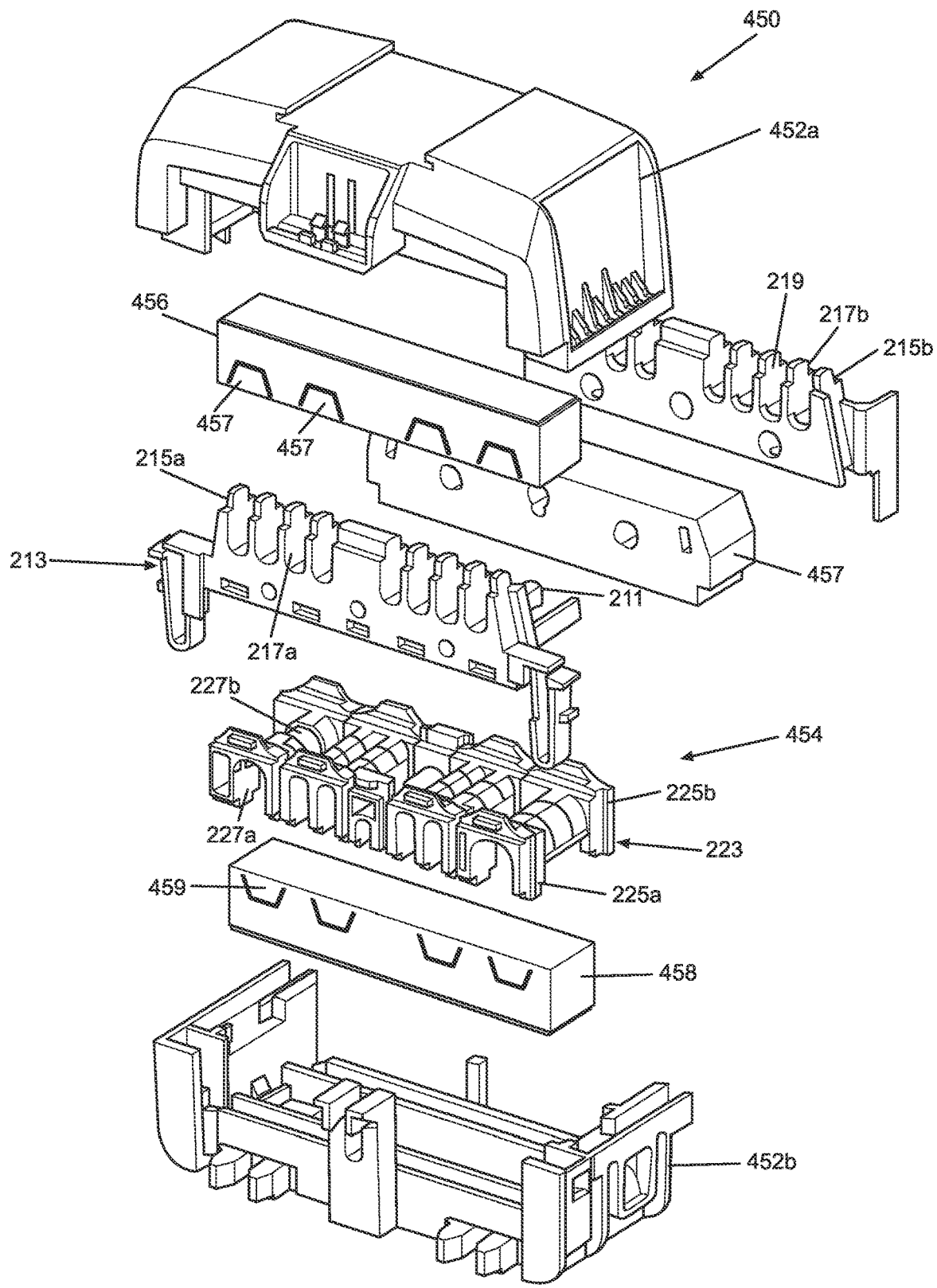
FIG. 57 is an exploded view showing an example cable sealing arrangement of the telecommunication enclosure of FIG. 56.
Figure 58:
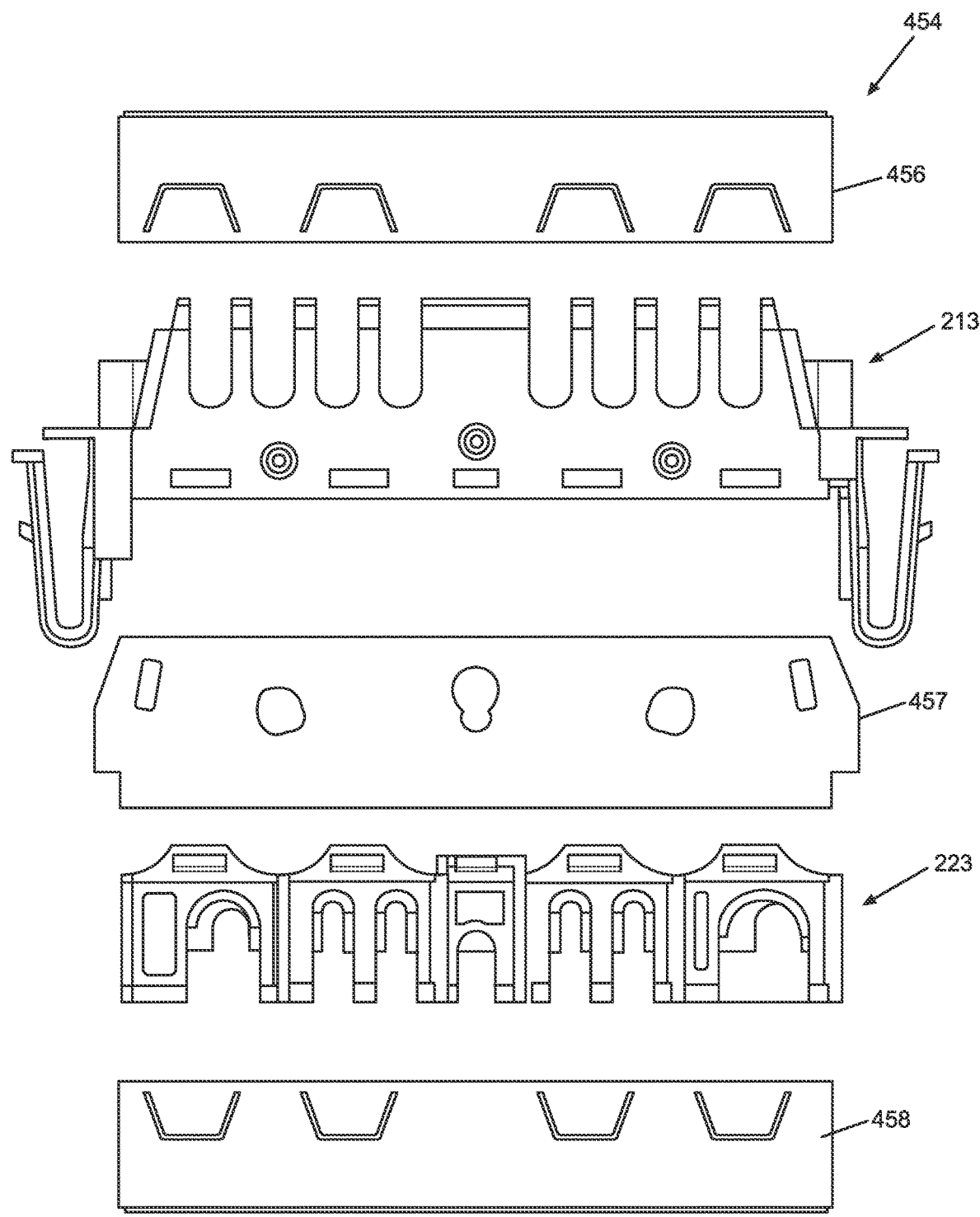
FIG. 58 is a front exploded view of the cable sealing arrangement of FIG. 57.

FIGS. 56-58 depict another telecommunication enclosure 450 in accordance with the principles of the present disclosure. The telecommunication enclosure 450 includes a re-enterable housing 452 including first and second housing pieces 452a, 452b that meet at a sealed perimeter interface. The telecommunication enclosure 450 also includes a cable sealing arrangement 454 including a top cable sealing module 456, a bottom cable sealing module 458 and a middle cable sealing module 457. The cable sealing modules 456-458 define upper and lower cable sealing interfaces 469a, 469b through which fiber optic cables can be routed into the interior of the telecommunications enclosure 450.

The enclosure 450 includes a containment frame arrangement that preferably has a plastic construction that is harder than corresponding sealing portions and optional containment portions of the sealing modules 456-458. The containment frame arrangement includes an upper containment frame 213 including axial containment walls 215a, 215b connected by axial connection links 211 that extend through the middle cable sealing module 457. The containment walls 215a, 215b define cable openings 217a, 217b respectively corresponding to the upper cable sealing interface 469a. The cable openings 217a, 217b establish locations for predefined cable pass-through locations 219. The upper cable sealing module 456 defines predefined removable volumes of sealant material 457 corresponding to at least some of the cable pass-through locations 219. The containment frame arrangement also includes a lower containment frame 223 corresponding to the lower cable pass-through interface 469b. The lower containment frame 223 includes axial containment walls 225a, 225b defining cable opening 227a, 227b that correspond to pre-defined cable pass-through locations at the lower pass-through interface 469b. The lower cable sealing module 558 defines removable sealant sections 459 having predefined volumes corresponding to at least some of the cable pass-through locations. Preferably, the removable sections having pre-defined volumes are defined by pre-defined weakened locations within the sealing material. FIG. 58 shows the sealing arrangement 454 in isolation from the remainder of the enclosure 450.

Figure 59:
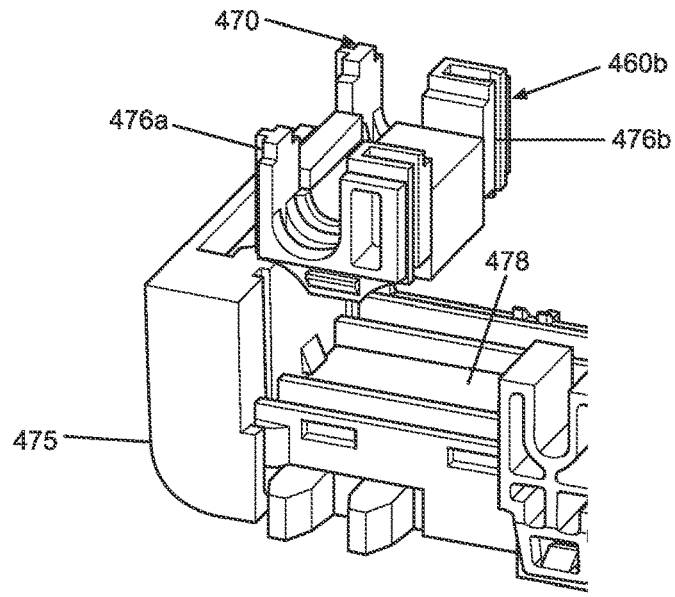
FIG. 59 is a perspective view showing a portion of a cable sealing arrangement in accordance with the principles of the present disclosure, the sealing arrangement includes segmented sealing modules.
Figure 60:
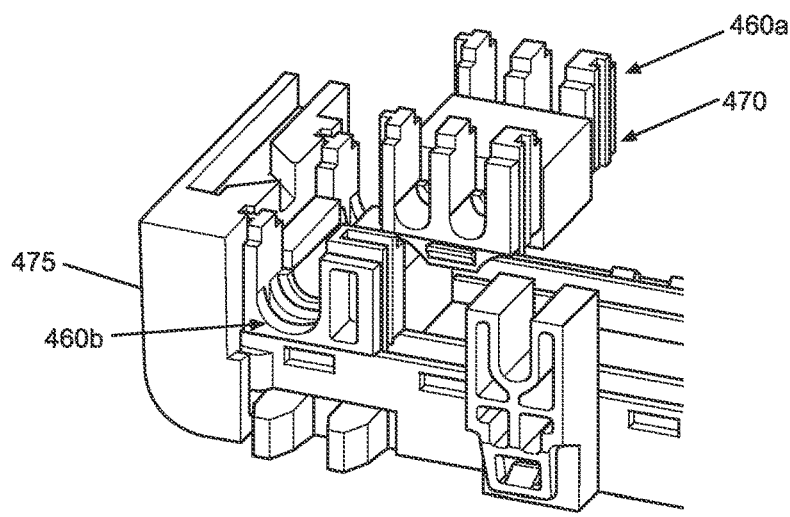
FIG. 60 is a perspective view of the sealing arrangement of FIG. 59 showing an additional module segment being added to the sealing arrangement.
Figure 61:
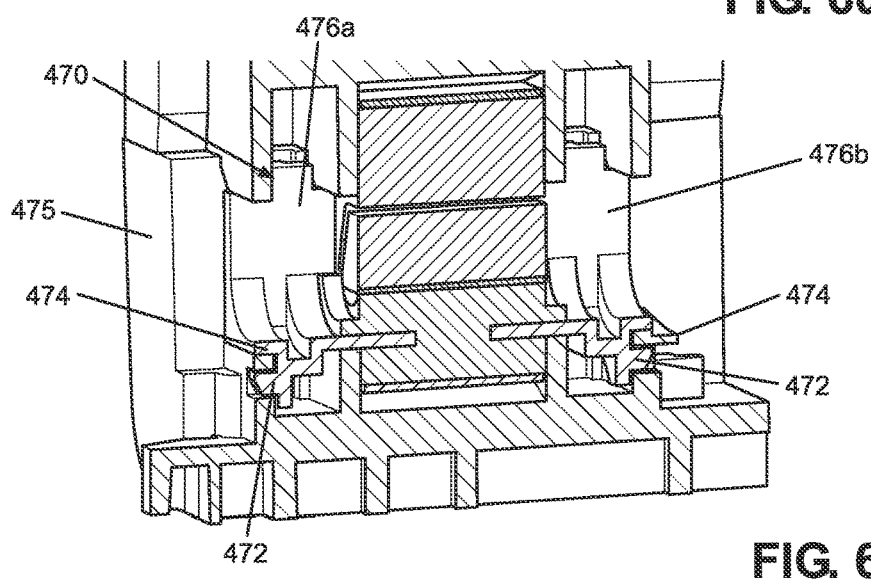
FIG. 61 is a perspective view showing an interlock interface for securing the module segments of the sealing arrangement of FIGS. 59 and 60 to a telecommunication enclosure housing.
Figure 62:
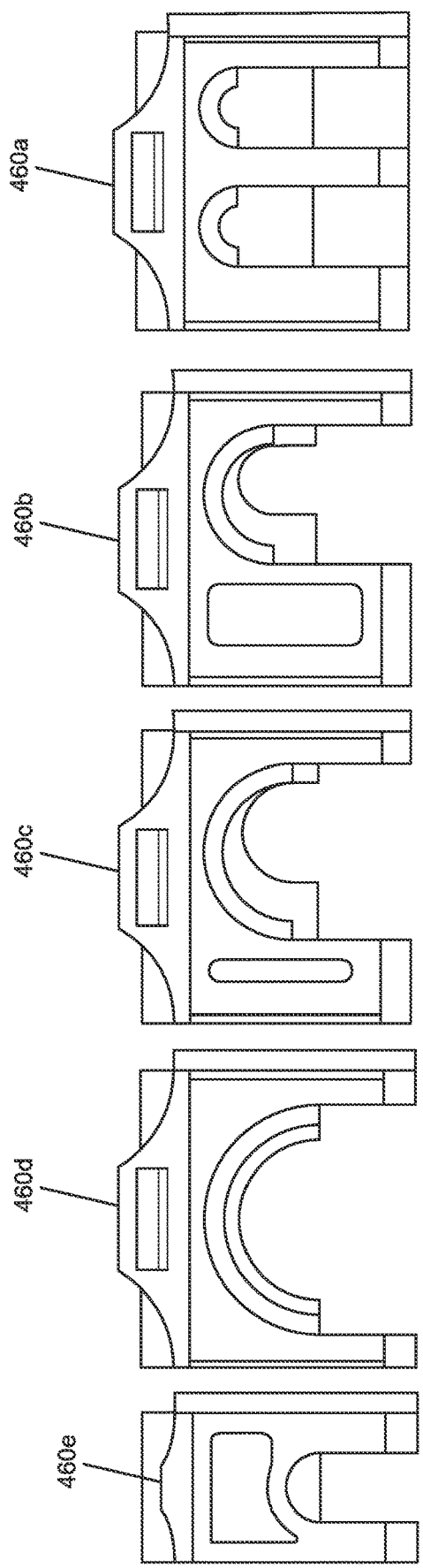
FIG. 62 depicts a plurality of different module segments that can be used with the sealing arrangement of FIGS. 59 and 60.

In certain examples, the cable sealing arrangement 404 and the cable sealing arrangement 454 can have a modular configuration in which the selected ones of the cable sealing modules and selected containment frames can be divided into separate segments that can be individually installed within the telecommunication enclosure. FIGS. 59-61 show an example segmented sealing system. Example sealing segments 460a-460e corresponding to cable pass-through locations adapted for receiving cables of different sizes shown at FIG. 62. Sealing segment 460a is adapted for receiving two cables ranging in size from 0 to 8 mm in diameter. Sealing segment 460b is adapted for receiving a cable having a diameter ranging from 8 to 14 mm. Sealing segment 460c is adapted for receiving a cable ranging from 14 to 18 mm in diameter. Sealing segment 460d is adapted for receiving a cable ranging in size from 18 to 23 mm in diameter. Sealing segment 460e is adapted for receiving a grounding wire. It will be appreciated that the various segments can be mixed and matched to build a sealing arrangement customized to accommodate the desired number and size of cables needed to be routed into the enclosure. Each of the segments can be secured within a corresponding one of the housing pieces by a latch arrangement. For example, segmented containment frames 470 of the sealing segments 460a-460e can include tabs 472 that fit within corresponding openings 474 defined by the housing piece 475. By pressing the oppositely positioned axial wall portions 476a, 476b of containment frames 470 axially together to compress the sealing material therein between, the sealing segments 460a-460e can be inserted into a channel 478 defined in the housing piece 475. Thereafter, the segments 460a-460e can be released and the elasticity of the compressed sealing material pushes the frame segment wall portions 476a, 476b axially outwardly such that the tabs 472 fit within the corresponding openings 474 defined in the housing 475. In other examples, recesses can be defined in the segmented containment frame wall portions and projections can be provided in the housing.

Figure 63:
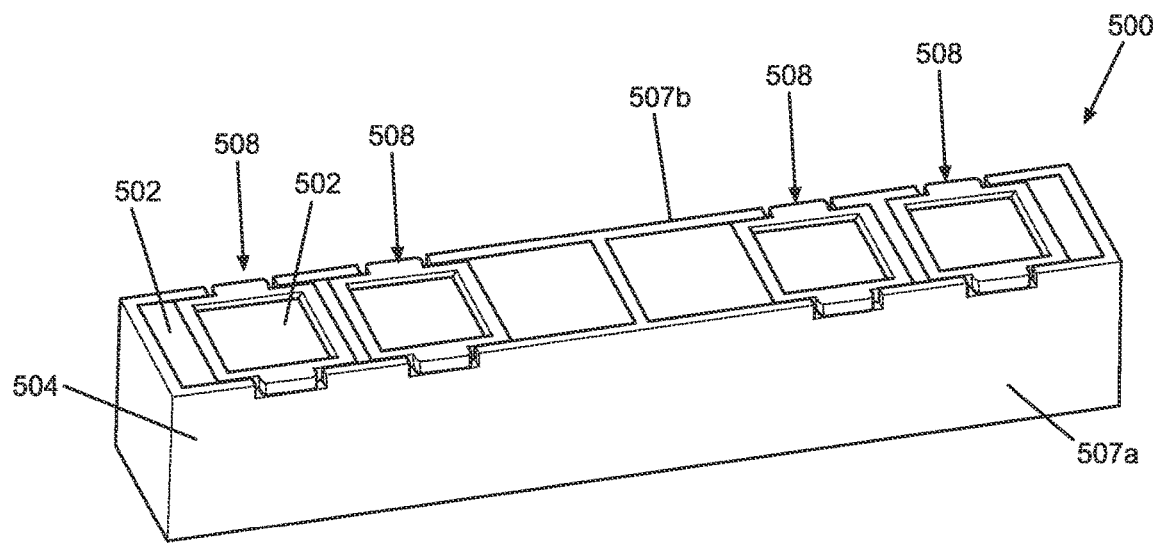
FIG. 63 depicts still another cable sealing module in accordance with the principles of the present disclosure.
Figure 64:
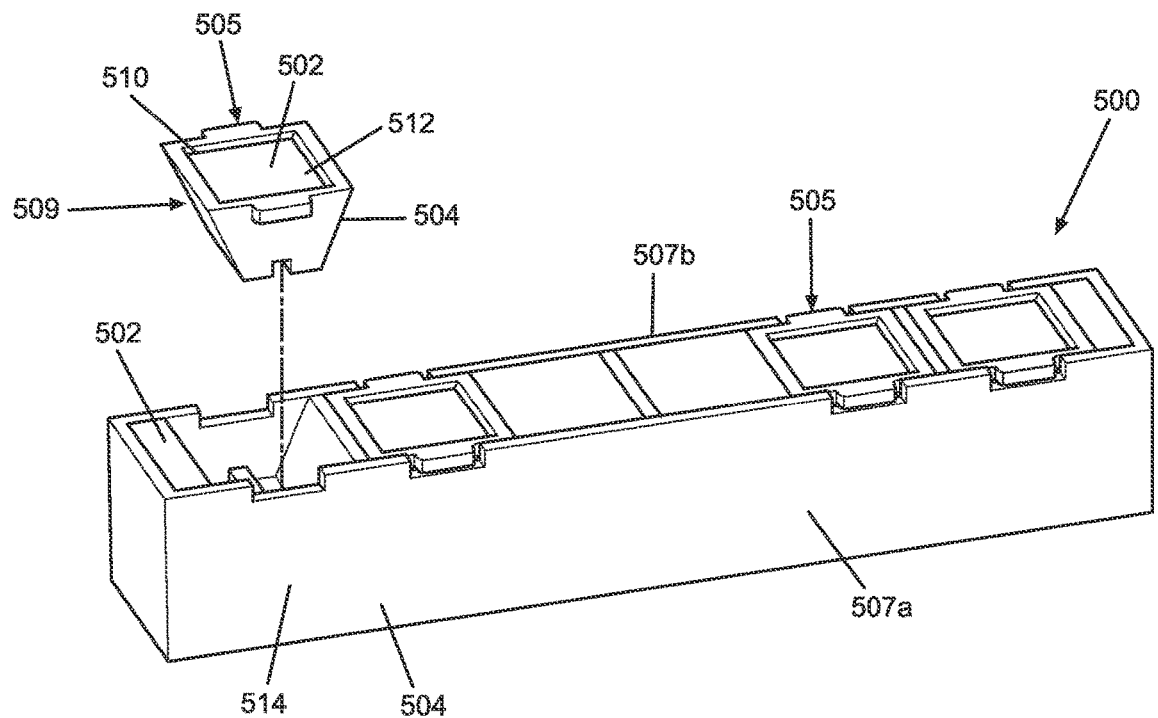
FIG. 64 depicts the cable sealing module of FIG. 63 with a volume reducing insert exploded therefrom.

FIGS. 63 and 64 show still another cable sealing module 500 in accordance with the principles of the present disclosure. The cable sealing module includes a sealant portion 502 and a containment portion 504. The sealant portion 502 and the containment portion 504 can have elastomeric configurations as previously described. In certain examples, the sealing portion 502 can include a gel and the containment portion 504 can include a rubber. The sealant portion 502 is softer than the containment portion 504. In the depicted example, the cable sealing module includes a plurality of inserts 505 that fit between walls 507a, 507b of the containment portion 504. Each of the inserts 505 includes a containment body 509 defining a cavity 510 in which a volume 512 of the sealant portion 502 is provided.

The inserts 505 fit within a main portion 514 of the cable sealing module 500. For smaller cables, the inserts 505 remain in the cable sealing module 500 during sealing. However, for larger cables where a significant amount of sealant will be displaced by the cables, one or more of the inserts 505 can be removed corresponding to the desired pass-through location of the cable to reduce the amount of sealant displaced and to reduce the volume of space required in the sealing arrangement for accommodating displaced sealant. In this manner, the range of cable sizes that can be accommodated by the sealing modules is enlarged.

Figure 65:
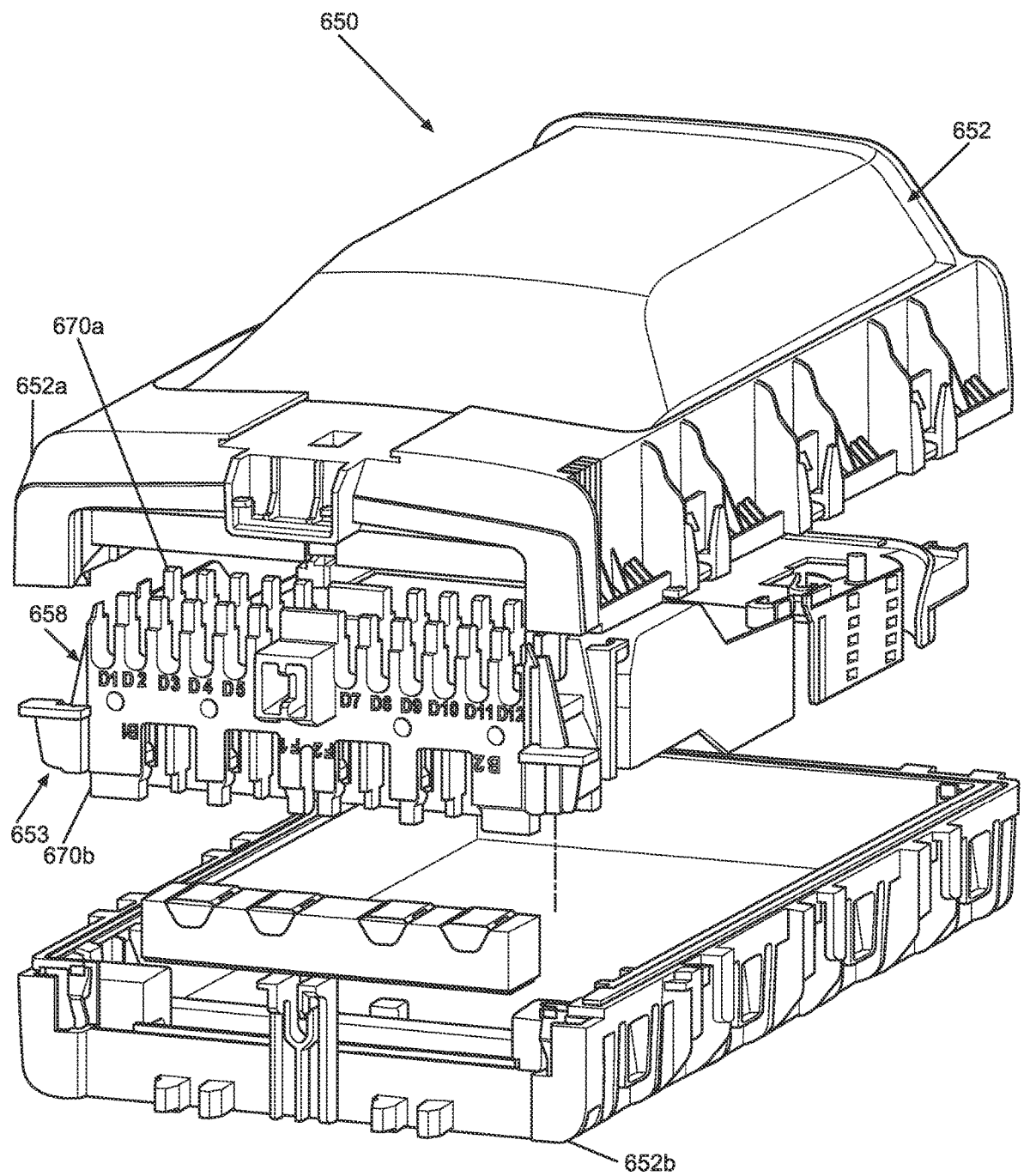
FIG. 65 is an exploded view of a telecommunication enclosure in accordance with the principles of the present disclosure.
Figure 66:
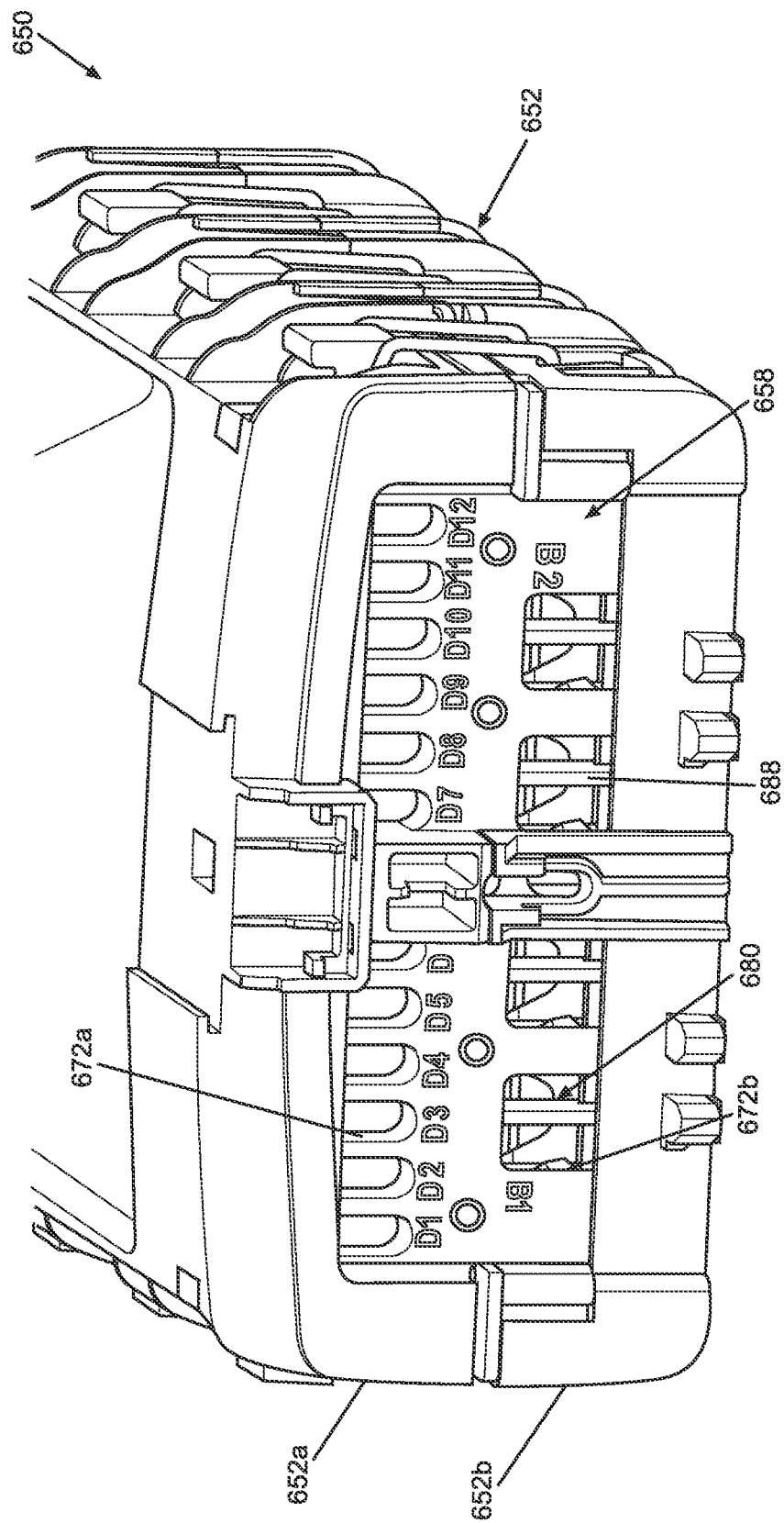
FIG. 66 is an assembled, perspective view of one end of the enclosure of FIG. 65.
Figure 67:
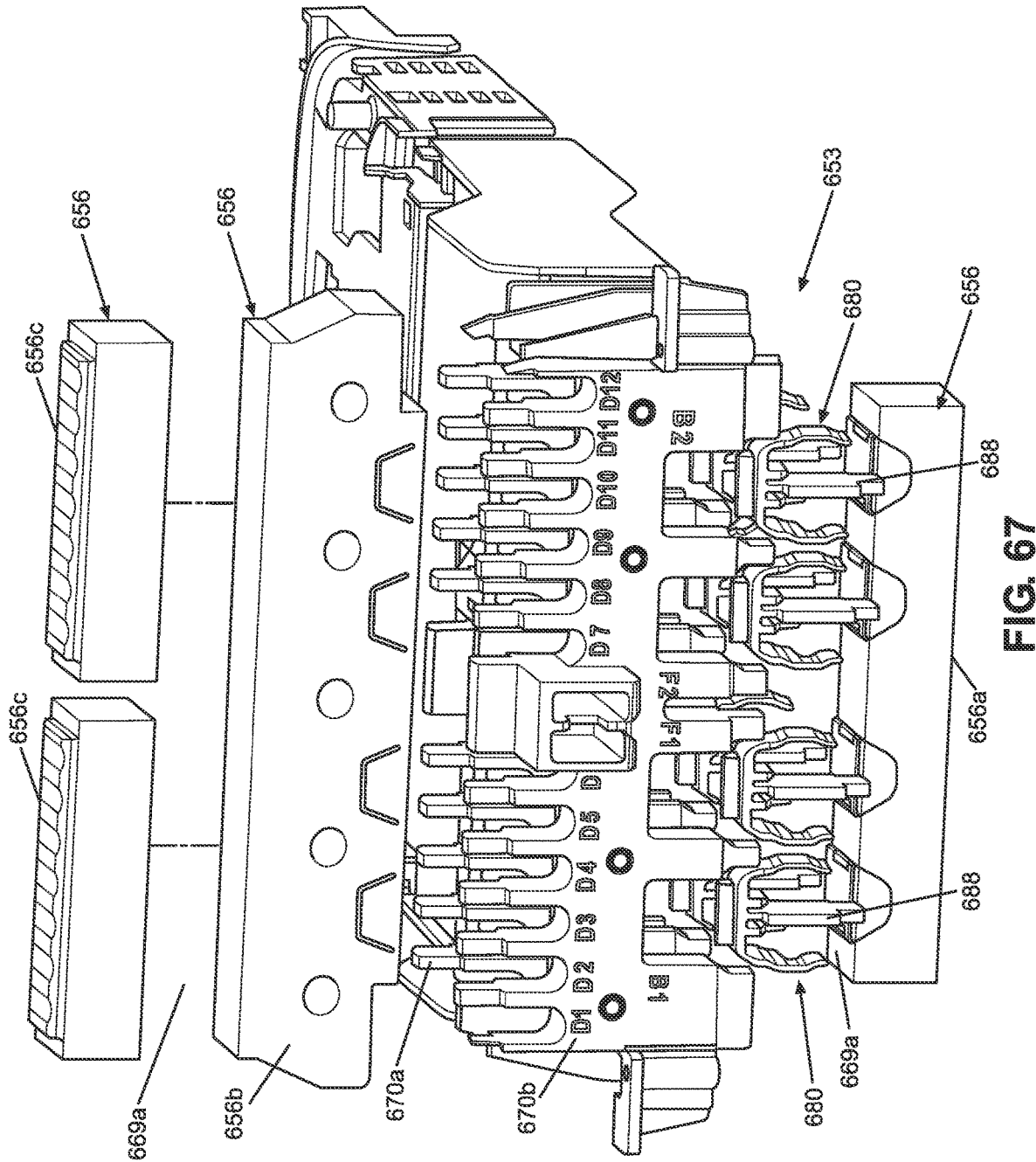
FIG. 67 is an exploded, perspective view of the enclosure of FIG. 65 with the outer housing removed.

FIGS. 65 and 66 depict another telecommunication enclosure 650 in accordance with the principles of the present disclosure. The telecommunication enclosure 650 includes a re-enterable housing 652 including first and second housing pieces 652a, 652b that meet at a sealed perimeter interface. The telecommunication enclosure 650 also includes a sealing arrangement 653 for sealing one end of the re-enterable housing 652. The sealing arrangement 653 provides sealed cable access locations for routing fiber optic cables into or out of the end of the housing 652 in a sealed manner. The sealing arrangement 653 includes one or more volumes of sealant 656 contained by a sealant containment frame structure 658. The sealant containment frame structure 658 includes an inner containment wall 670a and an outer containment wall 670b between which the volumes of sealant 656 are captured. In the depicted example, the volumes of sealant 656 include a lower sealant block 656a, a middle sealant block 656b and two upper sealant blocks 656c. An upper cable sealing interface 669a is defined between the middle sealing block 656b and the two upper sealing blocks 656c. A lower cable sealing interface 669b is defined between the middle sealing block 656b and the lower sealing block 656a. It will be appreciated that fiber optic cables can be routed through the cable sealing interfaces 669a, 669b into the interior of the telecommunications enclosure 650. Cables routed through the upper cable sealing interface 669a are sealed between the middle volume of sealant 656b and one of the upper volumes of sealant 656c. Cables routed through the lower cable sealing interface 669b are sealed between the middle volume of sealant 656b and the lower volume of sealant 656a. It will be appreciated that any of the volumes of sealant can include predefined removable sections that can be removed to provide a reduction in sealant volume to facilitate accommodation of larger fiber optic cables.

The inner and outer containment walls 670a, 670b of the cable sealant containment frame structure 658 can define a plurality of cable pass-through openings 672. The cable pass-through openings 672 can include openings of different sizes. For example, cable pass-through openings 672a are adapted for receiving smaller cables and are smaller in cross-sectional area, while cable pass-through openings 672b are larger in cross-sectional and are adapted for receiving fiber optic cables having larger diameters. The sealant containment frame structure 658 also includes removable divider insert units 680 that mount within the containment walls 670a, 670b at the larger cable pass-through openings. In certain examples, the divider insert units are secured at the cable pass-through openings 672b by snap-fit connections.

Figure 69:
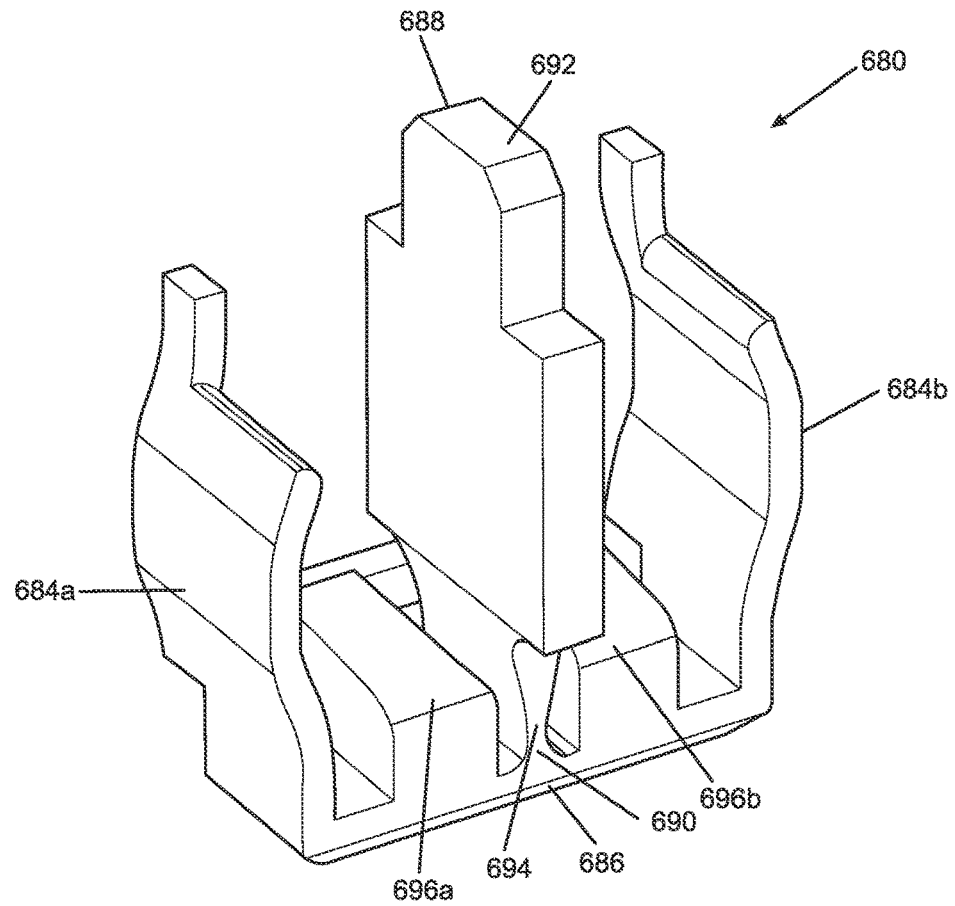
FIG. 69 is a perspective view of a divider insert that can be incorporated with the sealant containment frame structure of FIG. 68.
Figure 70:
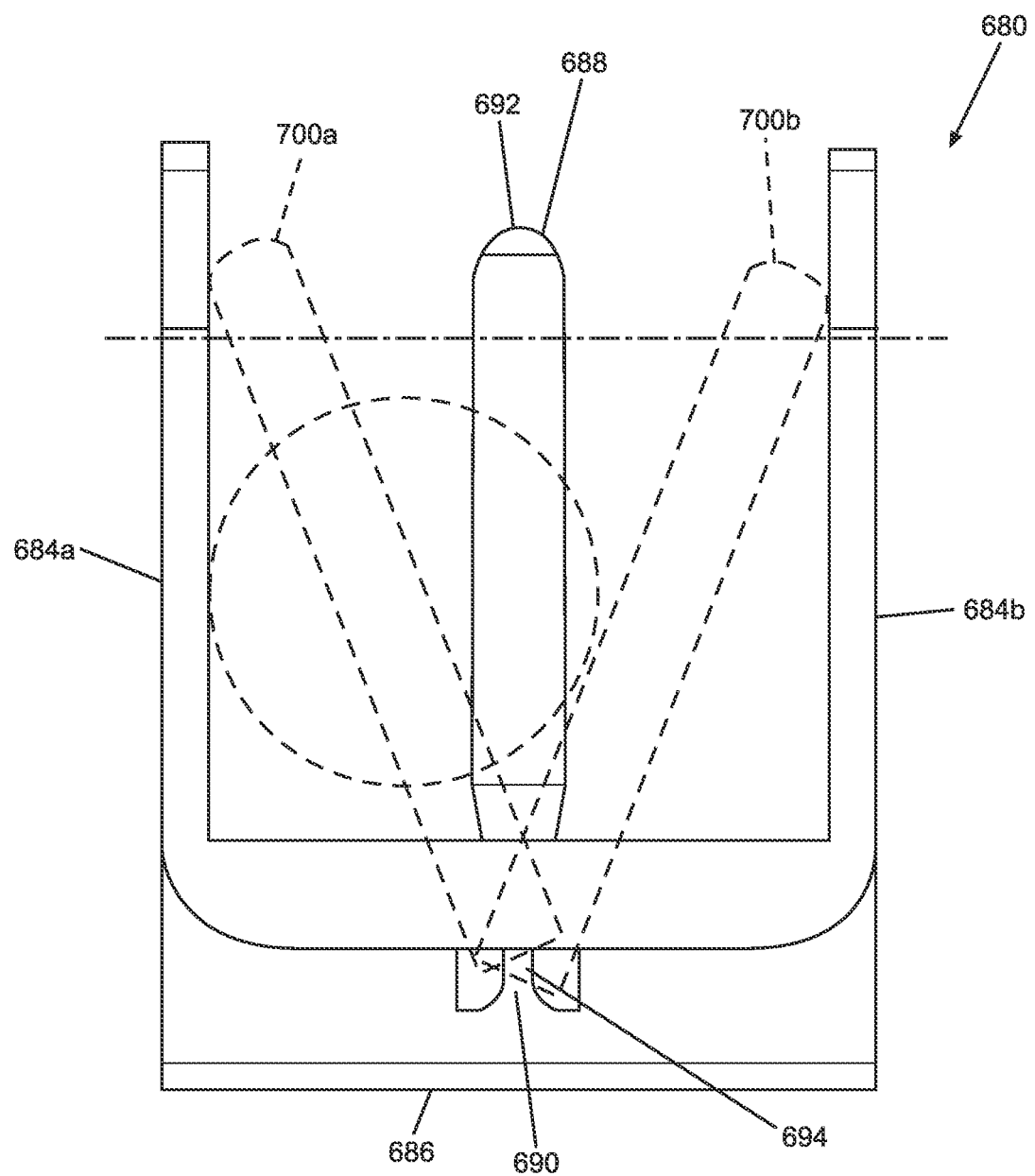
FIG. 70 is a front view of the divider insert of FIG. 69.

As shown at FIGS. 69 and 70, each of the divider insert units 680 includes a U-shaped insert frame 682 including opposite side walls 684a, 684b connected to a base wall 686. The side walls 684a, 684b project from the base wall 686 in a common direction. The divider insert unit 680 also includes a divider 688 that projects from the base wall 686 in the same direction as the side walls 684a, 684b. The divider 688 has a cantilevered configuration with a base end 690 and a free end 692. The divider 688 has a flexible hinge 694 at the base end 690 for allowing the divider 688 to be flexed from a neutral position toward the first side wall 684a, and from the neutral position to the second side wall 684b. When the divider 688 is in the neutral position, the divider 688 is at a mid-location between the side walls 684a, 684b. First and second stops 696a and 696b can be provided for limiting the amount the divider 688 can flex in the direction toward the first side wall 684a and in the direction toward the second side wall 684b. The side walls 684 can be configured to assist in providing a snap-fit connection with respect to the containment walls 670a, 670b. The hinge 694 can have a resilient construction that biases the divider 688 toward the neutral position.

Figure 68:
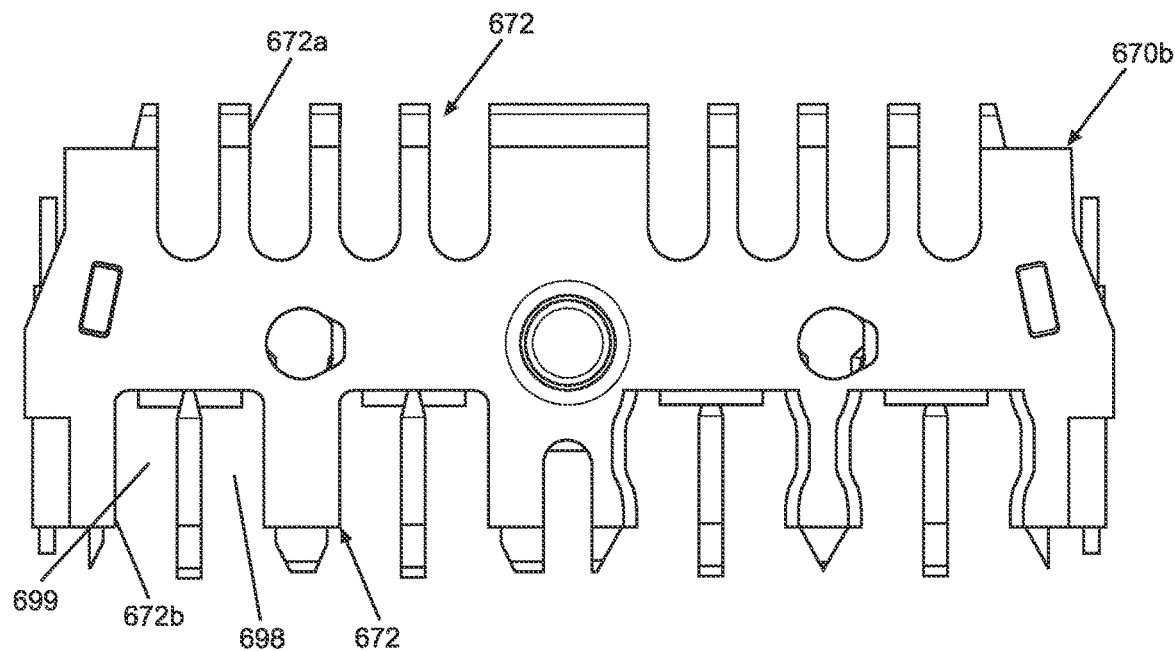
FIG. 68 is a front view of a sealant containment frame structure utilized by the telecommunication enclosure of FIG. 65.

When one of the divider insert units 680 is mounted within one of the inner or outer containment walls 670a, 670b adjacent one of the larger pass-through openings 672b, the divider 688 divides the pass-through opening into a first region 698 and a second region 699 (see FIG. 68). When the divider is in the neutral position, the first and second regions have the same size. When the divider 688 is flexed from the neutral position toward the first side wall 684a to a first flexed position 700a as shown in dashed line at FIG. 70, the first region 698 is reduced in size and the second region 699 is increased in size. In contrast, when the divider 688 is flexed from the neutral position to a second flexed position 700b adjacent the second side wall 684b as shown in dashed line at FIG. 70, the first region 688 is enlarged and the second region 699 is reduced. In FIG. 70, the neutral position of the divider 688 is shown in solid line. It will be appreciated that the divider 688 can be flexed at the hinge to accommodate cables having different cross-sectional sizes and shapes. For smaller cables, the divider can remain in the neutral position and cables can be routed through both the first and second regions 698, 699. For larger cables, the dividers 688 can be flexed to either the first flexed position 700a or the second flexed position 700b to provide increased space to accommodating the larger cable. In each of the positions, divider 688 assists in containing containment of the cable sealant within the sealant containment frame structure 658.

Aspects of the present disclosure also relate to cable sealing arrangements including sealing modules that readily flow from a non-deformed state to a deformed state to conform to fiber optic cables and provide sealing effective sealing about the cables. The cable sealing modules also are preferably capable of effectively changing in shape from a deformed state to a recovered state when a cable is removed. In certain examples, the sealing modules can include a sealant that is quite soft to allow the sealant to readily and quickly conform to different sized fiber optic cables to provide effective sealing. In certain examples, the sealing modules also include structural inserts (e.g., frames, supports, etc.) that effectively provide structural support and flow control of the soft sealing material, and have elastic properties that assists in reducing the recovery time required for the soft sealing to return to a state in which the deformation is less than 10, 5 or 2 percent.

In certain examples, sealing modules in accordance with the principles of the present disclosure can include a hybrid or composite construction including a sealing portion having a first composition and a structural insert portion having a second composition. In certain examples, the first and second compositions can be compatible with one another and can be adapted to bond with respect to one another. In certain examples, the first and second compositions can both be elastomeric compositions. In certain examples, the first and second compositions can include the same base polymer. In certain examples, the sealing portion and the structural insert portion can both be elastomeric, but the sealing portion can be softer than the structural insert portion, and the structural insert portion can have a higher modulus of elasticity than the sealing portion. In certain examples, the structural insert portion can be a pre-molded structure, and the sealing portion can be molded over, through and or onto the structural insert portion. In certain examples, the structural insert portion is fully enclosed (e.g., overmolded) within the sealing portion so that the structural insert portion is not exposed at an exterior of the sealing module. In certain examples, the sealing portion and the structural insert portion both have compression sets less than 10, 5, or 2 percent, but the recovery time for the structural insert portion is shorter than the recovery time for the sealing portion. In certain examples, the sealing material can have more of a gel composition, and the containment portion can have more of a rubber composition.

In certain examples in accordance with the principles of the present disclosure, the sealing material can have a hardness in the range of 10-60 Shore 000, or in the range of 5-25 Shore A, or in the range of 5-20 Shore A, or in the range of 5-15 Shore A, and the structural insert material can have a hardness in the range of 5-40 Shore A, or in the range of 5-30 Shore A, or in the range of 10-30 Shore A, or in the range of 20-30 Shore A. In a given cable sealing module, the sealing material is preferably softer than the structural insert material.

In a preferred example, the sealing portion of a given sealing module occupies a majority of the volume of the sealing module while the structural insert portion occupies a minority of the total volume of the sealing module.

In certain examples, the sealing portion and the structural insert portion can each have an elastomeric construction with a base composition that includes silicone (e.g., polysiloxanes or polymethylsiloxanes). In certain examples, the sealing portion and structural insert portion can each include an elastomeric construction with a base composition that includes a thermoplastic elastomeric. Example thermoplastic elastomers can include styrenic block copolymers, thermoplastic polyurethanes, thermoplastic copolyesters, thermoplastic polyamides, thermoplastic polyolefin elastomers, and other thermoplastic elastomers.

Figure 71:
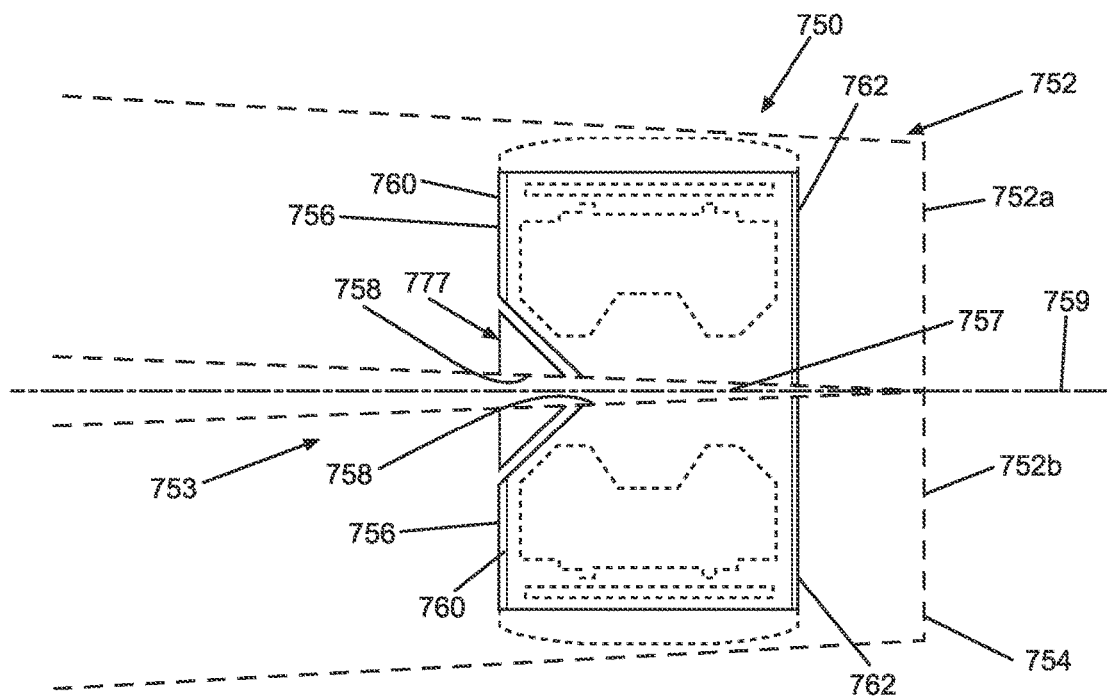
FIG. 71 is an end view of an example cable sealing arrangement in accordance with the principles of the present disclosure schematically depicted within an enclosure.
Figure 72:
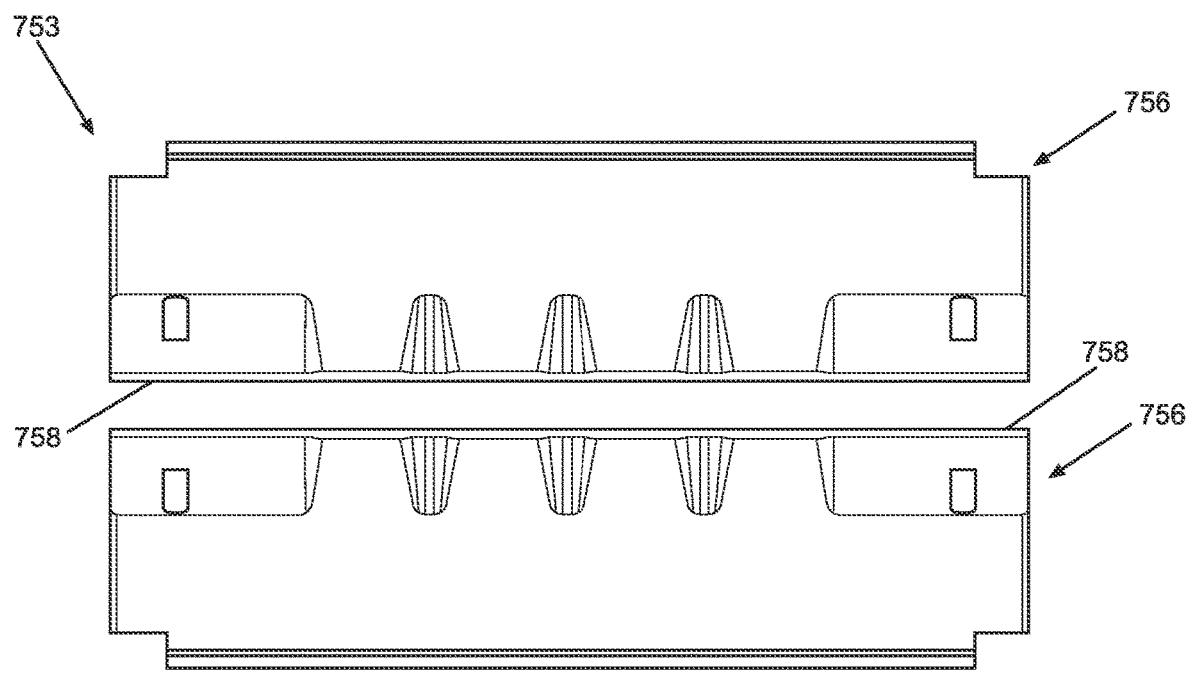
FIG. 72 depicts an inner axial side of the sealing arrangement of FIG. 71.

FIG. 71 depicts another telecommunication enclosure 750 in accordance with the principles of the present disclosure. The telecommunication enclosure 750 includes a re-enterable housing 752 including first and second housing pieces 752a, 752b that meet at a sealed perimeter interface. The telecommunication enclosure 750 also includes a sealing arrangement 753 for sealing a first end of 754 the re-enterable housing 752. In one example, the housing extends from the first end 754 to an opposite second end (not shown), and a hinge for pivoting the housing 752 between open and closed positions is at the first end 754. In other examples, the hinge may be located at the opposite second end or along one of the sides of the housing 752. The sealing arrangement 753 provides sealed cable access for routing fiber optic cables into or out of the first end 754 of the housing 752 in a sealed manner. The sealing arrangement 753 includes cable sealing modules 756 (e.g., cable sealing blocks) preferably contained by a sealant containment frame structure integrated with or carried with the housing 752. In one example the sealing arrangement 753 includes two cable sealing modules 756 each carried with and contained by one of the first and second housing pieces 752a, 752b. The cable sealing modules 756 include cable sealing sides 758 that meet at a cable sealing interface 757 when the housing 752 is closed. It will be appreciated that cables can be routed through the cable sealing interface 757 and sealed between the cable sealing sides 758 with the cable sealing sides 758 elastomerically deforming to conform to outer profiles of the cables to provide sealing. The cables define cable axes 759 that define cable pass-through directions/orientations through the sealing arrangements 753. The cable sealing modules 756 also include inner and outer axial sides 760, 762 that are generally perpendicular relative to the cable pass-through orientations. When the sealing arrangement is installed in the housing 752, the inner axial sides 760 face in an inward axial direction toward an interior of the housing 752 and the outer axial sides 762 face in an outward axial direction away from the interior of the housing 752.

Figure 73:
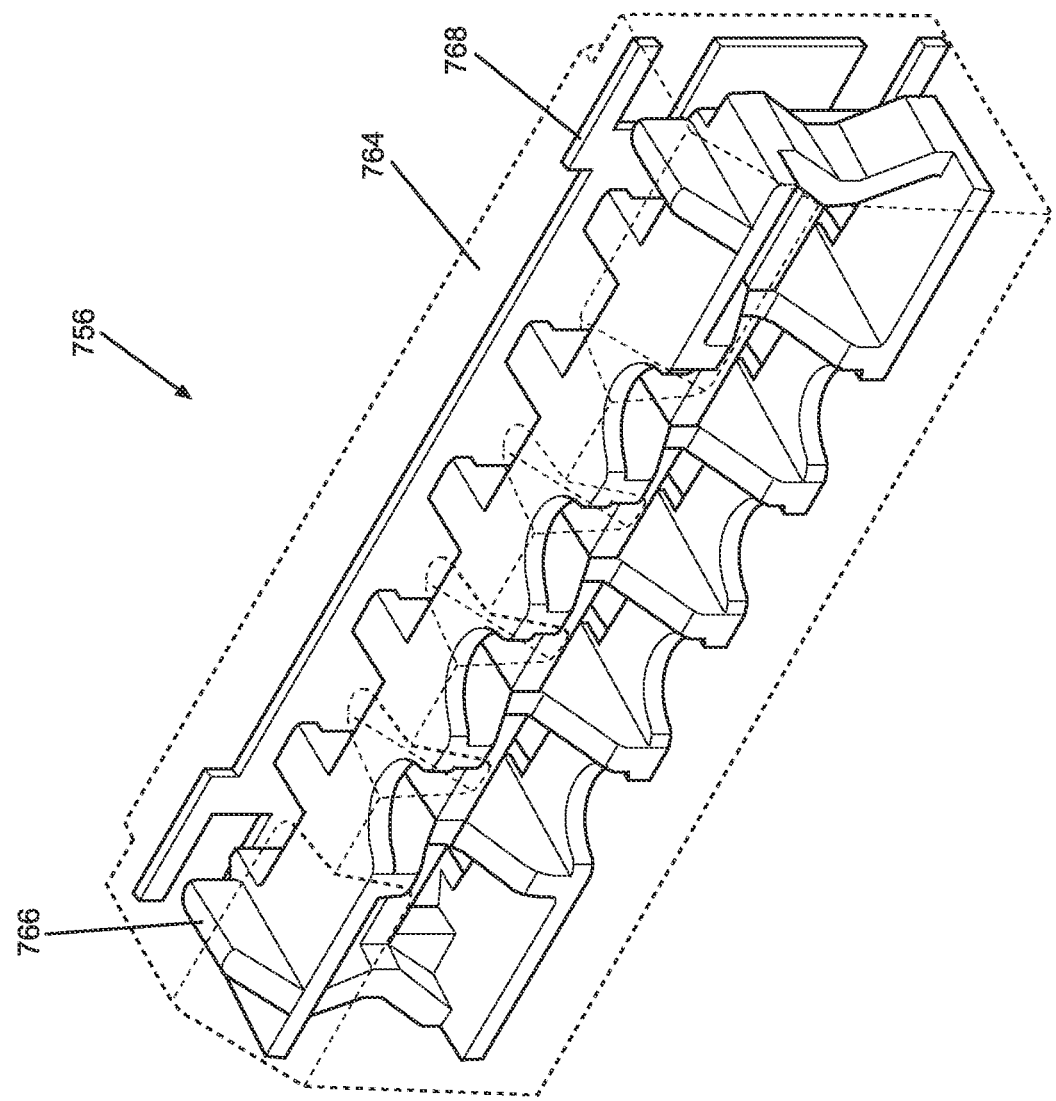
FIG. 73 is a perspective view of a sealing module of the sealing arrangement of FIG. 71, an outline of an outer sealing material of the module is depicted in phantom line so that an internal structural insert and spring are visible.
Figure 74:
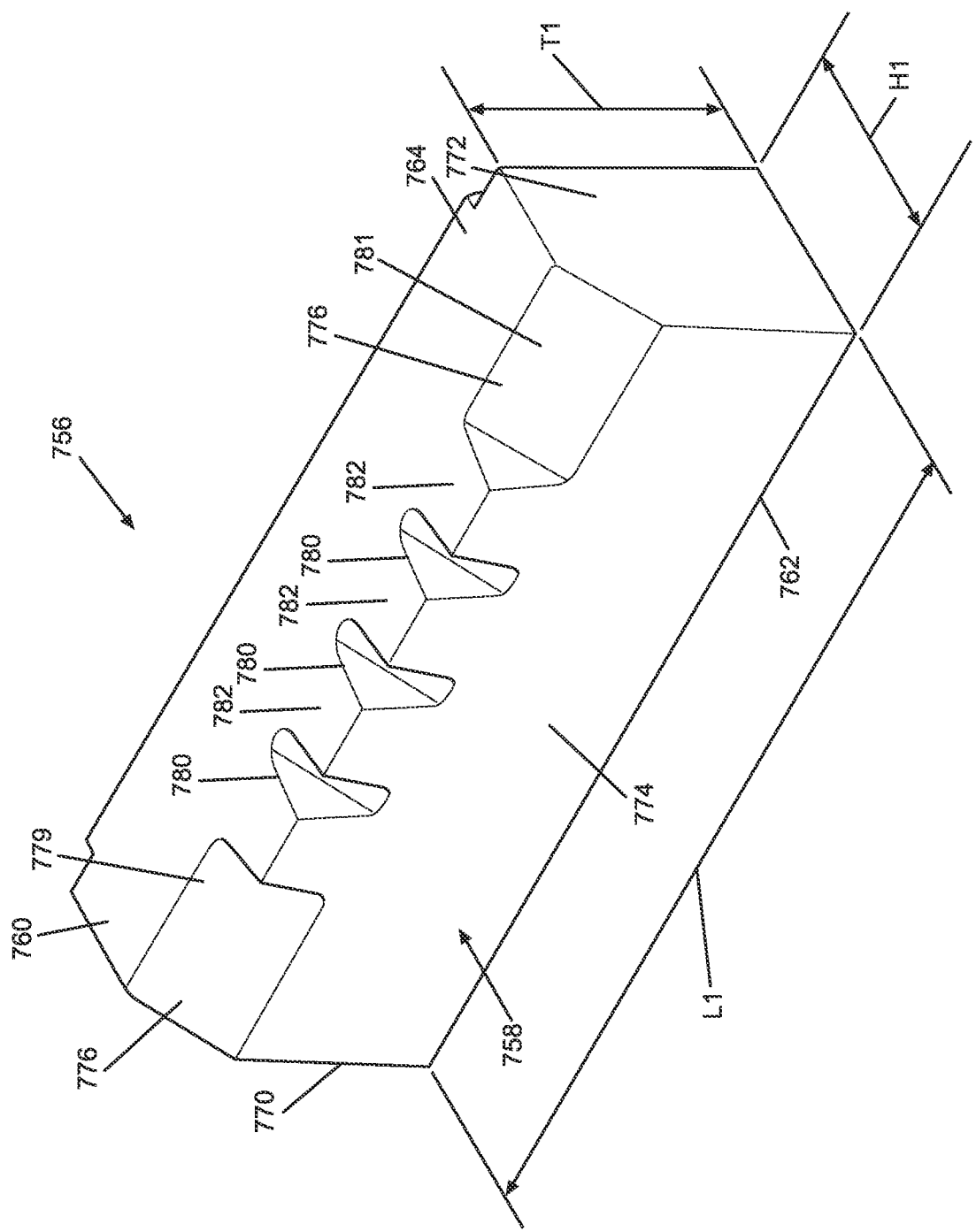
FIG. 74 is a perspective view of the cable sealing module of FIG. 73.
Figure 75:
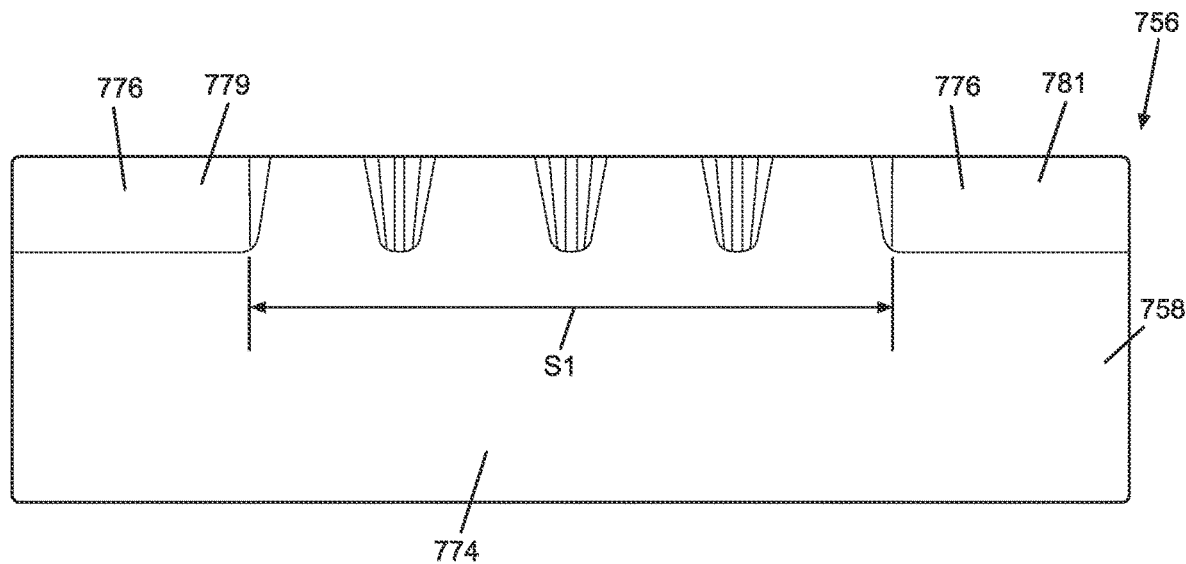
FIG. 75 depicts an inner axial side of the sealing module of FIG. 74.
Figure 76:
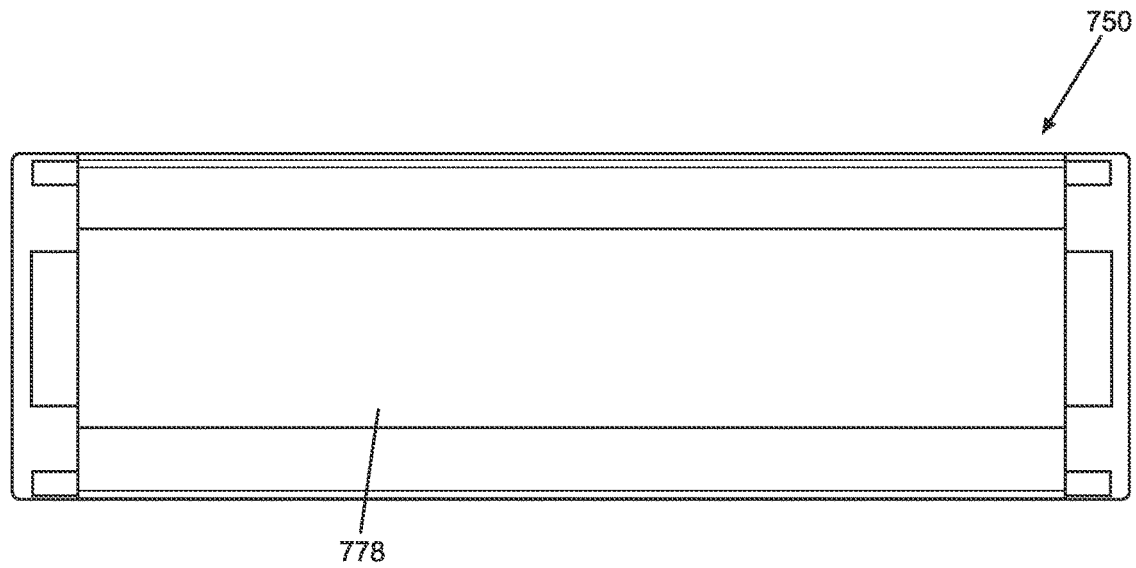
FIG. 76 depicts an outer axial side of the sealing module of FIG. 74.
Figure 77:
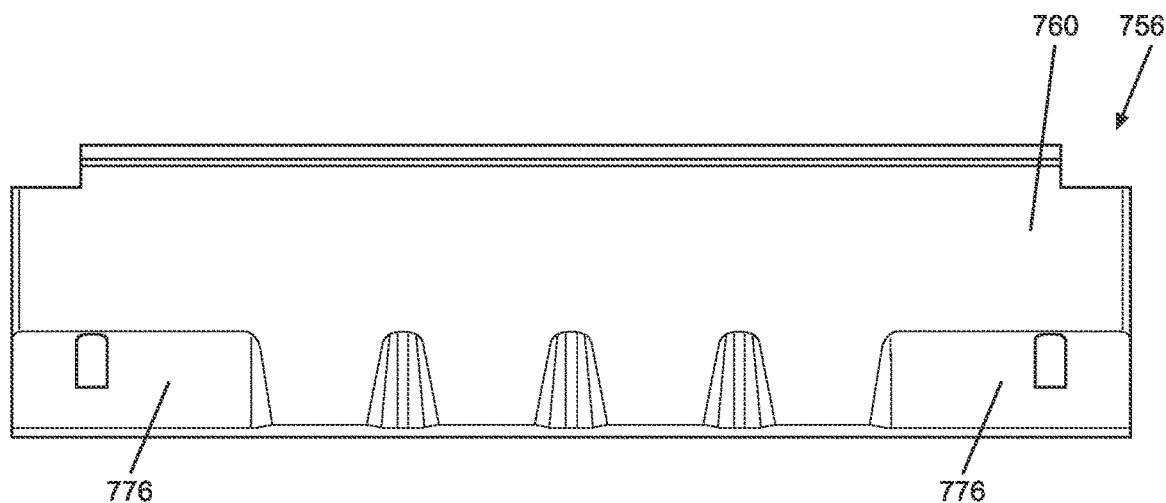
FIG. 77 depicts a cable sealing side of the cable sealing module of FIG. 74.
Figure 78:
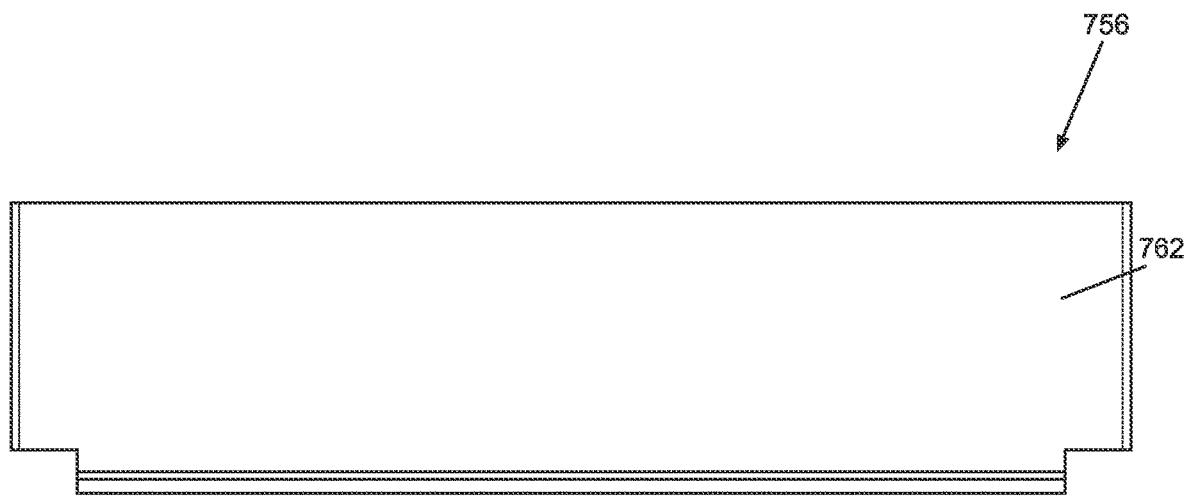
FIG. 78 depicts a spring side of the cable sealing module of FIG. 74.
Figure 79:
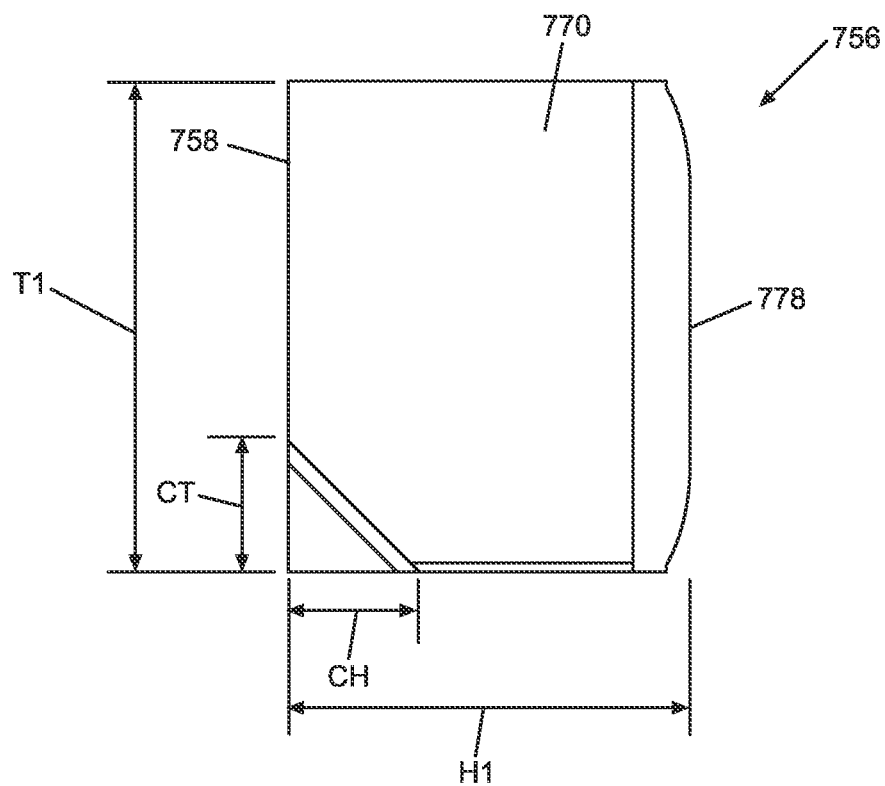
FIG. 79 depicts an end of the cable sealing module of FIG. 74.
Figure 80:
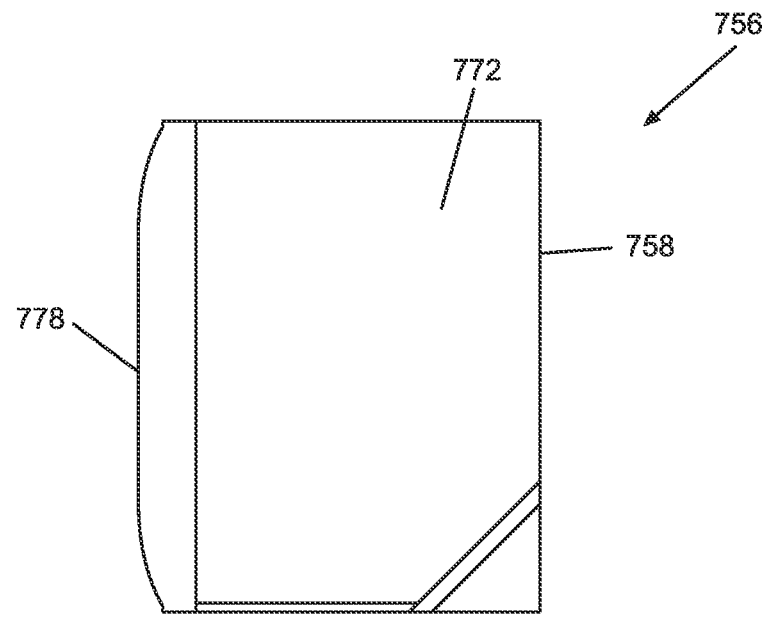
FIG. 80 depicts an opposite end of the cable sealing module of FIG. 74.
Figure 81:
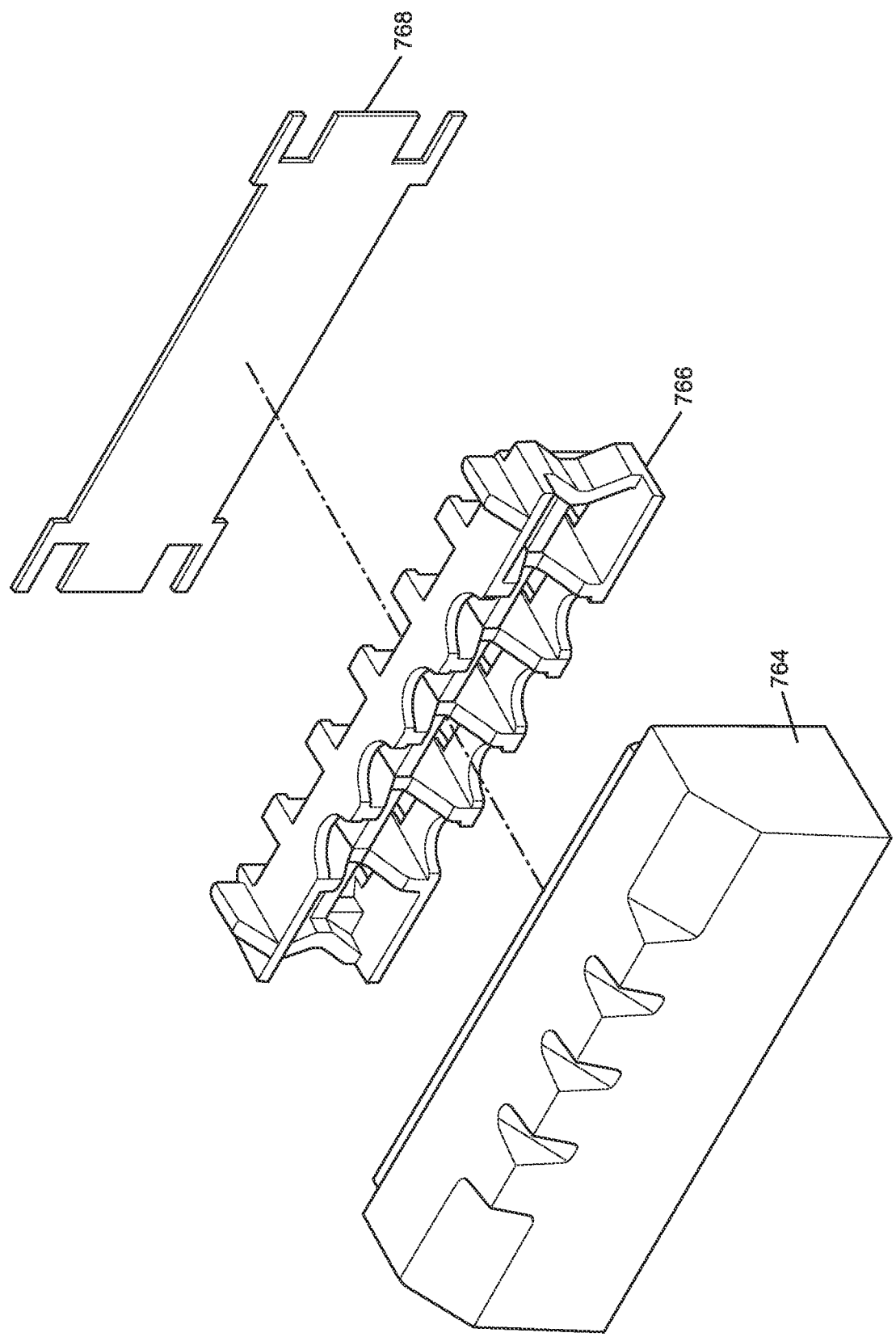
FIG. 81 is an exploded view of the cable sealing module of FIG. 74.
Figure 82:
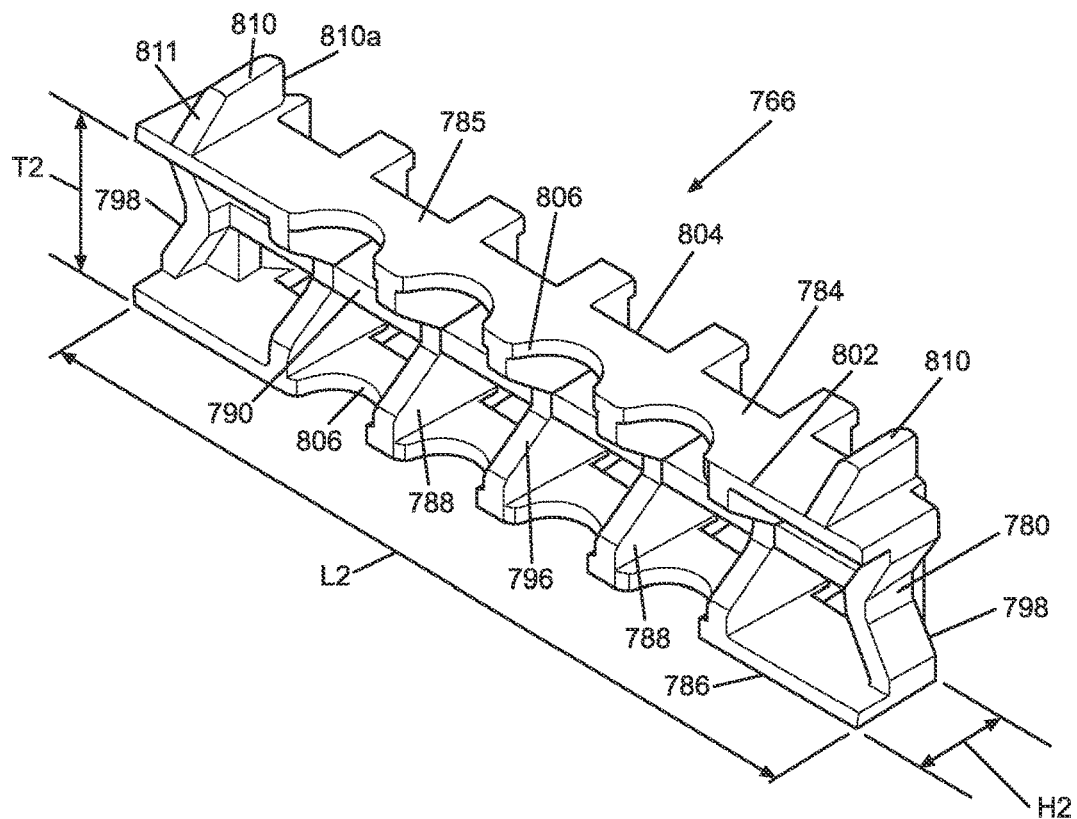
FIG. 82 is a perspective view of the internal structural insert of the cable sealing module of FIG. 74.
Figure 83:
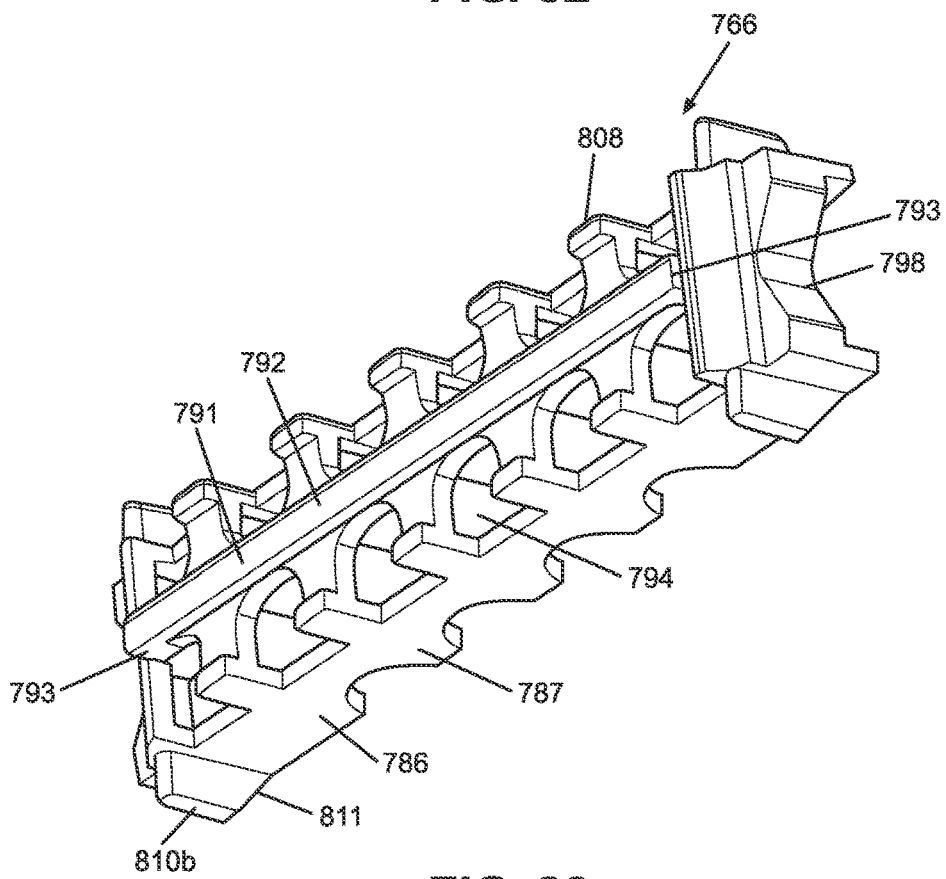
FIG. 83 is an opposite perspective view of the structural insert of FIG. 82.
Figure 84:
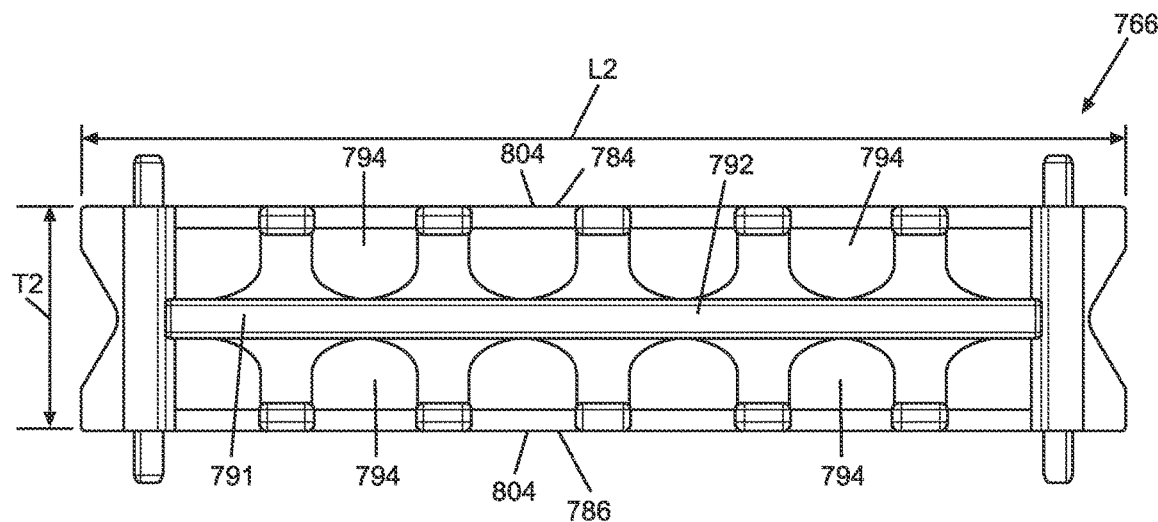
FIG. 84 is a rear view of the structural insert of FIG. 82.
Figure 85:
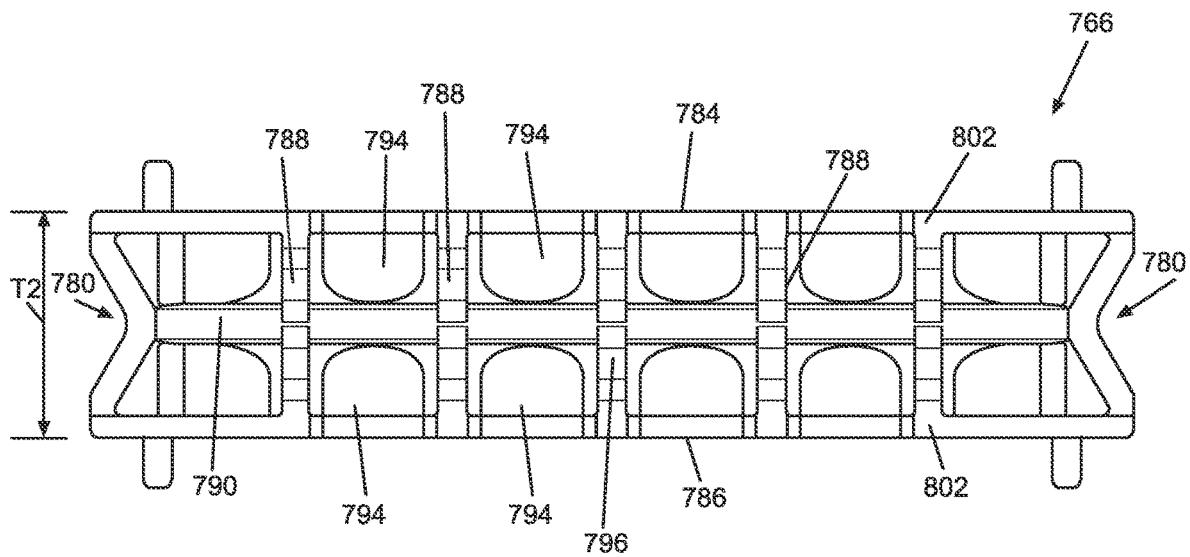
FIG. 85 is a front view of the structural insert of FIG. 82.
Figure 86:
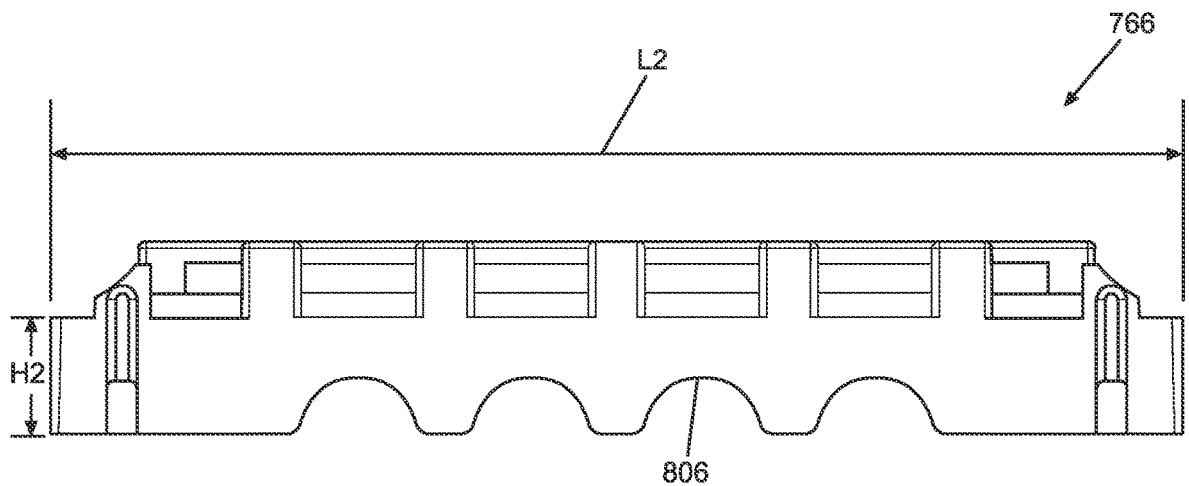
FIG. 86 is a top view of the structural insert of FIG. 82.
Figure 87:
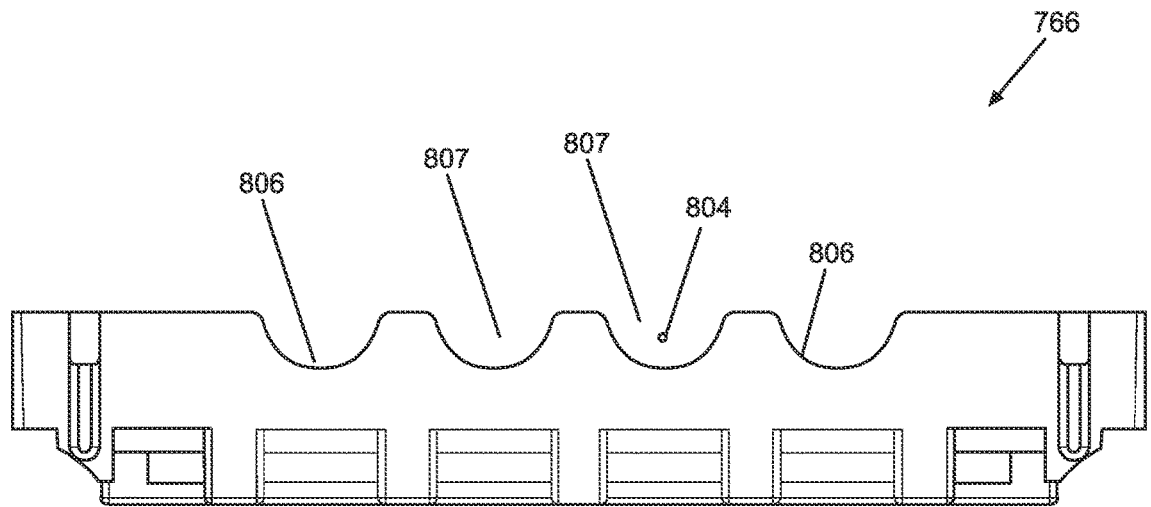
FIG. 87 is a bottom view of the structural insert of FIG. 82.
Figure 88:
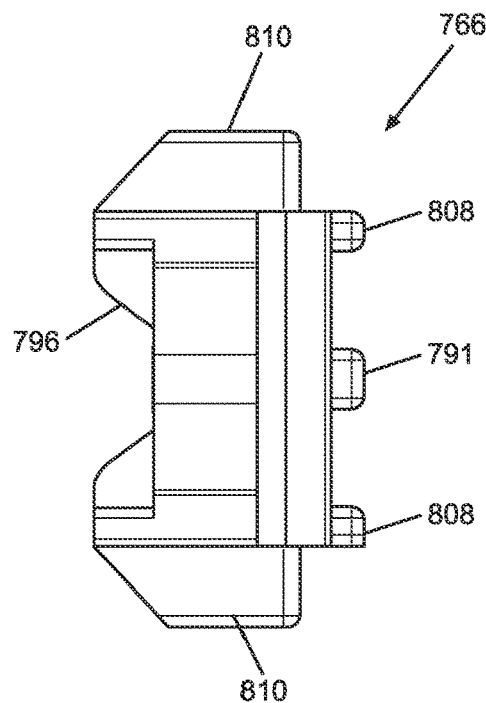
FIG. 88 is a left end view of the structural insert of FIG. 82.
Figure 89:
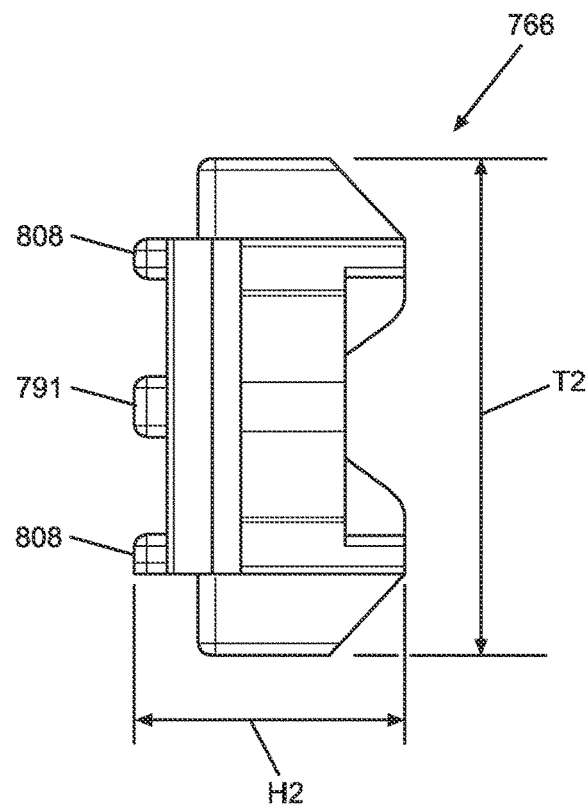
FIG. 89 is a right end view of the structural insert of FIG. 82.
Figure 90:
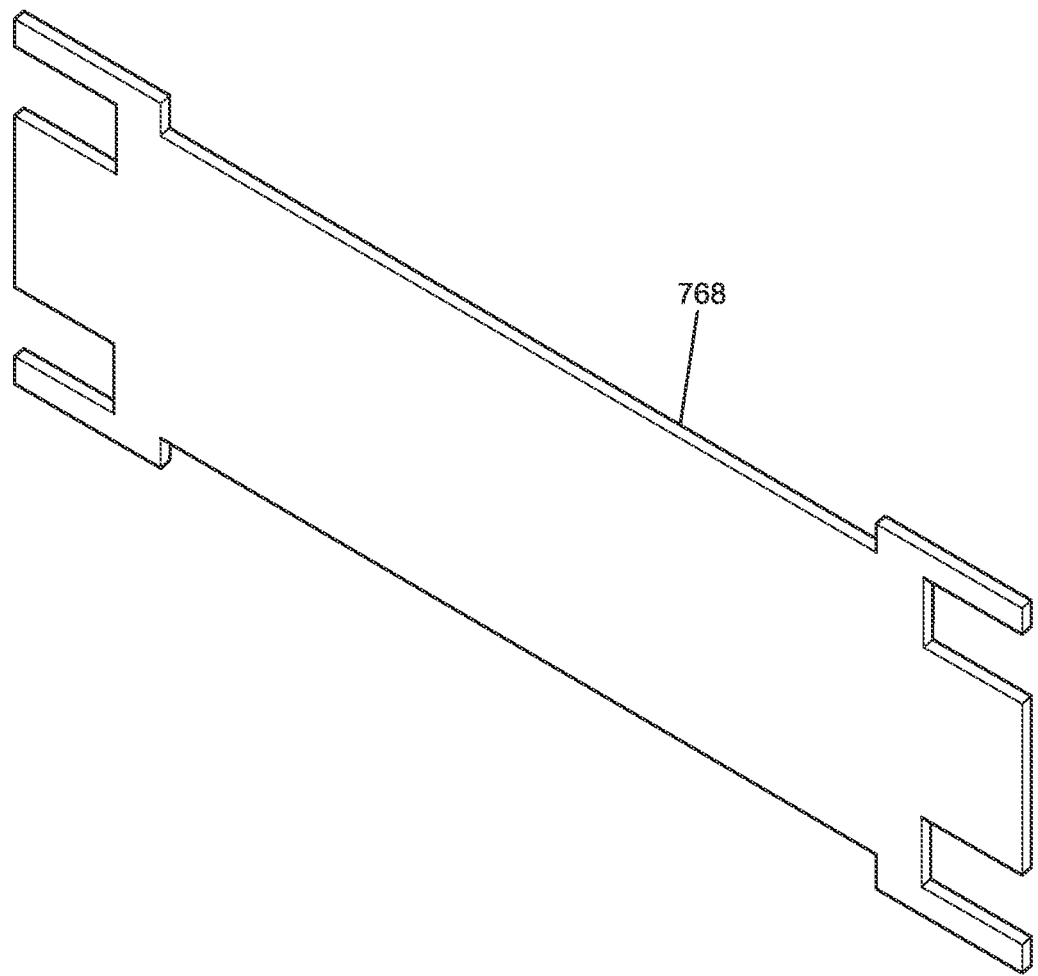
FIG. 90 is a perspective view of the spring of the cable sealing module of FIG. 73.

FIG. 73 depicts one of the cable sealing modules 756 in isolation from the housing 752. The cable sealing module 756 is depicted as a sealing block having a composite construction including a sealing portion 764 and a structural insert portion 766. The sealing portion 764 and the structural insert portion 76 preferably include mechanical/physical properties or characteristics of the type described above. In a preferred example, the sealing portion 764 and the structural insert portion 766 both have an elastomeric construction, with the structural insert portion 766 being more elastic than the sealing portion 764 such that the structural insert portion 766 has a faster recovery time than the sealing portion 764. The sealing portion 764 and the structural insert portion 766 can each have a material composition of the type described elsewhere herein with respect to such components. In a preferred example, the structural insert 766 is constructed of a material that is harder than the material forming the sealing portion 764. The cable sealing module 766 also includes a spring 768 depicted as a leaf spring.

In a preferred example, at least one of the structural insert portion 766 and the spring 768 is fully enclosed and embedded within the sealing portion 764. In a preferred example, both the structural insert portion 766 and the spring 768 are fully enclosed (embedded within, encased within, encapsulated within, surrounded by, etc.) the sealing portion 764. In certain examples, the sealing portion 764 is overmolded over the structural insert portion 766 and the spring 768. In certain examples, the sealing portion 764 occupies a majority of the volume of the cable sealing module 756. In certain examples, the sealing portion 764 is molded around and through the structural insert portion 766. In certain examples, the structural insert portion 766 forms a skeletal frame that provides structural support to the sealing portion 764 and also provides containment of at least portions of the sealing portion 764 to assist in controlling movement of the sealing portion 764 when the cable sealing module 766 is pressurized during cable sealing. Thus, the structural insert portion 766 can assist in controlling positioning of the sealing portion 764 during cable sealing to ensure that the sealing portion 764 effectively conforms about the exterior of cables routed through the sealing arrangement 753.

The spring 768 is also preferably overmolded within the sealing portion 764 adjacent to the structural insert portion 766. When the sealing arrangement 753 is pressurized during cable sealing, the spring 768 can flex to accommodate movement of portions of the sealing portion 764 and to take-up sealant volume as volume of the sealing portion 764 is displaced by cables routed through the sealing arrangement 753. Additionally, when the spring 768 is flexed, the spring 768 applies spring load to the sealing portion 764 to assist in maintaining the sealing portion 764 under pressure during sealing. The spring 768 preferably has a metal construction such as spring steel.

Referring to FIGS. 73-80, the cable sealing module 756 has an outer shape defined by the sealing portion 764. The outer shape of the cable sealing module 756 includes a length L1, a height H1, and an axial thickness T1. In use within the enclosure 750, the length L1 extends across the width of the housing 752, the height H1 extends along a height of the housing and the axial thickness T1 extends along the cable pass-through orientation. The outer shape of the cable sealing module 756 includes the inner and outer axial sides 760, 762. The axial thickness T1 extends between the inner and outer axial sides 760, 762. The outer shape of the cable sealing module 756 also includes opposite end surfaces 770, 772 separated by the length L1 of the cable sealing modules 756.

The outer shape of the cable sealing module 756 further includes the cable sealing side 758 which extends along the length L1 of the cable sealing module 756 and also extends between the inner and outer axial sides 760, 762 of the cable sealing module 756. In the depicted example, the cable sealing side 758 has been profiled to have a faceted configuration. The faceted configuration can include a primary sealing surface 774 and a chamfer surface 776. In certain examples, the primary sealing surface 774 is oriented generally perpendicular with respect to the inner and outer axial sides 760, 762, and the chamfer surface 776 is oriented at an oblique angle with respect to the primary sealing surface 774 and the inner and outer axial sides 760, 762. In the depicted example, the chamfer surface 776 provides a slanted/angled transition between the primary sealing surface 774 and the inner axial side 760. In certain examples, the chamfer surface 776 is angled at an oblique angle (e.g., an oblique angle in the range of 30-60 degrees) with respect to the primary sealing surface 774 and/or one of the inner or outer axial sides 760, 762. In alternative examples, the chamfer surface 776 may provide a transition between the primary sealing surface 774 and the outer axial side 762, or chamfer surfaces 776 may provide transitions from the primary sealing surface 774 to both the inner and outer axial sides 760, 762.

The outer shape of the cable sealing module 756 also includes a side 778 positioned opposite from the cable sealing side 758 such that the side 778 and the cable sealing side 758 are separated by the height H1. It will be appreciated that the spring 768 is embedded within the sealing portions 764 adjacent to the side 778 at a location between the structural insert portions 766 and the side 778. Thus, the side 778 can be referred to as a spring side. When the cable sealing module 756 is installed within the housing 752, the side 778 faces toward a pocket of the housing adapted for taking-up volume of the cable sealing module 756 during cable sealing when cables displaced portions of the sealing portion 764. Thus, the side 778 can be referred to as a mounting pocket side. In certain examples, the spring 768 flexes into the pocket and portions of the sealing portions 764 flow into the pocket during sealing to accommodate the volume of sealant displaced by the cables routed through the sealing arrangement.

It will be appreciated that the profiled configuration of the cable sealing surface 758 assists in preventing extrusion and shearing of the sealing portion 764 when the housing 752 is closed and the sealing portion 764 is deformed about cables routed through the sealing arrangement 753. For example, open volume 777 provided adjacent to the chamfer surface 776 provides an open region into which displaced sealant material of the sealing portion 764 can flow during sealing about a cable or about cables. In certain examples, the chamfer surface 776 extends along at least 30 or 40% of the length L1 of the cable sealing module 756. In certain examples, the chamfer surface 776 can include different sections or regions that are separated from one another along the length L1 of the cable sealing modules 756. In certain examples, the chamfer surface 776 can have a chamfer height dimension CH that extends along the height H1 of the cable sealing module 756 and a chamfer thickness dimension CT that extends along the axial thickness T1 of the cable sealing module 756. In certain examples, the height dimension CH of the chamfer surface 776 is at least 5, 10, 15, or 20% as long as the height H1 of the cable sealing module, and the thickness dimension CT of the chamfer surface 776 is at least 5, 10, 15, or 20% as long as the axial thickness T1 of the cable sealing module 756. In the depicted example, the chamfer surface 776 includes a first section 779 positioned adjacent one end of the cable sealing module 756 and a second section 781 positioned adjacent an opposite end of the cable sealing module 756. The sections 779, 781 of the chamfer surface 776 are separated along the length L1 of the cable sealing module 756 by a spacing S1. A plurality of notches 780 are provided at the cable sealing module 756 in the region corresponding with the spacing S1. The notches 780 transition from the cable sealing side 758 to the inner axial face 760. The notches 780 are separated from one another and from the sections 779, 781 of the chamfer surface 776 by non-chamfered regions 782.

Referring to FIGS. 73 and 81-89, the structural insert portions 766 include a length L2 that extends along the length L1 of the cable sealing module 756, a height H2 that extends along the height H1 of the cable sealing modules 756 and an axial thickness or depth T2 that extends along the axial thickness T1 of the cable sealing module. In one example, the length L2 is at least 70, 80, or 90% as long as the length L1, the axial thickness T2 is at least 70, 80, or 90% as long as the axial thickness T1, and the height H2 is less than or equal to 70, 80, or 90% as long as the height H1. In certain examples, the axial thickness T2 is at least 30, 40, or 50% as long as the axial thickness T1 and less than or equal to 70, 80, or 90% as long as the axial thickness T1.

The structural insert portions 766 includes inner and outer primary (e.g., main) longitudinal walls 784, 786 that extend along the length L2. The inner and outer primary longitudinal walls 784, 786 include major sides that are parallel with respect to the inner and outer axial bases 760, 762. A major inner side 785 of the inner primary longitudinal wall 784 faces toward the inner axial side 760 and an outer major side 787 of the outer primary longitudinal wall 786 faces toward the outer axial side 762. The inner and outer primary longitudinal walls 784, 786 are parallel with respect to one another and are interconnected by cross-supports 788. The cross-supports 788 extend along the axial thickness T2 between the inner and outer primary longitudinal walls 784, 786. The cross-supports 788 also connect to a central reinforcing rail 790 that is parallel to the longitudinal walls 784, 786 and is centered between the longitudinal walls 784, 786. An offset rail 791 also extends along the length L2 and includes a central spring support surface 792 that faces toward the spring 768 and extends along a center line of the spring 768. The offset rail 791 is offset from the central rail 790 in a direction toward the spring 768 and has a dimension RH in the height orientation H2 that extends beyond central rail 790 and the longitudinal walls 784, 786 toward the spring 768. Posts 793 offset the offset rail 791 from the central reinforcing rail 790.

The cross-supports 788 are separated by openings 794 that allow the sealing portion 764 of the cable sealing module 756 to flow through the structural insert portions 766 in the orientation of the height H2. When viewed along the length L2, the cross-supports 788 have a V-shaped configuration with each of the cross-supports 788 including a V-shaped notch 796. Each notch 796 is tapered to expand as each notch 796 extends toward the cable sealing surface 758. Each notch 796 has a closed end at the centered reinforcing rail 790. The longitudinal walls 784, 786 are also interconnected by end supports 798 that extend across the axial thickness T2. The end supports 798 include legs 798a, 798b that are angled relative to one another such that the end supports 798 define V-shaped notches 780 that face outwardly from the ends of the structural insert portions 766 and are v-shaped when viewed in the orientation of the height H2.

The inner and outer primary longitudinal walls 784, 786 each include first and second minor sides 802, 804 that extend longitudinally along the length L2 of the structural insert portion 766 and also extend between the major sides of each of the primary longitudinal walls 784, 786. The first minor sides 802 face toward the cable sealing side 758 and the second minor sides 804 face toward the spring 768 and the side 778. A plurality of cable notches 806 are defined by the first minor sides 802 of the longitudinal walls 784, 786. In one example, the cable notches 806 are generally semicircular in shape when viewed in an orientation along the thickness T2. In one example, the cable notches 806 have open sides 807 that face toward the cable sealing surface 758. In certain examples, the cable notches 806 at the first minor sides 802 of the walls 784, 786 are arranged in pairs with the cable notches 806 of each pair being coaxially aligned with respect to one another. It will be appreciated that each pair of co-axially aligned cable notches 806 defines a predefined cable pass-through location aligned along an axis 809 that passes through the structural insert portion along the axial thickness orientation T2.

The structural insert portion 766 further includes a plurality of spring support projections 808 that project outwardly from the second minor sides 804 of the longitudinal walls 784, 786 in a direction toward the spring 768. The spring support projections 808 are spaced apart from one another along the lengths of the second minor sides 804 of the longitudinal walls 784, 786. The spring support projections 808 are arranged in rows that are parallel to the offset rail 791 with the offset rail 791 being centered between the rows of spring support projections 808.

In certain examples, the structural insert portions 766 can also include tabs 810 that project out from the major sides of the longitudinal walls 784, 786. The tabs 810 can be located near the ends of the structural insert portion 766 and can project from the major sides of the longitudinal walls 784, 786 in the orientation of the axial thickness T2. The tabs 810 can include tabs 810a that project from the inner primary longitudinal wall 784 toward the inner axial face 766 and outer tabs 810b that project from the outer primary longitudinal walls 786 toward the outer axial face 762. The tabs 810a, 810b can extend across the axial thickness T2 and can have ends 811 adjacent the cable sealing side 758 that are angled. In one example, at least some of the tabs 810 have angled ends 811 having angles that are parallel to the chamfer surface 776.

In certain implementations, sealant and/or containment material for use in applications of the type disclosed herein includes a hydrolyzation cured vinyl-terminated polydimethylsiloxane (PDMS) gel or rubber. Additional information on such a material can be found in U.S. Pat. No. 8,642,891, the disclosure of which is hereby incorporated herein by reference in its entirety. In one example, the sealant and/or containment material can be made by reacting a cross-linker, a chain extender and a vinyl-terminated polydimethylsiloxane (PDMS). In other implementations, sealant and/or containment material for use in applications of the type disclosed herein include peroxide or heat cured vinyl-terminated PDMS material. In other implementations, sealant and/or containment material for use in applications of the type disclosed herein includes moisture (and/or ultraviolet light UV) cured PDMS material (various terminations possible, including silanol). In other implementations, sealant and/or containment material for use in applications of the type disclosed herein includes moisture (and/or UV) cured, silylated polyether (commonly silyl modified "MS polymer") material. In certain implementations, the sealant and/or containment material includes polyether or polyester based polyurethane. In other implementations, sealant and/or containment material for use in applications of the type disclosed herein includes chemically crosslinked polyacrylate (acrylic or methacrylic) e.g. n-butyl acrylate or ethylhexyl acrylate with triethylene glycol dimethacrylate. In other implementations, sealant and/or containment material for use in applications of the type disclosed herein includes ionically crosslinked rubber. In other implementations, sealant and/or containment material for use in applications of the type disclosed herein includes chemically crosslinked styrene-butadiene-styrene (SBS) family thermo-plastic elastomer (TPE) gel (crosslinks in polystyrene phase only) or SBS family TPE rubber. In other implementations, sealant and/or containment material for use in applications of the type disclosed herein includes physically crosslinked triblock polyacrylate material (e.g. Kurarity®). In other implementations, sealant and/or containment material for use in applications of the type disclosed herein includes physically crosslinked triblock olefin material (e.g. Infuse). In other implementations, sealant and/or containment material for use in applications of the type disclosed herein includes hybrids and/or multiple combinations of above chemistries.

In other examples, the sealant and/or containment material can include an extended (e.g., oil extended) co-polymer gel such as a gel having a composition that includes di-block and/or tri-block co-polymers (e.g., hard-elastomer-hard block co-polymers such as styrene-(ethylene/propylene)-styrene (SEPS) and/or styrene-(ethylene/butylene)-styrene (SEBS) block co-polymers). Example sealants having extended co-polymer gels are disclosed in U.S. Pat. Nos. 5,618,882; 5,442,004; 5,541,250; 5,994,446; and PCT International Patent Publication Nos. WO88/00603; WO94/

182273; and WO93/23472, all of which are hereby incorporated by reference in their entireties.

Example sealing gels can include cross-linked rubber gels. Example sealing gels can include styrenic block copolymers (e.g., di-block and tri-block copolymers) such as cross-linked styrene-butadiene-styrene (SBS) family thermo-plastic elastomer (TPE) gels. Example sealing gels can include including extended (e.g., oil extended) co-polymer gels such as gels having a composition that includes di-block and/or tri-block co-polymers (e.g., hard-elastomer-hard block co-polymers such as styrene-(ethylene/propylene)-styrene (SEPS) and/or styrene-(ethylene/butylene)-styrene (SEBS) block co-polymers). Example sealing gels can include gels (e.g., silicone gels and other gels) of the type disclosed at U.S. Provisional Patent Application Ser. No. 63/013,992 which is hereby incorporated by reference in its entirety.

ASPECTS OF THE PRESENT DISCLOSURE

Aspect 1. A sealing arrangement comprising:
first and second cable sealing modules each including a cable sealing surface, the cable sealing surfaces of the first and second cable sealing modules opposing and contacting one another at a cable pass-through sealing interface;
at least one of the first and second cable sealing modules including a first portion and a second portion, the first and second portions respectively having different first and second chemical compositions, the first and second chemical compositions both having elastomeric properties.

Aspect 2. The sealing arrangement of Aspect 1, wherein the first portion is a gel and the second portion is a rubber.

Aspect 3. The sealing arrangement of Aspect 1 or 2, wherein the first and second chemical compositions include the same base chemical.

Aspect 4. The sealing arrangement of Aspect 3, wherein the base chemical includes silicone.

Aspect 5. The sealing arrangement of Aspect 3, wherein the base chemical includes a thermoplastic elastomer.

Aspect 6. The sealing arrangement of any of Aspects 1-5, wherein the second composition has a shorter compression set recovery time than the first composition.

Aspect 7. The sealing arrangement of Aspect 6, wherein the second portion shortens the compression set recovery time of the first portion as compared to the first portion recovering alone.

Aspect 8. The sealing arrangement of any of Aspects 1-7, wherein the first and second portions are bonded together.

Aspect 9. The sealing arrangement of any of Aspects 1-8, wherein the first composition is more flowable that the second composition.

Aspect 10. The sealing arrangement of any of Aspects 1-9, wherein the first portion is molded between, through, within, and/or over the second portion.

Aspect 11. The sealing arrangement of any of Aspects 1-10, wherein the cable sealing module includes a length, a height and a thickness, wherein the cable sealing surface is defined along the length and the thickness, and wherein a pass-through orientation of the cables extends across the thickness of the cable sealing module.

Aspect 12. The sealing arrangement of Aspect 11, wherein the second portion defines a rib embedded in the first portion that extends along the length of the cable sealing module.

Aspect 13. The sealing arrangement of Aspect 12, wherein the second portion includes a base embedded in the first portion that extends long the length and thickness of the cable sealing module and that defines openings though which the first portion extends in the height orientation.

Aspect 14. The sealing arrangement of Aspect 12 or 13, wherein the second portion includes axial walls positioned at axial end faces of the cable sealing module separated by the thickness of the cable sealing module, wherein at least a portion of the first portion is contained between the axial walls.

Aspect 15. The sealing arrangement of Aspect 14, wherein the axial walls define at least 50 percent or at least 75 percent of the surface area of the axial end faces Aspect 16. The sealing arrangement of Aspect 14, wherein the axial walls define 20-50 percent of the surface area of the axial end faces.

Aspect 17. The sealing arrangement of Aspect 14, wherein the axial walls extend to the cable sealing surfaces such that the first and second portions cooperate to define the cable sealing surfaces.

Aspect 18. The sealing arrangement of Aspect 14, wherein the axial walls are offset from the cable sealing surfaces such that the cable sealing surfaces are defined only by the first portion.

Aspect 19. The sealing arrangement of any of Aspects 1-18, wherein the cable sealing surfaces have a non-deformed state corresponding to when no cables are routed between the cable sealing modules and a deformed state corresponding to when cables are routed between the cable sealing modules, and wherein the second portion shortens the compression set recovery time from the deformed state to the non-deformed state of the first portion as compared to the first portion recovering alone.

Aspect 20. The sealing arrangement of Aspect 19, wherein the cable sealing surfaces do not include pre-defined cable-receiving recesses when in the non-deformed state.

Aspect 21. The sealing arrangement of Aspect 14, wherein the second portion includes struts that extend across the thickness between the axial end walls, and wherein the struts each include first and second segments that are angled at oblique angles with respect to one another.

Aspect 22. The sealing arrangement of any of Aspects 1-21, further comprising a plastic module frame embedded in the at least one cable sealing module.

Aspect 23. The sealing arrangement of Aspect 22, wherein the first portion is molded through and around the plastic module frame.

Aspect 24. The sealing arrangement of Aspect 22, wherein the plastic module frame includes retention tabs for retaining the at least one cable sealing module in a housing.

Aspect 25. The sealing arrangement of Aspect 24, wherein the second portion and the plastic module frame are individually pre-molded, and the first portion is then molded in place with respect to the second portion and the plastic module frame.

Aspect 26. The sealing arrangement of any of Aspects 22-25, wherein the plastic module frame defines a base with openings through which the first portion is molded, and sets of fingers that project from the base, the sets of fingers defining v-shapes when viewed along a cable pass-through orientation of the sealing arrangement.

Aspect 27. The sealing arrangement of any of Aspects 1-25, further comprising containment frames opposing opposite axial end faces of the cable sealing modules, the containment frames defining pre-determined cable pass-through openings.

Aspect 28. The sealing arrangement of Aspect 27, wherein the cable sealing modules and the containment frames are divided into a plurality of module sections that each form a portion of a length of the cable sealing arrangement.

Aspect 29. A cable sealing arrangement of any of Aspects 1-28, wherein the at least one cable sealing module includes a length a height and a thickness, wherein the thickness extends along a cable pass-through orientation of the cable sealing arrangement, and wherein the at least one cable sealing module includes ears at opposite ends of the cable sealing module that extend along the thickness of the cable sealing module and project outwardly from a main body of the cable sealing module in the height orientation, the ears being defined by the first portion of the cable sealing module.

Aspect 30. The cables sealing arrangement of any of Aspects 1-29, wherein the at least one cable sealing module is chamfered adjacent the cable sealing surface to reduce a thickness of the cable sealing surface as compared to a remainder of the cable sealing module.

Aspect 31. The cable sealing arrangement of any of Aspects 1-30, further comprising a leaf spring attached to the at least one cable sealing module.

Aspect 32. The cable sealing arrangement of Aspect 30, wherein the leaf spring is coupled to the cable sealing module by retaining features overmolded in the cable sealing module.

Aspect 33. The cable sealing arrangement of Aspect 32, wherein when the cable sealing module is mounted in an enclosure, opposite ends of the leaf spring flex to accommodate deformation of the cable sealing module while a mid-region of the leaf spring remains fixed.

Aspect 34. The cable sealing arrangement of any of Aspects 1-33, wherein the at least one cable sealing module includes a plurality of removable volume reducing inserts, each of the inserts including a volume of the first composition and a volume of the second composition.

Aspect 35. The cable sealing arrangement of Aspect 34, wherein the volumes of the first compositions are contained within the volumes of the second compositions.

Aspect 36. The cable sealing arrangement of any of Aspects 1-35, wherein the cable sealing surface are located at opposing outer sides of the cable sealing modules.

Aspect 37. The cable sealing arrangement of Aspect 11 or 19, wherein the first portion is a sealing portion and the second portion is a structural insert portion, wherein the sealing portion is softer than the structural insert portion Aspect 38. The cable sealing arrangement of Aspect 37, wherein the sealing portion occupies majority of a volume of the cable sealing module and is overmolded over and through the structural insert portion.

Aspect 39. The cable sealing arrangement of Aspect 37 or 38, further comprising a leaf spring overmolded within the sealing portion.

Aspect 40. The cable sealing arrangement of Aspect 37 or 38, wherein the structural insert portion is fully encapsulated within the sealing portion.

Aspect 41. The cable sealing arrangement of any of Aspects 37-40, wherein the structural insert portion defines notches corresponding to pre-defined cable pass-through locations.

Aspect 42. The cable sealing arrangement of Aspect 41, wherein the sealing portion does not include pre-defined cable pass-through notches at the sealing surface of the cable sealing module.

Aspect 43. The cable sealing arrangement of any of Aspects 37-40, wherein the cable sealing module includes inner and outer axial sides that extend along the length and the height of the cable sealing module, wherein the cable sealing module includes a cable sealing side including the cable sealing surface that extends along the length and the thickness of the cable sealing module, wherein the structural insert portion includes first and second main walls that are parallel and spaced apart from one another along the thickness of the cable sealing module, wherein the structural insert portion includes cross-supports spaced apart from one another along the length of the cable sealing module that connect the first and second main walls, wherein the first and second main walls have major sides that are parallel with respect to the inner and outer axial sides, wherein the first and second major walls include first minor sides that face toward the cable sealing side, wherein the first minor sides define notches corresponding to pre-defined cable pass-through location, and wherein openings extend between the cross-supports in a height orientation for allowing the sealant portion to flow through the structural insert portion in the height orientation.

Aspect 44. The cable sealing arrangement of Aspect 43, wherein the cable sealing module includes a spring side positioned opposite the cable sealing side, wherein the height extends between the cable sealing side and the spring side, and wherein a leaf spring is encapsulated within the sealing portion at a location between the spring side and the structural insert portion.

Aspect 45. The cable sealing arrangement of Aspect 44, wherein the first and second main walls have second minor sides that face toward the leaf spring, and wherein rows of projections are provided at the second minor sides that project toward the leaf spring.

Aspect 46. The cable sealing arrangement of Aspect 45, wherein the structural insert portion includes a first longitudinal rail centered between and parallel to the first and second main walls, wherein the cross-supports connect to the first longitudinal rail.

Aspect 47. The cable sealing arrangement of Aspect 46, further comprising a centrally positioned second longitudinal rail that is offset from the first longitudinal rail by posts in a direction toward the spring, wherein the second longitudinal rail includes a longitudinal surface that faces toward the leaf spring, and wherein the longitudinal rail is centered between the rows of projections.

Aspect 48. The cable sealing arrangement of any of Aspects 43-47, wherein the cable sealing side includes a chamfer surface defined between the cable sealing surface and one of the inner and outer axial sides of the cable sealing module.

Aspect 49. The cable sealing arrangement of Aspect 48, wherein the chamfer surface is provided adjacent to only one of the inner and outer axial sides of the cable sealing module.

Aspect 50. The cable sealing arrangement of Aspect 48 or 49, wherein the chamfer surface has a height dimension equal to or greater than at least 5, 10, 15 or 20 percent of the height of the cable sealing module, and/or an axial dimension equal to or greater than at least 5, 10, 15 or 20 percent of the thickness of the cable sealing module.

Aspect 51. A cable sealing module comprising:
 a module body including a length a height and a thickness, wherein the thickness extends along a cable pass-through orientation of the cable sealing arrangement, the module body including ears at opposite ends of the module body that extend along the thickness of the module body and project outwardly from a main body of the cable sealing module in the height orientation.

Aspect 52. The cable sealing module of Aspect 51, wherein the ears have a truncated triangular shape when viewed along a cable pass-through orientation.

Aspect 53. The cable sealing module of Aspect 51 or 52, wherein the module body includes a sealing gel molded over a plastic module frame.

Aspect 54. A sealing arrangement comprising:
first and second cable sealing modules each including a cable sealing surface, the cable sealing surfaces of the first and second cable sealing modules opposing and contacting one another at a cable pass-through sealing interface;
at least one of the first and second cable sealing modules being chamfered adjacent the cable sealing surface to reduce a thickness of the cable sealing surface as compared to a remainder of the cable sealing module.

Aspect 55. The cable sealing arrangement of Aspect 54, wherein both of the first and second cable sealing modules are chamfered adjacent the cable pass-through sealing interface.

Aspect 56. The cable sealing arrangement of Aspect 55, wherein the cable sealing modules each have a length, a thickness and a height, wherein the cable sealing surfaces are defined at exteriors of the cable sealing modules and extend along the thickness and the lengths of the sealing modules, and wherein the chamfering causes the thickness to narrow as the modules extend along the height toward the cable sealing surfaces.

Aspect 57. The cable sealing arrangement of Aspect 54, wherein the cable sealing surface extends between inner and outer axial sides of the cable sealing module, and wherein chamfer surfaces transition from the cable sealing surface to the inner axial side and from the cable sealing surface to the outer axial side.

Aspect 58. The cable sealing arrangement of Aspect 57, wherein the cable sealing side has a profile that is symmetric about a plane that bisects the cable sealing side and extends along the length of the cable sealing module.

Aspect 59. The cable sealing arrangement of Aspect 54, wherein the cable sealing surface extends between inner and outer axial sides of the cable sealing module, and wherein the cable sealing module is chamfered between the cable sealing surface and one of the inner axial and outer axial sides and is not chamfered between the cable sealing surface and the other of the inner and outer axial sides.

Aspect 60. The cable sealing arrangement of any of Aspects 54-59, wherein cable sealing module includes a chamfer surface between the sealing surface and an axial side of the cable sealing module, wherein the chamfer surface has a height dimension equal to or greater than at least 5, 10, 15 or 20 percent of the height of the cable sealing module, and wherein the chamfer surface has an axial dimension equal to or greater than at least 5, 10, 15 or 20 percent of the thickness of the cable sealing module.

Aspect 61. The cable sealing arrangement of any of Aspects 54-59, wherein cable sealing module includes a chamfer surface between the sealing surface and an axial side of the cable sealing module, wherein the chamfer surface has a height dimension equal to or greater than at least 5, 10, 15 or 20 percent of the height of the cable sealing module or wherein the chamfer surface has an axial dimension equal to or greater than at least 5, 10, 15 or 20 percent of the thickness of the cable sealing module.

Aspect 62. A sealing arrangement comprising:
first and second cable sealing modules each including a cable sealing surface, the cable sealing surfaces of the first and second cable sealing modules opposing and contacting one another at a cable pass-through sealing interface;
at least one of the first and second cable sealing modules having a sealing material molded over a plastic module frame, the plastic module frame including sets of fingers defining v-shapes when viewed in a cable pass-through direction, wherein cable pass-through locations are defined between the fingers defining the v-shapes.

Aspect 63. A sealing arrangement
first and second cable sealing modules each including a cable sealing surface, the cable sealing surfaces of the first and second cable sealing modules opposing and contacting one another at a cable pass-through sealing interface; and
a leaf spring that is flexed by at least one of the cable sealing modules in response to deformation of the cable sealing module, wherein a mid-region of the leaf spring is fixed and ends of the leaf spring are configured to flex to accommodate a volume of the cable sealing module displaced during sealing about a cable.

We claim:

1. A sealing arrangement comprising:
first and second cable sealing modules each including a cable sealing surface, the cable sealing surfaces of the first and second cable sealing modules opposing and contacting one another at a cable pass-through sealing interface;
at least one of the first and second cable sealing modules including a first portion and a second portion, the first and second portions respectively having different first and second chemical compositions, the first and second chemical compositions both having elastomeric properties, and wherein the at least one of the first and second cable sealing modules includes a plurality of removable volume reducing inserts, each of the inserts including a volume of the first composition and a volume of the second composition.

2. A cable sealing arrangement for a telecommunication enclosure, the cable sealing arrangement comprising:
a cable sealant material;
a frame for providing containment of the cable sealant material, the frame defining a cable pass-through opening, the frame including a divider for dividing the cable pass-through opening into a first region and a second region when the divider is in a neutral position, the divider having a cantilevered configuration with a base end and a free end, the divider including a flexible hinge at the base end for allowing the divider to be flexed from the neutral position to a first flexed position in which the first region is reduced in size and the second region is increased in size.

3. The cable sealing arrangement of claim 2, wherein the flexible hinge also allows the divider to be flexed from the neutral position to a second flexed position in which the first region is increased in size and the second region is reduced in size.

4. The cable sealing arrangement of claim 2, wherein the divider divides the cable pass-through opening in half when in the neutral position.

5. The cable sealing arrangement of claim 2, wherein the flexible hinge resiliently biases the divider toward the neutral position.

6. The cable sealing arrangement of claim 2, wherein the divider is part of a divider insert that mounts in a frame wall portion of the frame which defines the cable pass-through opening.

7. The cable sealing arrangement of claim 6, wherein the divider insert mounts within a pocket defined by the frame wall portion.

8. The cable sealing arrangement of claim 6, wherein the divider insert connects to the frame wall portion by a snap-fit connection.

9. The cable sealing arrangement of claim 6, wherein the divider insert includes a U-shaped insert frame including side walls connected to a base wall, wherein the divider is positioned between the side walls, and wherein the flexible hinge connects the base end of the divider to the base wall.

10. The cable sealing arrangement of claim 9, wherein the insert frame includes at least one stop for limiting a range of movement of the divider.

11. The cable sealing arrangement of claim 10, wherein the insert frame includes first and second stops between which the divider can be flexed and which respectively define the maximum deflection states of the divider for the first and second flexed positions.

\* \* \* \* \*